United States Patent
Anthony

(10) Patent No.: US 12,151,872 B1
(45) Date of Patent: Nov. 26, 2024

(54) SELF-COOLING APPARATUS THERMODYNAMICALLY ENHANCED USING DRY GAS

(71) Applicant: Michael Mark Anthony, Hohenwald, TN (US)

(72) Inventor: Michael Mark Anthony, Hohenwald, TN (US)

(*) Notice: Subject to any disclaimer, the term of this patent is extended or adjusted under 35 U.S.C. 154(b) by 501 days.

(21) Appl. No.: 17/367,145

(22) Filed: Jul. 2, 2021

Related U.S. Application Data

(63) Continuation-in-part of application No. 16/602,952, filed on Dec. 31, 2019, and a continuation-in-part of application No. 16/350,484, filed on Nov. 20, 2018, and a continuation-in-part of application No. 15/932,812, filed on Apr. 30, 2018, now Pat. No. 11,433,349.

(51) Int. Cl.
| | |
|---|---|
| *F25D 5/02* | (2006.01) |
| *A47J 41/00* | (2006.01) |
| *B65D 17/00* | (2006.01) |
| *B65D 17/28* | (2006.01) |
| *B65D 81/34* | (2006.01) |
| *F25D 31/00* | (2006.01) |

(52) U.S. Cl.
CPC ...... *B65D 81/3484* (2013.01); *A47J 41/0044* (2013.01); *A47J 41/0061* (2013.01); *B65D 17/02* (2013.01); *B65D 17/4012* (2018.01); *F25D 5/02* (2013.01); *F25D 31/002* (2013.01); *F25D 31/007* (2013.01); *F25D 2331/805* (2013.01)

(58) Field of Classification Search
CPC ........ F25D 5/02; F25D 31/002; F25D 31/007; B65D 17/00; B65D 17/02; B65D 81/3484
See application file for complete search history.

(56) References Cited

U.S. PATENT DOCUMENTS

| | | | | |
|---|---|---|---|---|
| 6,102,108 | A * | 8/2000 | Sillince | F25D 31/007 165/47 |
| 6,266,879 | B1 * | 7/2001 | Scudder | B29C 66/8322 29/890.035 |
| 8,402,772 | B1 * | 3/2013 | Duval | F24V 30/00 62/4 |
| 2005/0279106 | A1 * | 12/2005 | Leonzo | F24V 30/00 126/263.08 |
| 2015/0119963 | A1 * | 4/2015 | Cosse | A61F 7/106 126/263.08 |

* cited by examiner

*Primary Examiner* — Jerry-Daryl Fletcher
*Assistant Examiner* — Daniel C Comings
(74) *Attorney, Agent, or Firm* — Frank L. Kubler

(57) ABSTRACT

A heating and cooling apparatus includes a inner container for containing a food product and having a rim and a side wall and a base dome, and an outer container having an open rim and a side wall and a base dome, where the inner container is snugly fitted into the open rim of the outer container and a common lid on the container rims, and the inner container is shorter than the outer container defining a dry gas chamber between the container base domes containing a dry gas and a thermally reactive structure, and where the diameters of the inner container is less than that of the outer container leaving a radial space between the container cylindrical walls defining a humidification liquid chamber containing a humidification liquid, and a sealing member between the dry gas chamber and the humidification liquid chamber.

33 Claims, 36 Drawing Sheets

SELF-COOLING APPARATUS THERMODYNAMICALLY ENHANCED USING DRY GAS

BACKGROUND OF THE INVENTION

Field of the Invention

The present novel invention relates generally to the art of cooling and heating food and beverage containers and to processes for manufacturing such containers. More specifically the present invention relates to an apparatus for cooling and alternatively heating a food product such as a beverage, means and methods of cooling said containers with said apparatus, including methods of assembling and operating said apparatus. The terms "beverage," "food," "food products" and "container contents" are considered as equivalent for the 2 purposes of this application and used interchangeably. The term "inner container" refers to any sealed and openable storage means for a food product meant for consumption.

Description and Examples of the Prior Art

There previously have been many self-cooling and self-heating food inner container devices in the form of a beverage or other food beverage food inner container. These devices sometimes use flexible and deformable receptacles or rigid receptacle sides to store a refrigerant for phase change cooling. Some prior art devices use desiccants with a vacuum activated to evaporate water at low pressure and absorb vapor into a desiccant. Other prior devices use refrigerants stored between pressure vessels in liquid phase to achieve the cooling by causing a phase change of refrigerants from a liquid to a gaseous state. The present inventor has invented a variety of such devices and methods of manufacturing them. Several prior self-cooling food inner container technologies rely on the evaporation of a refrigerant from the liquid phase to the gaseous phase. Some rely on desiccants only. Desiccant technologies rely the thermodynamic potential of a desiccant to absorb water from a gaseous phase into the desiccant to effectuate the evaporation of water in a vacuum. These earlier inventions do not satisfy all the needs of the beverage industry and they do not use electromotive heat transport means to heat or cool a beverage. In fact, they are so structurally different from the present invention, that one skilled in the art cannot possibly transcend from the prior art to the present invention without an inventive process. In an effort to seek a cost effective and functioning apparatus for self-cooling and self-heating a beverage food inner container, the present inventor has done a variety of experiments to arrive at the present novel method. The following issues have kept the cost-effective commercialization of all prior art devices prohibitively high.

Prior art that that cool uses liquefied refrigerants fail to address the real issues of environmental green house and global warming issues. They also fail to address manufacturing and beverage plant operations that are crucial for the success of a self-cooling and self-heating food inner container program. Some such prior art designs require pressurized food inner containers to store liquid refrigerants. The only liquid refrigerants that can be stored between commercially viable pressure canisters are HFCS, CFCS, hydrocarbons, ethers, and other highly flammable low-pressure gases. These gases are not commercially viable and have led to difficulty in implementation of such technologies. Most commercial refrigerants are ozone depleting and global warming and as such have been banned by the EPA in the USA and other governing bodies for direct release into the atmosphere as products of a self-cooling food inner container. The EPA has mandated that no refrigerant be used in a self-cooling food inner container except $CO_2$ and if used, the design must be safe. Refrigerants currently available cause both global warming and ozone depletion. Generally, they are common refrigerants such as 134a and 152a. In some cases, flammable gases such as butane and propane have been tried but the risk factors are high for several reasons. Firstly, the use of such technologies in a closed room can cause a variety of effects including asphyxiation, poisoning and so on. Second the flammability of some refrigerants limits the number of food inner containers that can be opened in a closed environment such as during parties or in a vehicle. The present inventor has several patents on these prior technologies, has experimented with several of these technologies and has found them to be unsuitable for commercial viability. Further, the cost of refrigerants is very prohibitive and the cost of cooling cannot justify the use of refrigerant gases.

Prior art that cool uses cryogenic refrigerants such as $CO_2$ fail to address the real issues of manufacturing and beverage plant operations that are crucial for the success of a self-cooling food inner container program. All such prior art designs require very highly pressurized food inner containers to store the cryogenic refrigerants. Some technologies that promise to use $CO_2$ have implemented carbon traps such as activated carbon, and fullerene nanotubes to store the refrigerants in a carbon matrix. These added desiccants and activated carbon storage systems are too expensive to implement commercially and further, the carbon and other absorptive media that lowers the pressure can contaminate the beverage products. Therefore, there is a need to reduce the quantities of such chemicals needed. Cryogenic self-cooling food inner containers require the use of very high-pressure vessels, and cryogenic gases such as $CO_2$, and they also require expensive containers made from high pressure bearing materials such as aluminum, steel, or fiber-glass. They are essentially dangerous, since the pressures involved are generally of the order of 600 psi or more. Further, they are complicated since the pressures involved are much higher than a conventional food inner container can withstand.

Desiccant-based self-cooling and heating food inner containers require the desiccant to be stored in an evacuated chamber separated fluidly from water stored in a separate chamber. When the vacuum is released between the two compartments, water vapor is pulled into the vacuum and then absorbed by the desiccant and heat of evaporation is taken from the cooled item and transported to condense in the desiccant chamber. The heat taken by the evaporated water heats up the desiccant and must not be allowed to interact with the beverage, otherwise it would reheat the beverage again. It is very difficult to maintain for a long period a true vacuum in chamber adjacent to a water containing chamber since the permeability of the barrier used to separate the desiccant chamber from the water chamber contributes to the efficiency of cooling, and the thicker the barrier required the more expensive it becomes to manufacture. Further, the valves and activation devices used by prior art using a desiccant cooling means require complicated devices to achieve their aims. Further, the vacuum must be maintained for a long period of storage time and often fails. Migration of moisture into the desiccant can destroy the cooling capacity of such devices. Further, it is extremely difficult to handle desiccant crystals the way prior art designs are implemented, and powders in a mass-manufacturing environment where the desiccant has to be maintained moisture free and contaminant-free inside a pressurized beverage food inner container is extremely difficult to realize. Thus, a better technology is needed to handle these desiccants separately from the food inner container. Further, the heat absorption potential of desiccants reduces as the vacuum is released and evaporation starts and the process becomes inefficient by itself and becomes limited to the amount of desiccant used.

The problems presented by vacuums, including difficulties in creating and maintaining them and the lack of efficiency have been encountered in other fields as well. An early example can be found in the evolution of Thomas A. Edison's light bulb. His first practical incandescent lamp, for which he received a patent in 1879, included a carbonized bamboo filament contained within an evacuated glass bulb. Although it arguably propelled the world into a new era, it was initially highly inefficient. Then in 1904, European inventors replaced the carbonized bamboo filament with tungsten, and in 1913 it was discovered that replacing the vacuum within the bulb with an inert dry gas doubled its luminous efficiency. Although this field of art is different from the present one, and the technical issues presented were quite different, this is perhaps a thought-provoking example of an advance in product efficiency resulting from the replacement of a vacuum with a dry gas. Dry gas has a dew point temperature, below which it can condense moisture and above which it absorbs moisture. By lowing the dew point of a dry gas to a very low temperature, the dry gas will absorb humidification liquid as it warms up and wants to equilibrate its dew point with atmospheric dew point. Absorption of moisture can substantially lower the temperature of the humidification liquid as well as allow endothermic processes to take place more efficiently. The dew point is independent of temperature and pressure since at any given pressure or temperature the dew point can be achieved when specified for a given gas. Thus a dry gas can be stored at a given set dew point at any temperature or pressure.

In general, these prior art technologies are not cost-effective technologies and they rely on extremely large and complicated canister designs in relation to the beverage food inner containers within which they are contained. In fact, the ratio of desiccant to water is about 3:1 and the ratio of the volumetric loss in such beverage food inner containers is about 40%. The cost of maintaining a desiccant or sorbent in a vacuum, the cost of the food inner container, and the cost of the process of manufacture are prohibitive, despite nearly 20 years of trials. Thus, it is advantageous to reduce the amounts of these components needed and to restructure the manufacturing process to divorce the interior of the food inner container from these chemicals.

Prior art also reveals chemically endothermic self-cooling food inner containers. These rely on the use of fixed stoichiometric reactions of chemicals to absorb heat from the food inner container contents. These prior art technologies require two containers that may be connected by a breakable membrane and other means. They particularly do not allow the sorption of the humidification liquid to be achieved by automatic vacuum generation within the chemical chamber to permit complete solvation and complete use of the maximum surface area available.

The present invention differs from all the mentioned prior art and provides a novel cost effective and thermodynamically simple and viable means for cooling and heating a beverage in a food inner container by using the cooling or heating potential of fixed amounts of reactants A that generate a thermal change and using electromotive force of a dry gas acting on a humidification liquid of suitable choice. Many trials and designs have been made to obtain the present configuration of the disclosed invention.

Prior Research by Present Inventor on Beverage Containers that LED to the Present Invention U.S. Pat. No. 6,065,300 issued to the present inventor on May 23, 2000 shows a configuration in which a plastic container serves the purposes of the inner container, while the outer container is a conventional beverage container of the standard can design.

U.S. Pat. No. 6,418,731B issued to the present inventor on Jun. 16, 2002 also shows a cooling configuration for a beverage in which a plastic container serves the purposes of the inner container, while the outer container is a conventional beverage container of the standard can design. However, in both these patents, a conventional liquified refrigerant gas is used to fill the space between the two containers and serve as a refrigerant. Due to environmental reasons, such gases cannot be used for a self-cooling container.

U.S. Pat. No. 6,817,202 B1 issued to the present inventor on Nov. 16, 2004 and U.S. Pat. No. 6,581,401 B1 issued to the present inventor on Jun. 24, 2003, both illustrate a means of using carbon matrices to store $CO_2$.

U.S. Pat. No. 5,946,930 issued to the present inventor on Sep. 7, 1999, shows how Carbon Fullerene nanotubes can be used to encapsulate $CO_2$ under pressure. These inventions are a precursor to the present invention which uses a dry gas such as $CO_2$, a humidification process in combination with an endothermic or exothermic disintegration of a thermally reactive structure to heat or cool a beverage.

Deficiencies of Prior Art Devices that Use Endothermic and Exothermic Heat Transfer Systems, and Objectives of the Present Invention a) Endothermic cooling and exothermic heating systems of the prior art have a limited potential to solvate and then cause thermal heating and cooling since the solvation energy of the ionizable compounds used, for example, usually depends on the temperature of a solvent such as water. The water acts as humidification liquid to ionize chemicals, and as the ions redeem energy of solvation in endothermic systems, as the solvent cools the process becomes energy deficient, making the process of extraction of solvation energy exponentially slow, and as such, these technologies do not use the full potential of the solvation energy available. For example, to heat or cool 16 oz of beverage by 30° F. one needs to dissolve at least 127 g of potassium chloride in about 380 g of water. This is not commercially viable in a self-cooling food inner container technology that relies only on this process. The present invention overcomes this deficiency by means of an extremely dry gas. Dry gas with a dew point of 10° F. to −150° F. can easily absorb vapor from a humidification liquid that can be cooled to freezing point without a vacuum. The interstitial spaces between granules of thermally reacting chemical compounds used in crystalline form is considerable. As a matter of fact, well over 40% of the free interstitial spaces between such crystalline structures is not used for cooling but contains humidified air. Thus, advantageously, by saturation of these interstitial spaces with an extremely dry gas, a great amount of cooling or heating can be achieved, Further, dry gas simply increases its dew point temperature when it absorbs moisture, while the actual thermometric temperature of the dry gas itself remains constant.

b) Further, stored endothermically reacting chemical compounds used for endothermic cooling with a solvent such as water require a stoichiometric molar ratio with water for the purpose of cooling. The main problem with prior the art is the fact that the water must be allowed to enter into the solutes and dissolve the solute leaving a void where the water is stored as an empty space that serves no purpose whatsoever. Further, the water is allowed to enter into the chamber holding the reacting chemicals and cooling is generated such that the cooling generally occurs at a lower level than the headspace leaving the headspace of the beverage uncooled. Since cold liquids tend to fall to lower levels by gravity, no cooling occurs above the reactant space just below the water top level. This problem is solved by the present invention by means of a dry gas thermally reactive structure infused with trapped dry gas which dissolves in the humidification liquid and generates a dry gas to completely intermingle with humidification liquid into the solutes chamber regardless of orientation of the apparatus in the beverage container. This also allows the cooled solution to be turbulent and complete contact the dry gas chamber walls and thus cool the product more efficiently. Further, all interstitial spaces in the dry gas thermally reactive structure are used for cooling as the solvent is pulled by the dry gas to further absorb moisture from humidification liquid to further cool.

c) The present invention using a thermally reactive structure that can take the form of a cooling or heating structure in a solid thermally reactive block structure that can release a dry gas and efficiently eliminates the need to maintain dry gas at elevated pressures over a long period of time. The thermal changes are generated by the absorption of humidification liquid by thermally reactive structure which then releases a dry gas as an absorbable medium for further thermodynamic heating or cooling. This solves the issue of minimizing the volume occupied by the solute in the apparatus as it dissolves into the solvent.

d) Advantageously, the present invention does not necessarily require complicated methods to introduce water vapor to the reacting chemical compounds. The interesting aspect of the invention is that it allows the apparatus to be sealed by conventional beverage bottling plant seaming means such as with standard canning plant seaming rollers. Further, as an added advantage in some embodiments, the present invention uses only two standard beverage containers to manufacture it, and does not need any further manufactured components other than the dry gas thermally reactive structure and a gas permeable membrane.

Development of the Present Invention and its Essential Components Dry

Gas

Dry gas such as substantially dry air, preferably substantially dry $CO_2$, substantially dry Nitrogen, substantially dry Dimethyl ether, several other types of dehumidified gases such as Solstice® L41y (R-452B), Solstice® 452A (R-452A), Solstice® L40X (R-455A), Solstice® zd, Solstice® ze, (R-1234ze), Solstice® yf (R-1234yf) with very low dew point temperatures can cause extreme cooling or heating.

Dry air in particular can cause extreme cooling as is evidenced by weather patterns that are predominantly driven by the humidity of air and heat energy available in the atmosphere. Not surprisingly, dry air can result in dramatic snow and ice formation, in turn resulting in extreme weather patterns across the world. It is not surprising that lip-balm used for dry lips sells well in winter. From hurricanes to tornadoes, to heavy snow storms, and icy winter storms, nature has provided an amazing electromotive heat transport means that can be emulated to assist in cooling a beverage and a food product using humidification and dehumidification of air. It is my theory that the tremendous vacuous energies of a tornado are a result of the sudden condensation of water vapor from the dehumidification of humidified dry air. Water vapor is 1840 times the volume of the same weight of liquid water, and so when a huge cloud condenses, a tremendous reduction in volume is obtained resulting a vacuum which appears as a funnel cloud of a tornado. No simple wind motion can generate such tremendous energies. Similarly, the humidification of very dry air results in very cold temperatures that results in snow storms. This happens as moisture is picked up by dry air and evaporated to remove heat from the surrounding environment followed by saturation of the same wet air which again deposits its vapor as moisture in as snow and hail.

Water has the best thermodynamic potential to heat or cool a food product. It has the highest heat of evaporation and as such it can be used in combination with electromotive drying and regenerative processes that also rely on water molecules to heat or cool a food inner container. However, water does not easily evaporate due its high heat of evaporation and as such it must be "enticed" to do so by an appropriate means. Further, as water cools, for example in an endothermic reaction, and in a desiccant evaporation system, it becomes more and more difficult to evaporate it. Thus, neither regular endothermic cooling such as in conventional cold packs nor conventional desiccant cooling systems of prior art by themselves prove to be the most efficient forms of cooling a food product such as beverage. The combination of dry gas mediation, and either endothermic or exothermic solvation and the generation of a pressurized dry gas such as $CO_2$ can use the two fundamental substances, water and a dry gas, to effectively increase the thermodynamic potential to heat or cool a food product. However, an inventive step of the interaction of dry gases and a humidification liquid to maximize the heat exchange surface area of the apparatus is intended. Further, the additional inventive step of using standard beverage containers to form the humidification liquid and the dry gas chamber is intended. Further, the additional inventive step of using the solvation of chemicals to generate pressurized dry gas for the purposes of maximizing the contact of cooling means with the beverage container used for the invention is intended.

a) The Thermally Reactive Structure

In the late 1930's, Samuel S. Kistler discovered that when certain substances such as silica dioxide and activated carbon are subjected to high pressure gases at supercritical state, the gases migrate through the pores of the silica and fill the material like a sponge. If the pressure is relieved, then the gases are released from the pores of the structure to gradually leave the unpressurized gas within said pores without fracturing the material. This property made the silica extremely porous and light and imparts amazing properties to the structure thus formed that has been called Aerogel. Aerogel is made of 2%-5% silica dioxide and has an open-pore structures similar to honeycomb. The thermally reactive structure of the present invention is meant to have the desirable properties of storing gases that can be released when need to perform the function of cooling or heating a beverage. However, to effectively create a thermally reactive structure with a pressurized dry gas storage means for release at a prescribed time, simply storing unpressurized gases in a porous structure will not do. It is essential that the gases remain in a pressurized state within the porous structure over time and that a means of preventing these gases from exiting the pores be provided. Therefore, the inventor has developed for cooling purposes of the invention, a means of doing this using a combination of urea U, and other endothermic salts E, that will be described hereunder. For heating purposes, the same process applies with the appropriate choice of a dry gas and exothermic reactants A that form a thermally reactive structure.

In experiments using dry-ice, the inventor found that for cooling purposes, an effective gas storage thermally reactive structure can be made with dry ice pellets and molten urea with certain salts and carbonates. When densely formed dry-ice cylindrical pellets of small dimensions (1 mm dia×2 mm length) are projected at high momentum as projectiles into molten urea, the urea crystallizes over them before they substantially start to sublimate. The electronic rate of recrystallization of urea is far faster than the sublimation rate and has a tremendously stronger bonding strength than the pressure forces exerted by the sublimation of densely packed small sectioned dry-ice pellets. Thus, the dry ice is encapsulated in the crystalline structures that form around them as urea crystals until it sublimes and becomes micro nodules of gaseous and liquefied $CO_2$ encased in the crystalline structure of the urea. The shrinkage of the urea around the gas as crystalline pores formed by the dry gas is even capable of forming extreme Nano-containment pores that hold the dry gas under pressure.

For heating purposes, gases such as dimethyl ether (DME) can be encapsulated in the crystalline structures that is formed from the silica gel crystals, sodium silicate, and ferrous metals, when compressed at very high tonnage above 10 tons to 50 tons of compressive force using a conventional hydraulic press for example. The shrinkage of each of the types of compounds around a suitable dry gas, such as DME forms pores that hold the dry gas, sometimes under pressure. It is important that gas used be a dry gas since any moisture present during the compression molding of the dry gas thermally reactive structure can result in failure of the encapsulation. In both heating and cooling applications, PTFE fibers may be added to the crystals and then compressed in a mold in the presence of a high-pressure dry gas to form the thermally reactive structure.

This is very much the same process as the formation of aqua marine crystals when as the magma cools and solidifies under pressure, water and steam that is trapped does not readily dissolve into the magma and becomes concentrated in cavities of the gem. These pockets eventually crystallize to form a special type of rock called a pegmatite.

Subsequent long-term research by the present inventor shows that $CO_2$ in combination with a storage matrix comprising of one of urea, and urea in combination with activated carbon, PTFE micro fiber cores, and naturally occurring nitrate salts, and carbonates can be used to achieve an environmentally friendly and safe self-cooling apparatus, while a dry gas such as DME in combination with silica gel, sodium acetate, and raw ferrous metals, can be used to achieve a self-heating beverage container. Advantageously, in this new invention, a dry gas can be effectively stored and released in a specially made thermally reactive structure to combine with reactive compounds and achieve either adequate heating or adequate cooling of a beverage.

Firstly, for cooling, the endothermic cooling is enhanced by agitation of the dry gas that is released. Secondly the dry gas absorbs water as vapor and additionally cools the beverage container. Thirdly, the phase change and expansion of the dry gas if in liquified form, when released during the fragmentation of the endothermic thermally reactive structure further cools the product. Fourthly, the entire endothermic thermally reactive structure can be made using conventional manufacturing processes.

Secondly for heating, the exothermic heating is enhanced by agitation of the dry gas that is released. Secondly the dry gas suitably chosen can absorb water as vapor and additionally release heat to heat the beverage container. Thirdly, the absorption of the dry gas by humidification liquid can cause a vacuum in the dry gas during the fragmentation of the exothermic thermal reactive structure, further heats the product by absorption. Fourthly, the entire exothermic form of the thermally reactive structure can be made using conventional manufacturing processes in exactly the same manner as the first case.

By simply changing the dry gas from $CO_2$ for cooling to Dimethyl ether (DME) for heating for example, heating is effectuated by the thermally reactive structure made from one or more of sodium acetate, calcium chloride, silica gel, sodium hypochlorite, and metals when exposed to humidification liquids such as water. DME is a gas that is highly absorbable in water in an exothermic process for example, and generates additional heat in a heating mode of the thermally reactive structure, and so a simple change in reactants A and dry gases can convert a cooling structure to a heating structure.

b) Paired Beverage Containers

The cost of manufactured containers has been reduced by present day technology especially in the beverage industry. The thickness, weight and costs of aluminum beverage containers provide an ideal standard for commercializing a self-cooling and self-heating container. Thus, this invention uses conventionally available elements from the beverage industry to provide for a very efficient and low-cost self-cooling and self-heating container.

Paired containers can be used to form chambers that serve the purposes of a dry gas chamber and a humidification liquid chamber to achieve the goals set forth in the invention. The invention uses paired containers to form an outer container and a inner container. It further uses a conventional lid to completely form a self-cooling and self-heating container. These paired containers being commercially available can be used from the stock of Standard Cans and the Slim cans that are available in the market place. The Standard cans generally come as 12 oz, 16 oz, 19 oz and 24 oz cans. The Slim cans generally come as 12 oz, 8.5 oz and 6.5 oz. The cans generally have similar diameters and vary only in height. Any combinations of a Standard Can and a Slim Can may be used for the purposes of this invention.

For the purposes of this invention, a inner container is required to be inserted snugly through the outer container open rim into the outer container to form an annular space between the two containers that essentially forms the humidification liquid chamber. The cylindrical space between the outer container base dome and the inner container base dome forms a dry gas chamber. A Sealing member structure formed from one of wax, plastic, rubber and putty is preferably used to form a cylindrical fluid barrier between the two containers and thus form the dry gas chamber and the humidification liquid chamber close to the inner container bottom edge and the outer container inner cylindrical wall. Natural waxes are hydrophobic and environmentally friendly and provide a good cheap alternative to welding plastic structures that can separate the two chambers.

c). Combining Dry Gas, and a Thermally Reactive Structure and a Paired Set of Beverage Containers.

A paired set of beverage containers is used to form a beverage chamber, a dry gas chamber, and a humidification liquid chamber simultaneously. In the present invention, the dry gas chamber contains a thermally reactive structure impregnated with a dry gas within a dry gas chamber that is formed between paired beverage containers. The purpose of the thermally reactive structure serves to release dry gas and either heat or cool and additionally to heat or cool the beverage by exothermic and endothermic solvation also and respectively. The thermally reactive structure also serves to heat or to cool the outer container inner cylindrical wall as the thermally reactive structure either dissolves endothermically or absorbs humidification fluid endothermically in the humidification liquid releasing trapped dry gases that further cool or heat the by expansion, phase change, and by absorption and humidification of the released dry gas to cool, and alternatively by absorption of the humidification liquid to heat exothermically. The cooling or heating of the outer container 200 is not a necessary part of the invention, however it provides a physiological advantage that is invaluable as an indicator of the process. Thus, a tremendous amount of cooling or heating can be achieved by this method by using a dry gas and a humidification liquid as compared to a regular endothermic process and compared to a regular absorption process such as using a desiccant alone. Thus, advantageously, there is an inner container and an outer container as a paired set in all cases.

d) The Filtration Membrane

Any process that uses a humidification liquid will have the problem of leaking the fluid when gases escape from the device. Thus, it is imperative that means to prevent the passage of humidification liquid from within the apparatus be considered while still allowing gases to escape from within the apparatus through a vapor passageway. In this invention a filtration membrane is provided. The filtration membrane is a simple thin PTFE membrane that allows gases to pass through while preventing liquids from passing through a vapor passageway. Filtration membranes can be obtained from companies such as Porex, Fluoropore™, and Omnipore™, and Sterlitech, and Membrane solution. The filtration membrane is used to prevent any liquids from passing through a vapor passage way while only allowing gases such as $CO_2$, DME, Solstice Enhance™ to pass through the apparatus to atmosphere from the interior of the outer container. A carbon disc may also be used as a filtration membrane, and in such a case it must be made thin and porous enough to allow gases to pass through its structure while preventing liquids from passing through it. A cheap filtration membrane can be made using VaproShield™ membranes typically used as breathable moisture barriers in homes. VaproShield™ is a very inexpensive moisture barrier that is commercially available and comes in a self-adhesive form that is easy to use as a filtration membrane for the purposes of this invention. Since the exposure time of the liquid used in the invention is minimal, VaproShield™ can be used even when it disintegrates over a period of days after use. These inexpensive membranes are available in large inexpensive sheets from hardware stores such as Home Depot™ and Lowe's™.

The filtration membrane is hydrophobic and thus does not allow liquids to pass through its pores but will allow gases to pass through its pores. The vapor passageway and a filtration membrane thus accord a means of passing a dry gas DG from within a self-cooling and self-heating apparatus to atmosphere without loss of liquid, such as described in this invention.

e) The Sealing Member

The sealing member is a separator between the humidification liquid and the dry gas chamber. In the first and second embodiments, the sealing member may be formed by the outer container, and alternatively as a separate member that forms a seal between the inner walls of the outer container and the sealing member itself to seprate the chambers.

Definitions

The following definitions are generally used to describe some terms used in the present disclosure to describe this invention.

"Filtration Membrane" shall mean a thin hydrophobic membrane disc made from one of Polytetrafluoroethylene (PTFE) and activated carbon, with pore sizes such as 0.05 um, 0.10 um, 0.22 um, 0.45 um, 1 um, 2 um, 3 um, 5 um, for preventing liquid from exiting the apparatus during use while allowing gases to exit the apparatus.

"Dry gas" for the purposes of this application, shall mean a gas with a substantially low partial water vapor pressure with a dew point temperature less than 10° F. that fills interstitial spaces between particles of endothermically reacting compounds. It is noted that the dry gas itself could be liquefied and mixed in with said endothermically reacting compounds;

"Wet gas" for the purposes of this application, shall mean a dry gas humidified to have a higher water vapor pressure than dry gas and a dew point temperature greater than 10° F.

"Dry gas thermally reactive structure" shall mean a composite compressed structure infused with a dry gas either in gaseous form or in liquefied form, and made with materials comprising of a combination of one or more of urea, sodium bicarbonate, acetic acid, potassium chloride, ammonium nitrate, activated carbon, wax and a PTFE fibers.

"Thermally reactive structure" shall mean a granular or solid crystalline structure formed from reactive chemicals that is embedded within a dry gas environment and containing a dry gas in its interstitial structure that either dissolve endothermically or generate heat by interacting with a humidification liquid to endothermically cool or exothermically heat a food product respectively.

"Cylindrical groove" shall mean an inwardly roll formed structure on a cylindrical portion of beverage container wall.

"Food product" for the purposes of this application shall mean any substance that is a consumable item preferably a liquid beverage;

"Dew point temperature" for the purposes of this application shall mean the temperature at which the vapor of a humidification liquid in a sample of dry gas at constant barometric pressure condenses into humidification liquid at the same rate at which it evaporates.

"Headspace" for the purposes of this application shall mean the carbonation filled space in a sealed beverage container that is above the beverage level.

"Heat transport means" for the purposes of this application, shall mean a thermodynamic and electromotive potential to exchange heat between substances;

"Outer container" shall mean a conventional metal beverage container made in the form of a such as containers made by Ball Corporation, and can be made in volumetric sizes ranging from 12 oz to 32 oz and having conventional lid sizes ranging from 202, 204 and 206 specifications for the open end.

"Inner container" shall mean a beverage container that is made to contain a beverage or food product and made in the form of a conventional "Slim Can", a "Sleek Can" and from a "Standard can", such as made by Ball Corporation that snugly slides through the open rim of an Outer container and having conventional 202, 204 and 206 specifications for the open end with a diameter and height less than an Outer container. "outer container" shall mean a beverage container that is made to contain a beverage or food product and made in the form of a conventional "Slim Can", a "Sleek Can" and from a "Standard can" such as made by Ball Corporation, Crown, Cork and Seal Corporation, and other manufacturers. The inner container snugly slides through the open rim of an Outer container and having conventional 202, 204 and 206 specifications for the open end with a diameter and height less than an outer container.

"Sealing membrane" shall mean a thin separator member that can be a membrane made from one of paper, and plastic, and metal foil and forms a non-permanent seal covering a filtration membrane.

"Deformable barrier" for the purposes of this application shall mean any structure made from materials such as a wax, a rubber, a plastic, a rubber tube, a metal used to form a temporarily fluid seal preventing humidification liquid from passing through it and that can be disrupted by
  gas pressure, and by finger and mechanical pressure to open said temporarily fluid seal.

"Collapsible" for the purposes of this application shall mean the reduction in volume of a closed space without a change in the surface area of the walls enclosing said volume.

"Humidification liquid chamber" for the purposes of this application shall mean a space containing humidification liquid.

"Humidification liquid" for the purposes of this application shall mean any liquid that is used to react with endothermically reacting chemical compounds to generate endothermic cooling and such liquid may include water and beverage.

"Mechanical means" for the purposes of this application shall mean any structure needing finger pressure to break a Sealing member's temporary fluid seal.

"Humidification liquid vapor" for the purposes of this application shall mean the vapor of any humidification liquid.

"Dry gas chamber" for the purposes of this application is a functional structure that preferably contains a dry gas and may hold a thermally reactive structure in the form of solids, granules, prills, or liquids within it.

"PVC" for the purposes of this application shall mean heat-shrinkable polyvinyl chloride.

"PET" for the purposes of this application shall mean heat-shrinkable polyethylene terephthalate.

"Upright" for the purposes of this application shall mean vertical orientation.

For orientation purposes and clarity, the food inner container is assumed to be standing in an upright, vertical orientation with the food inner container's bottom resting on a horizontal plane.

This invention uses the thermodynamic potential of a thermally reactive structure in combination with the evaporation or absorption of a humidification liquid such as water, water-ethanol azeotropes, dimethyl ether-water azeotropes, or a suitable liquid and the ability of a substantially low vapor pressure medium such as a dry gas to enhance absorption and reactivity.

OBJECTS OF THE INVENTION

It is a primary object of the present invention to provide a completely environmentally friendly self-cooling and self-heating container that uses Environmentally friendly components.

It is another object of the present invention to provide a method of cooling a beverage container using a novel simple means to remove heat from a food product using dry gas with an endothermic thermally reactive structure.

It is another object of the present invention to provide a method of heating a beverage container using a novel simple means to add heat to a food product using dry gas with an exothermic thermally reactive structure.

It is another object of the present invention to provide a method of assembling the self-cooling and self-heating a beverage container in its completed form using a pair of dimensionally matched aluminum or plastic cans such as the "Slim Can", the "Brite cans" a "Sleek Can" and from a "Standard can" as an outer container.

It is still another object of the present invention to provide an apparatus for cooling or heating a beverage container using conventional filling and seaming means.

It is a further object of the present invention to provide an apparatus that uses the humidification of a substantially dry gas generated by solvation in a thermally reactive structure to absorb and evaporate water from solution to generate cooling of a food product and alternatively to generate heat by absorption of a dry gas and humidification liquid to generate heating of a food product.

It is a still further object of the present invention to provide an apparatus that uses a dry gas to evaporate a liquid to further cool by evaporation.

It is an additional object of the present invention to form a dry gas chamber and a humidification chamber by means of jointly seaming a conventional beverage lid with a score portion and an opening means, such as a 202, a 200, or a 204 beverage-lid with a standard beverage container to form outer container that concentrically surrounds a inner container to form a humidification liquid chamber and a dry gas chamber simultaneously.

It is an additional object of the present invention to form a dry gas chamber and a humidification chamber by means of gluing and also by means of welding a standard beverage container with a conventional inner container to form a humidification liquid chamber and a thy gas chamber simultaneously.

It is a still additional objective of the present invention to form a Sealing member between a dry gas chamber and a humidification liquid chamber for the purposes of the present invention by roll-forming the diameter of a portion of a standard beverage container acting as an outer container at some location around its cylindrical wall to form a snug diametric fit against the outer surface of a diametrically smaller diameter standard inner container.

It is a yet additional object of the present invention to form a separation as a Sealing member between the dry gas chamber and the humidification liquid chamber by melting and cooling either a wax or soft molten plastic and rubber.

It is still additional object of the present invention to use a gas-liquid separation membrane such as a POREX Corporation PM17Y and PM10Y discs membranes, Membrane Solutions liquid barrier films, Fluoropore™ and Omnipore™ Disc membranes, Membrane Solutions, and Sterlitech Corporation disc membranes, to prevent humidification liquid from exiting the apparatus at any time while allowing only gases to exit the apparatus.

It is an object of the present invention to provide an apparatus that is thermodynamically simple, viable, and cost effective for adding heat to a food product and thereby heat the same.

It is finally an object of the present invention to provide an apparatus that is thermodynamically simple, viable, and cost effective for removing heat from a food product and thereby cooling or heating the same.

SUMMARY OF THE INVENTION

The present invention accomplishes the above-stated objectives, as well as others, as may be determined by a fair reading and interpretation of the entire specification.

An apparatus for chilling beverages and other food products includes a inner container for containing a food product and having a rim and a side wall and a base dome, and an outer container having an open rim, and a side wall and a base dome, and a lid with a release port and release port opening means, where the inner container is snugly fitted into the open rim of the outer container and has a height less than that of the outer container so that there is a cylindrical space between the inner container base dome and the outer container base dome defining a dry gas chamber containing a dry gas and a thermally reactive structure, and where the diameter of the inner container cylindrical wall is less than the diameter of the outer container cylindrical wall so that there is a radial space between the inner container cylindrical wall and the outer container cylindrical wall defining a humidification liquid chamber containing a humidification liquid, and a barrier between the dry gas chamber and the humidification liquid chamber, which can be deformed and opened by compressing and releasing the outer container cylindrical wall to permit the humidification liquid and dry gas to mix and thereupon endothermically cool the food product inside the inner container.

Another embodiment of the apparatus reverses the chambers, so that the humidification liquid chamber is defined by the space between the container domes and the dry gas chamber is defined by the radial space between the container cylindrical walls. For both embodiments, the barrier preferably is formed of wax or a similar substance. The thermally reactive structure in the dry gas chamber is impregnated with a dry gas.

BRIEF DESCRIPTION OF THE DRAWINGS

Various other objects, advantages, and features of the invention will become apparent to one skilled in the art from the following discussion taken in conjunction with the following drawings representing the preferred embodiments of the invention, in which.

DESCRIPTION OF THE PREFERRED EMBODIMENTS

Figure 1:
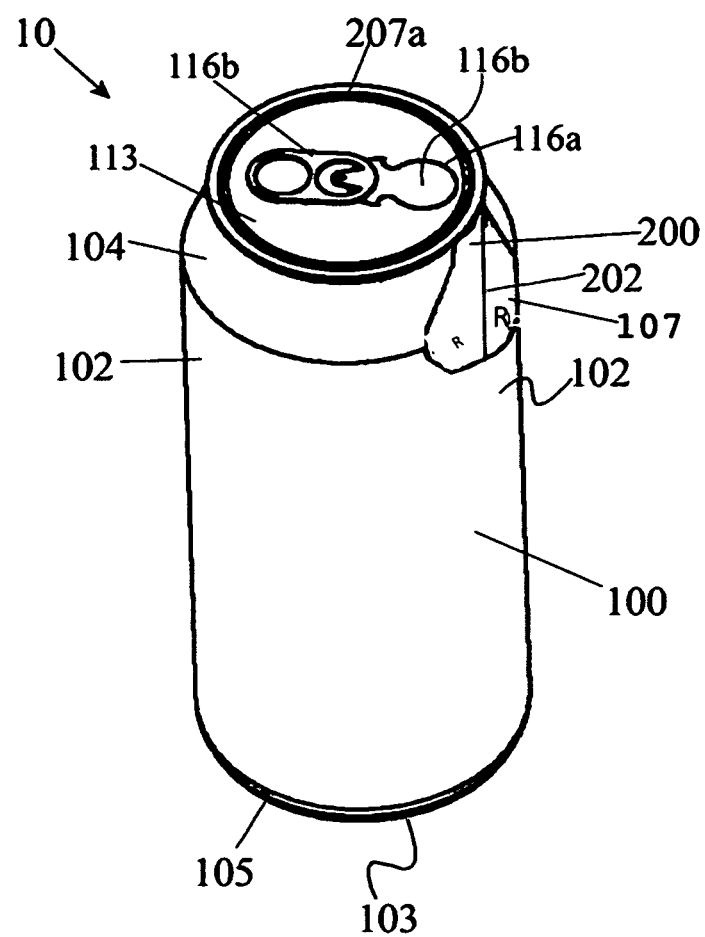
FIG. 1 shows the apparatus according to the embodiments of the invention. A standard metal beverage container in the form of a standard beverage can is shown as an outer container of the apparatus. The inner container is shown intimately sealed with the outer container by a beverage container lid to form a cylindrical chamber holding a thermally reactive structure however, the inner container 100 may already be filled and sealed and ready to be consumed when it is inserted into the outer can and may be crimped at a later stage.

As required, detailed embodiments of the present invention are disclosed herein; however, it is to be understood that the disclosed embodiments are merely exemplary of the invention which may be embodied in various forms. Therefore, specific structural and functional details of apparatus 10 disclosed herein are not to be interpreted as limiting, but merely as a basis for the claims and as a representative basis for teaching one skilled in the art to variously employ the present invention in virtually any appropriately detailed structure. For purposes of description, the outer container and the inner container shall and may be referred to jointly as the "containers".

Reference is now made to the drawings, wherein like characteristics and features of the present invention shown in the various FIGURES are designated by the same reference numerals.

For orientation purposes and clarity, the Apparatus 10 is assumed to be standing in a vertical orientation in a normal placement orientation of a beverage container of the conventional kind. This invention uses the thermodynamic potential of a thermally reactive structure in a dry gas environment and a humidification liquid to heat or to cool a food product.

First Embodiment of the Present Invention and Method of Manufacture

Referring to FIGS. 1-11, a first embodiment is disclosed as an apparatus 10 for cooling and heating beverages and other food products, including two beverage containers with matched sizes, namely, an outer container 100 and a inner container 200. The inventor has discovered that two conventional beverage containers, the outer container being either a standard container of a 202 lid-size, and the inner container being a standard container of a 200 lid-size, have such matching sizes. The outer container 100 and the inner container 200 are chosen such that the outer diameter of the inner container 200 fits snugly through the outer container open rim 106 which has a slightly larger diameter than the inner container outer cylindrical wall 202. The inner container 200 is chosen to have a height that is less than that of the outer container 100.

Figure 2:
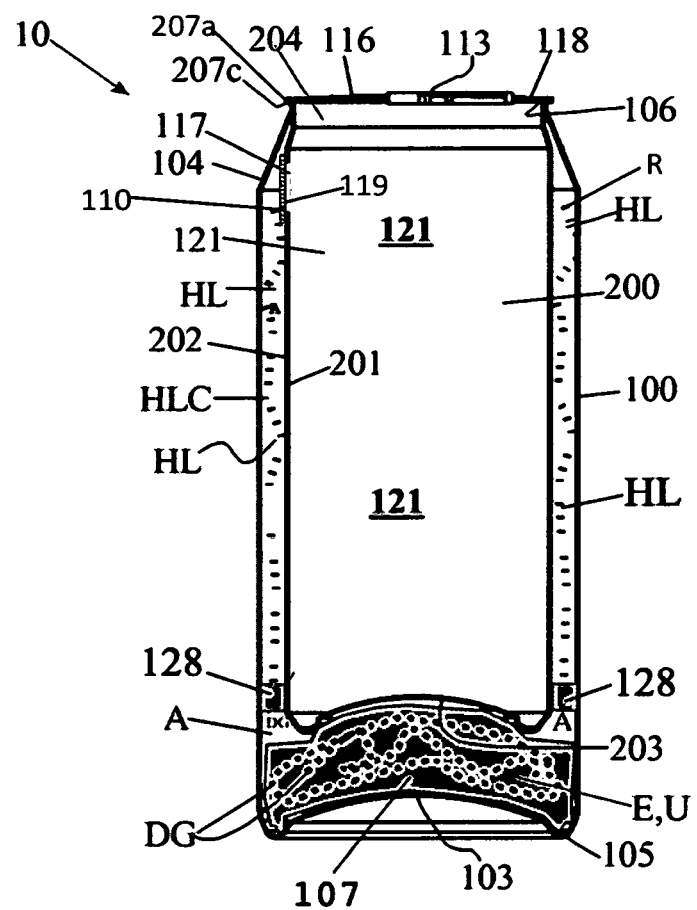
FIG. 2 shows a cross-sectional view of the apparatus according to the first embodiment comprising a humidification liquid chamber containing a humidification liquid, a dry gas chamber containing a cooling and alternatively a heating structure. The dry gas chamber is shown as being a concentric chamber between the inner container and the outer container. A Sealing member made from one of a deformable wax, plastic, silicone rubber, and putty is shown separating the dry gas chamber from the humidification liquid chamber. The Sealing member can be partly rigid and partly resilient to compressive forces such that the resilient portions such as a tube portion can be compressed and expanded to close or open the humidification liquid chamber to the dry gas chamber.
Figure 3:
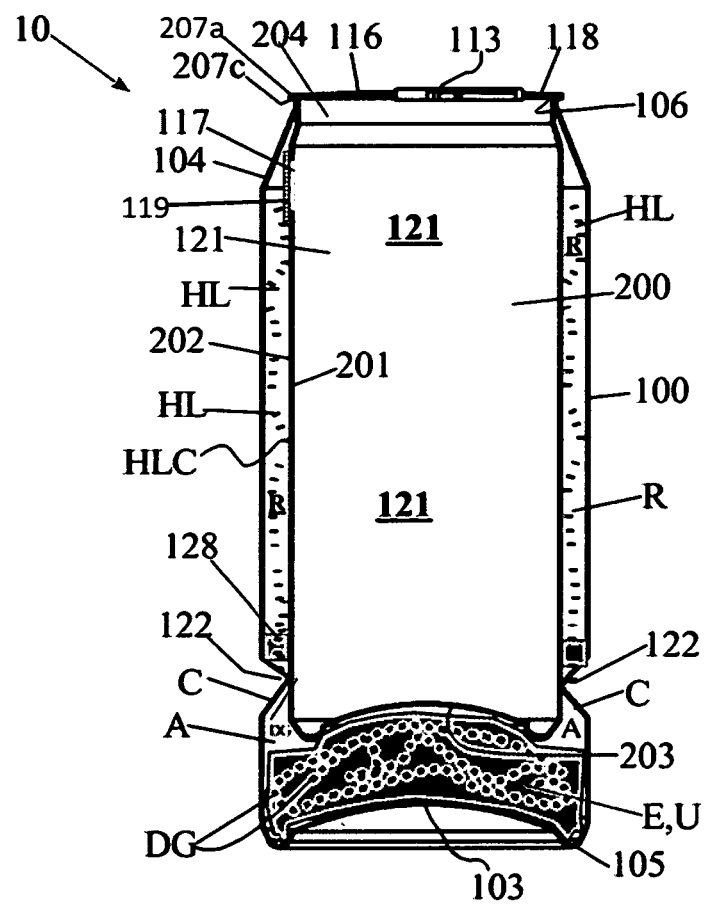
FIG. 3 shows the apparatus according to the second embodiment of the invention. An outer container is shown as with an inwardly rolled portion forming a barrier between the humidification liquid and the dry gas chamber against the inner container. A humidification liquid chamber containing a humidification liquid is shown as a concentric space between the two containers. The thermally reactive structure is shown in the dry gas chamber in the space between the base of the inner container and the base of the outer container.
Figure 4:
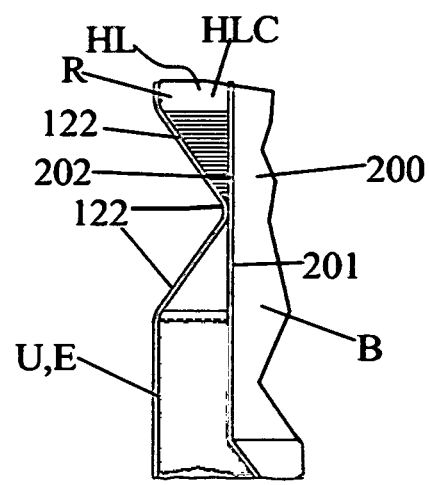
FIG. 4 shows a partial cutaway section of the interconnection structure with the Sealing member filling a portion of the interconnection structure that connects to the humidification liquid chamber according to the first embodiment of the invention. The configuration shows the apparatus before the beverage container is opened.

As shown in FIGS. 1, and 2, the gap between the longitudinal heights of the outer container base dome 103 and the longitudinal height of the inner container base dome 203 forms a cylindrical space A between them. The gap between the radial diameter of the outer container cylindrical wall 111 and the radial diameter of the inner container cylindrical wall 201 forms an annular space R between them. The cylindrical space A forms a dry gas chamber DGC that will hold a thermally reactive structure 107 impregnated with a dry gas DG, and the annular space R forms the humidification liquid chamber HLC that will hold a humidification liquid HL.

Figure 11:
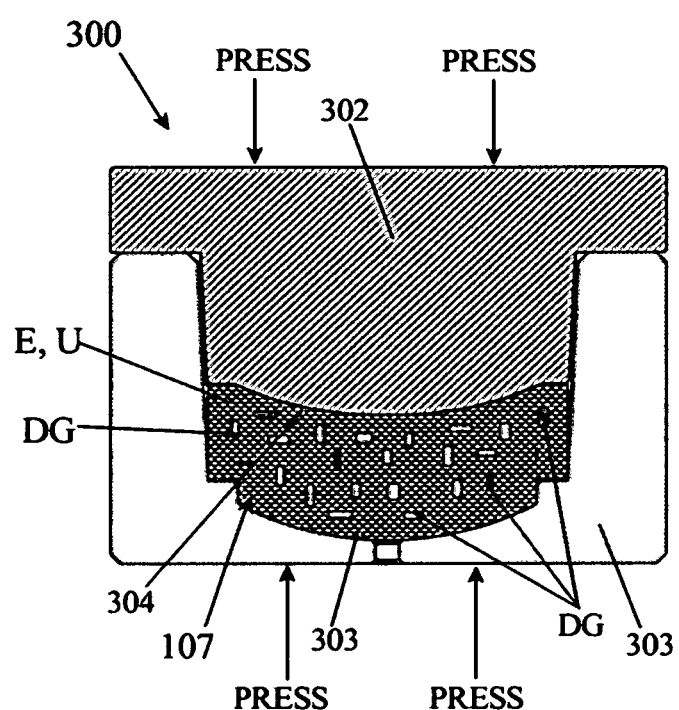
FIG. 11 shows an example of a mold to form the thermally reactive structure by using a press to compression mold it.

The first step in assembling the apparatus 10 is to form the thermally reactive structure 107. The first method of forming the thermally reactive structure 107 is by means of compressing the thermally reactive structure with a chemical that is either exothermic or endothermic when a humidification liquid such as water is added to it. For example, in the case of a cooling thermally reactive structure, a mixture of dry-ice pellets that are densely packed with crystalline urea, nitrate salts and sodium bicarbonate and other acid salts, and is compressed in a mold 300 by a 10-50 Ton press to form the desired shape and size of the thermally reactive structure 107. Other endothermic salts and gases may be added to the urea U to enhance the thermodynamic properties of the thermally reactive structure 107. For a cooling structure for example, dry ice pellets may be used. The dry ice pellets are commonly made for industrial use and the density of the packing of the dry ice determines its sublimation rate and eventually its life span as a solid. It is thus important that the dry ice to be used for making a thermally reactive structure 107 that is very dense. If prepared in small batches, a mold 300 acts as a high-pressure molding vessel with a re-sealable closure. See FIG. 11. The mold cavity 301 must be a relatively strong and able to withstand high pressures. A dry gas DG feeding valve and a dry gas DG release valve may be provided in the mold cavity 300 to allow high pressure dry gas DG to enter into the mold cavity 301. Mold cavity 301 must be made of a suitable metal such as stainless steel. The mold cavity 301 is a two-part mold with a male mold 302 and a female mold 303 to form the thermally reactive structure 107 by compressing the urea U with the endothermic salts E. It is desirable that the two cavities be machined to form a mold cavity 301 that closely fits the shape and size of the dry gas chamber DGC longitudinal cylindrical space A between the two containers 100 and 200. As such the mold 300 must have a dome cavity that matches the inner container base dome 203, and a reverse dome cavity that matches the outer container base dome 103. An example of such a mold 300 and a mold cavity 301 is shown in FIG. 11.

The shape of the mold cavity 301 is designed to maximize the volume of the thermally reactive structure 107 such that it fills the dry gas chamber DGC according to the first embodiment as shown in FIG. 2. The thermally reactive structure 107 can also be formed in any shape or size as long as it can be configured to maximize its volume in relation to the dry gas chamber DGC.

The mold cavity 301 can be heated and lined with a release agent such as a suitable oils for easy release of the compression-formed thermally reactive structure 107 by coating inside the mold cavity 301. The general thickness and shape of the thermally reactive structure 107 for the first embodiment is determined by the differences in height between the inner container 200 and the outer container 100. A general difference of about 1 inch between the standard beverage containers is provided for example, by the readily available cans such as the 8.5 oz 200 Slim Can™ for the inner container 200, and the 12.0 oz 202 either standard or Slim Can™ for the outer container 100, both manufactured by Ball Corp™ and other canning companies. For example, the inner container 200 can be chosen to be an 8.5 oz Slim Can™ with a 200-neck configuration with the chosen outer container 100 being to be a 12 oz standard can or a 12 oz Slim Can™ with a 202-neck configuration.

The thermally reactive structure 107 also may be formed by compressive molding in the manner prescribed above and then broken up into granular form so that it can be poured into the outer container 100 to form the apparatus 10.

Another method of forming the thermally reactive structure 107 for cooling purposes is by using endothermic salts E and carbonates and adding one of Polytetrafluoroethylene (PTFE) fibers and activated carbon, in combination with organic salts such as one or more of Sodium Chloride, Potassium Chloride, and in some cases with Sodium Bicarbonate and acetic acid granules to form the thermally reactive structure 107. The PTFE fibers can be replaced with activated carbon, and fullerene nanotubes, however, PTFE fibers are more effective in application and are preferred for cleanliness. PTFE and other media that can absorb $CO_2$ to make the thermally reactive structure 107 semi-porous for storing gases and also providing a porous substrate for water. Water easily dissolves the thermally reactive structure 107 by opening the pores formed by compression to release trapped dry gas DG. As an example of a cooling application, the mixtures of urea with the PTFE fibers and salts and carbonates can be varied to various proportions as shown as an example in the table below.

| Urea range | PTFE, activated carbon, range | Salts and carbonates range |
|---|---|---|
| 60%-80% | 2% | 38%-18% |

The mixture is generally mildly heated in the mold 300 or extrusion cavity to a temperature of 110° F.-130° F., at which point the urea is soft for extrusion and protrudes through a nozzle under pressure as a white non-Newtonian fluid without decomposition. Dry gas such as $CO_2$ is introduced under a pressure of about 820 psi and greater, and even to supercritical pressures into the extrusion or mold cavity 301. The dry gas DG is infused into the mold cavity 301 to mix with the urea U by slowly compressing the dry gas DG through the granules of urea U as micro bubbles through the mold cavity 301 using a slow-release control valve. Thus, dry $CO_2$ for example can be pressurized into the soft urea U mixture through the mold cavity 301 to generate the heat required to infuse the urea U granules with Dry gas DG, without heaters. A cooling coil (not shown) may be used to pass cooling media such as cooled air, cooled water, and a cryogenic liquid through the mold cavity 301 to rapidly cool the urea and encapsulate the dry gas DG inside the urea interstitial spaces and inside the PTFE fibers and activated carbon granules as a sorbent. Urea U has a density 1.32 g/cc while PTFE has a density of 2.2 g/cc. at 271.4° F., the density of liquid $CO_2$ is about 0.76 g/cc. Thus, $CO_2$ is the lightest compound of the mixture and will tend to migrate in a vertical, upward direction through the compressed structure when introduced at the lowest point of the mold cavity 301 where the concentration of PTFE fibers is maximum due to their higher densities.

As an example of a heating application, the mixtures of silica gel with the PTFE fibers and sodium acetate, calcium chloride, silica gel, sodium hypochlorite, and metals are mixed in proportions that can be varied to as shown as an example in the table below by adjusting the range of different components to form 100% of the mixture.

| Silica Gel range | Calcium Chloride | PTFE, activated carbon, range | sodium acetate | Metals | sodium hypo-chlorite |
|---|---|---|---|---|---|
| 40%-60% | 10%-30% | 2% | 10%-20% | 1%-5% | 10-20% |

The desired mixture is generally put in the mold 300 or extrusion cavity to a temperature of 100° F. at which point the vapor is expelled without decomposition. Dry gas DG, such as Dimethyl Ether (DME) is introduced under a pressure of about 200 psi and greater, over the extrusion or mold cavity 301. The dry gas DG is infused into the mold cavity 301 to mix with the mixture by slowly bubbling the dry gas DG through the mold cavity 301 using a slow-release control valve. Preferably, the range of diameters of the holes of dry gas DG are as small as 100 microns to 200 microns, and as such they may be laser perforated through the mold 300, if desired. It is important that the mold cavity 301 holes be small enough not to allow the passage of the thermally reactive structures reactant mixture A, through them, but can allow the free passage of dry gas DG. As before, a cooling coil (not shown) may be used to pass cooling media such as cooled air, cooled water, and a cooling liquid through the mold cavity 301 to rapidly cool the mixtures of one or more of sodium acetate, calcium chloride, silica gel, sodium hypochlorite, and metals, to encapsulate the dry gas DG inside the mixture.

It is known that PTFE fibers and activated carbon encapsulate liquid $CO_2$ at a molecular level. If left by themselves, however, the $CO_2$ will eventually migrate through their pores and dissipate to atmosphere, achieving very little storage. PTFE and activated carbon hollow fibers have facilitated $CO_2$ capture in other applications and their affinity to repel water makes them attractive in such $CO_2$ storage applications, where water vapor otherwise tends to fill the pores of other storage medium fibers in place of the $CO_2$. It is thus important that the dry gas DG, such as DME and $CO_2$, be dried to a low dew point preferably below 10° F. to avoid storing water in the interstitial spaces of the thermally reactive structure 107. Otherwise, the storage capacity of the thermally reactive structure 107 will be less than 10% of its available storage capacity at room temperature and at a normal atmospheric humidity of 50%. A random orientation of the micro-PTFE fibers facilitates and allows the dry gas DG to easily interact and be trapped within the PTFE fibers as it migrates through the thermally reactive structure 107. Thus, the pores of the PTFE fibers and the urea U in the thermally reactive structure 107 form crystalline blocked fiber cores encapsulating dry gas DG such as DME and $CO_2$, as the thermally reactive structure 107 cools and crystalizes around the fibers. The dry gas DG is substantially dried to the low dew point by removing water vapor from it. Dry gas DG does not mean non-liquefied $CO_2$, and one familiar with the term will know that dry $CO_2$, for example, can be liquefied but contains little or no water. The dry gas DG is substantially dried by flowing it through a desiccant bed to remove as much water as possible, and in this case, the dry gas DG is passed through a desiccant bed of silica crystals repeatedly and over a period of time to remove all moisture. Dry gas DG can also be created by evacuation at low pressures, to allow water vapor to condense from it. Standard beverage plants and several factories use substantially dry $CO_2$ for carbonation of soda and beers. Water can reduce the capacity to store dry gases in such structures, and thus the removal of as much water as possible helps achieve the aims of the invention. Further, the dry gas DG is needed to effectuate further heating or cooling by absorption of water and humidification of the dry gas during operation of the apparatus 10.

Studies by the inventor on cooling forms of the thermally reactive structure show that when the ends of a tube holding liquefied substantially dry $CO_2$ are plugged with compressed and recrystallized molten urea U, the solidified crystals are capable of withstanding the critical pressures of the liquefied dry gas DG, even at large diameters of blockage. When the Urea is dissolved, some of the dry gas DG that has migrated into the urea U is also released with endothermic cooling. This property of urea is similar to the property of PTFE fibers, which can also store gases such as $CO_2$ when under some pressure. The problem of dry gas DG storage lies in the further migration of the gas to atmosphere as time passes. This problem can be solved by encapsulating the dry gas DG using a small percentage of PTFE fibers trapped inside recrystallized urea U granules or prills, forming bounded containments. Thus, extruding or molding a mixture of softened urea U, PTFE, and endothermic salts E with a dry gas DG such as $CO_2$ and then recrystallizing the urea U rapidly in a mold cavity 301 greatly facilitates dry gas DG capture, entrapping the dry gas DG for long term use. Also, exposing the urea mixture under pressure to a very dry gas over a period of time, allows nearly all water vapor to be removed from the urea prills and replaced with a dry gas DG.

In the cooling applications, the purpose of the endothermic salts E is to rapidly thermophilically disintegrate the thermally reactive structure 107 as they dissolve in humidification liquid HL forming cavities and pores which allow easy access for more water molecules to enter the thermally reactive structure 107. The endothermic salts E, may not be necessary if the disintegration of the urea U can occur quickly. Advantageously, the endothermic salts E can be chosen to also dissolve endothermically, allowing further cooling effects to be achieved in addition to the cooling effect effectuated by dissolving Urea U in water. The thermally reactive structure 107 can thus be formed in this manner in any desired shape to be used to heat or cool the apparatus 10.

Advantageously, the thermally reactive structure 107 can be made in the form of longitudinal segments of a cylinder to occupy the space R as semi-flexible thick membranes that can be wrapped into a cylinder and placed into the outer container 100, to expand and abut outer container inner cylindrical wall 101 and to surround the inner container cylindrical wall 202 outer surface. It is also possible to mold form the thermally reactive structure 107 by pouring its molten state on a fibrous open-celled sheet material such as a porous foam or a highly absorbent paper tissue to allow it to be flexible and contiguous.

In the case of a heating function for the thermally reactive structure, the same process is used as before for the cooling version, by simply replacing the endothermic reactants A with exothermic reactants, A, such as a sodium hypochlorite, metals, desiccants, silica gel, and sodium acetates, a dry gas DG such as DME that heats up upon absorption by the humidification liquid HL.

The second step in assembling apparatus 10 according to the first embodiment, as shown in FIGS. 1-11 is to form a vapor passageway 119, comprising a small hole of dimensions between $\frac{1}{8}^{th}$ of an inch to $\frac{1}{2}$ an inch in diameter is made through the inner container cylindrical wall 201, preferably at the highest possible location on the outer container cylindrical wall 101 preferably through the conical neck 104. The vapor passageway 119 can also be made by laser perforation of the container cylindrical wall 201 to create several small holes about 2-5 microns in diameter, instead of a single large hole. The purpose of the vapor passageway 119 is to allow effluent dry gas DG, to exit the apparatus 10 to atmosphere to avoid pressure build up within the apparatus 10 as dry gas DG is generated during operation of its intended purpose. The vapor passageway 119 may not be necessary if the volume of dry gas DG that is stored in the thermally reactive structure 107 will not generate a pressure greater than ¼ psi. As noted above, a preferred location for the vapor passageway 119 is at about 8 mm from the container open rim 106. Preferably, the vapor passageway 119 is placed to avoid any possibility of contamination between the beverage B in the inner container 200 with the thermally reactive structure 107. Yet again, in other instances, the vapor passageway 119 can be made through the outert container outer wall 101 and additionally through the beverage container lid 113. The vapor passageway 119 communicates fluidly with gases and with and exception to liquids between atmosphere and the dry gas chamber DGC of the apparatus 10. Alternatively, and advantageously, the vapor passageway 119 can be made on the outer container 100 to allow communication with the atmosphere. If the pressure of the stored Dry gas DG in the thermally reactive structure 107 is well contained and does escape entrapment, then the vapor passageway 119 can be made through the inner container 200 to allow communication with atmosphere when the thermally reactive structure 107 dissolves and releases Dry gas DG and only when the inner container lid opening means 116 is opened.

The apparatus in all its embodiments also comprises a sealing member structure 128. Sealing member structure 128 may be made from a suitable wax, a plastic material, a putty, a membrane, or grease. Its purpose is to seal off the humidification liquid chamber and not allow humidification liquid to pass through from the humidification liquid chamber to the dry gas chamber. Hence its seals off the space A from the space R. Sealing member structure 128 must be easily configured to change to a non-sealing configuration by either finger press actuator force F, or simply by pressure. As such it must be a durable and reconfigurable material.

As shown in FIGS. 3-6, an indented annular groove 122 may be made on the outer container wall 101 to close off space A from space R and form the dry gas chamber DGC and the humidification liquid chamber HLC respectively. Indented annular groove 122 is simply a means of reducing the amount of material used to form the sealing member structure 128. This facilitates recycling since the sealing member structure 128 may be reduced to a just a sealing film, grease, wax, putty, or completely eliminated by making indented annular groove 122 seal against inner container outer cylindrical wall 202 to form a sealing structure 128. At least one of the dry gas chamber DGC and the humidification liquid chamber HLC is in thermal communication with the inner container 200.

The next step in manufacturing and assembling the apparatus 10 according to the first embodiment is to insert the thermally reactive structure 107 into the outer container 100 to sit on the outer container base dome 103. If molded, the thermally reactive structure 107 should be formed to take the shape of the outer container base dome 103 and occupy as much space as possible in the cylindrical space A when the two containers are eventually mated. If formed as a granular structure, the thermally reactive structure 107 is simply poured onto the outer container 100 to rest in the cylindrical space A on the outer container base dome 103. In both cases, a sealing member structure 128 is poured or positioned to form a seal between the two containers along the indented annular groove 122 over the thermally reactive structure 107 to form space A as shown in FIG. 2 and forming a Dry gas chamber DGC with the thermally reactive structure 107 therein.

An inner container is provided. Inner container 200 can be prepared as either a filled and sealed beverage container, sealed by conventional means with a beverage lid, or as an empty beverage container 200 without a lid made to be able to co-seam and seal with a single lid with the outer container 100 as shown in the FIGS. 1, and 2.

Figure 17:
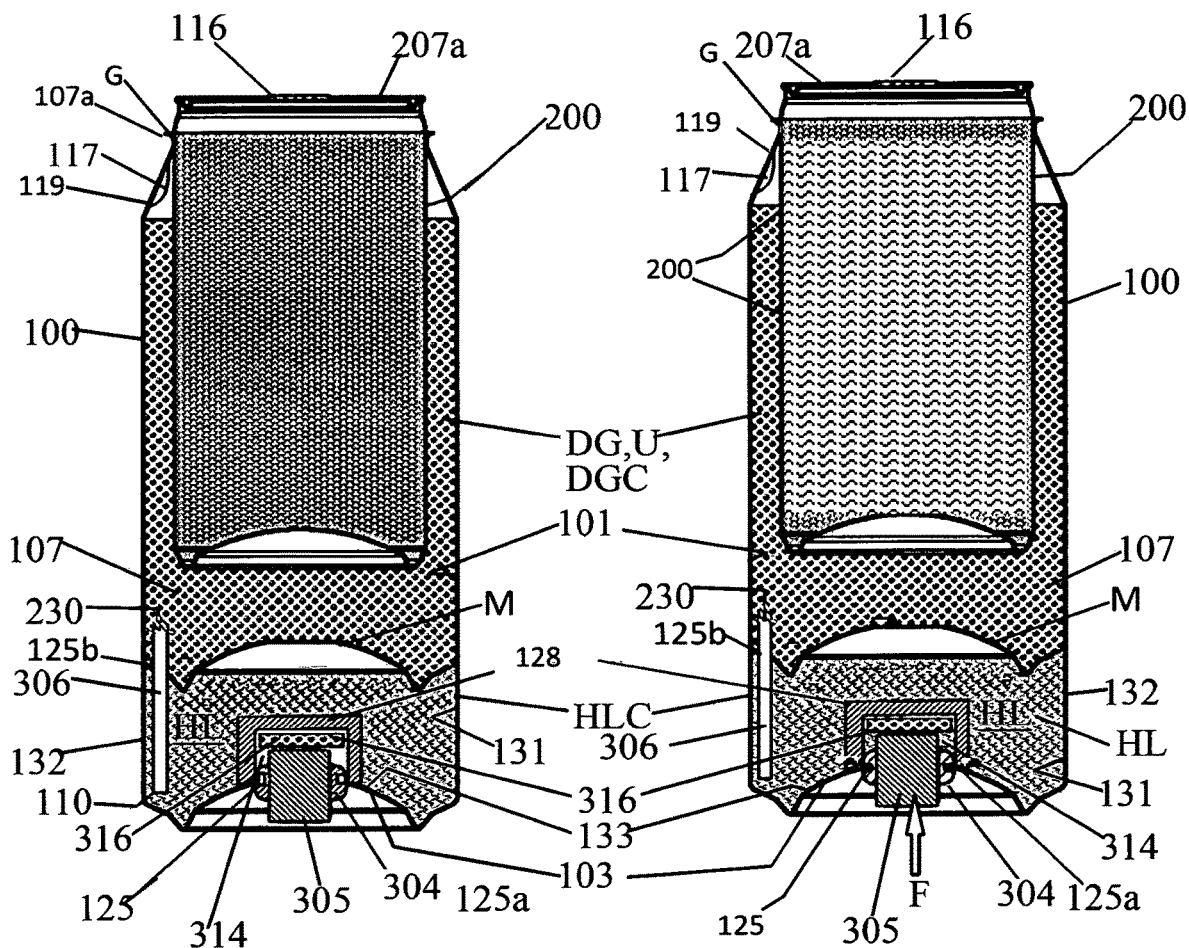
FIG. 17 is a sectional view of an embodiment anticipated by the present invention. Again, a simple rubber grommet acts as a seal for a tablet chamber and a Finger press actuator. When the finger press actuator is depressed with a force F, as shown in the cross section to the right of the figure, it pushes the tablet chamber and dislodges its seal with the grommet exposing the tablet to humidification liquid as shown. Humidification liquid dissolves the thermally reactive structure of the tablet to generate a gas such as CO2. The gas then acts to pressurize the humidification liquid chamber and push humidification liquid into the dry gas chamber through a tube member.

In the case when the inner beverage container 200 is filled and sealed, the next step in assembling the first embodiment of apparatus 10 is to slowly insert the filled inner container 200 through the outer container open rim 106 until it is cylindrical wall is at the flange of the outer container 100. In this case, the two containers are welded together with ultrasonic welding, and by a glue bond G, between their uppermost surfaces of inner container cylindrical wall and the outer container open rim cylindrical walls as shown in FIG. 17 of the second embodiment.

In the case when the inner container is unfilled with beverage B, the inner container sealing flange 207a rests on the outer container sealing flange 207c. In such a case, the inner container sealing flange 207a must be made to match and evenly rest on the outer container sealing flange 207c. Since the containers are accurately matched for the inner container 100 to sealing slide into the outer container 200, during this insertion process, gases inside the outer container 200 will build up pressure and rise and pass through the vapor passageway 119 and through the filtration membrane 117 to atmosphere. When fully inserted, the annular space R between the outer container 200 and the inner container 100 forms a humidification liquid chamber HL in the annular space R as shown in FIGS. 1, and 2.

The next step in the assembly and manufacturing process of the first embodiment is to pour a prescribed amount of humidification liquid HL, preferably water, through the vapor passageway 119 into the annular space R between the two containers through the vapor passageway 119. The amount of humidification liquid HL must be enough to just fill the annular space R between the containers 100 and 200. The humidification liquid HL is poured into space R to fill above the sealing member structure 128 and fill the annular space R between the containers 100 and 200 above the thermally reactive structure 107.

Next, a filtration membrane 117 preferably made from a thin hydrophobic plastic disc of Polytetrafluoroethylene (PTFE) with pore sizes such as 0.05 um, 0.10 um, 0.22 um, 0.45 um, 1 um, 2 um, 3 um, 5 um, is attached by a strong hydrophobic and water compatible adhesive to cover over the vapor passageway 119 either on the inside or the outside surface surrounding the vapor passageway 119. To form the dry gas chamber DGC in the space R. If the filtration membrane 117 is made by laser perforations, then it becomes part of the either the wall of the inner container 201 or the wall of the outer container 101. Preferably, an adhesive perimeter is provided on the periphery of the filtration membrane 117 so as not to cover and seal off the filtration membrane 117. The periphery of the filtration membrane 117 also may be welded by thermal or ultrasonic welding to cover over the vapor passageway 119. The attached filtration membrane 117 must be able to withstand pressures greater than carbonation pressures of about 60 psi. In the case when the vapor passageway 119 is placed on the inner container cylindrical wall 201, the filtration membrane 117 must be large enough to allow the free flow of dry gas DG through its pores without stressing the walls of the inner container 200 with back pressure otherwise back pressure may crush the walls of the inner container 200. A multiplicity of vapor passageways 119 may also be placed or made by perforation through on both the inner container 200, the outer container 100, to reduce the back pressure of dry gas DG and prevent it from collapsing the inner container 200 walls.

Figure 7:
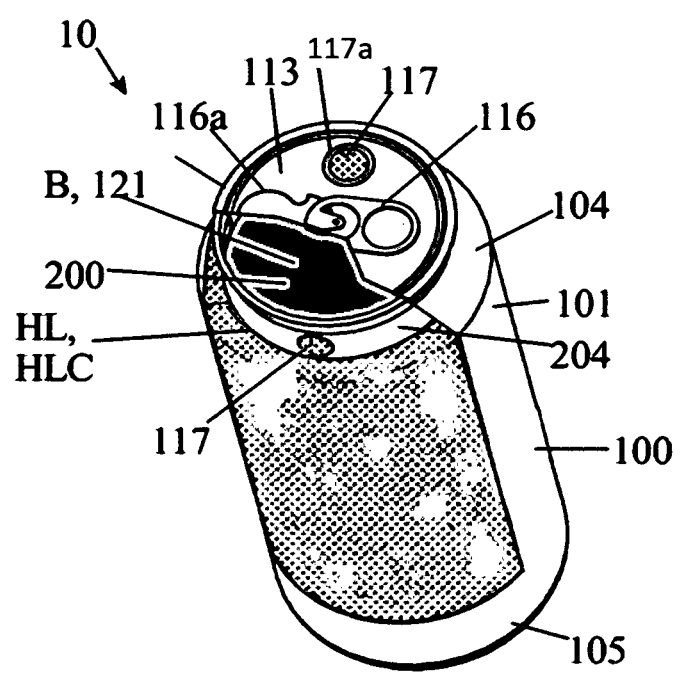
FIG. 7 shows a partial cut away view of the outer container according to the second embodiment of the present invention, with the dry gas chamber filled with a thermally reactive structure in the form of a cylindrical structure surrounding the inner container. Filtration membranes are shown attached to the inner container and also on the beverage container lid.
Figure 8:
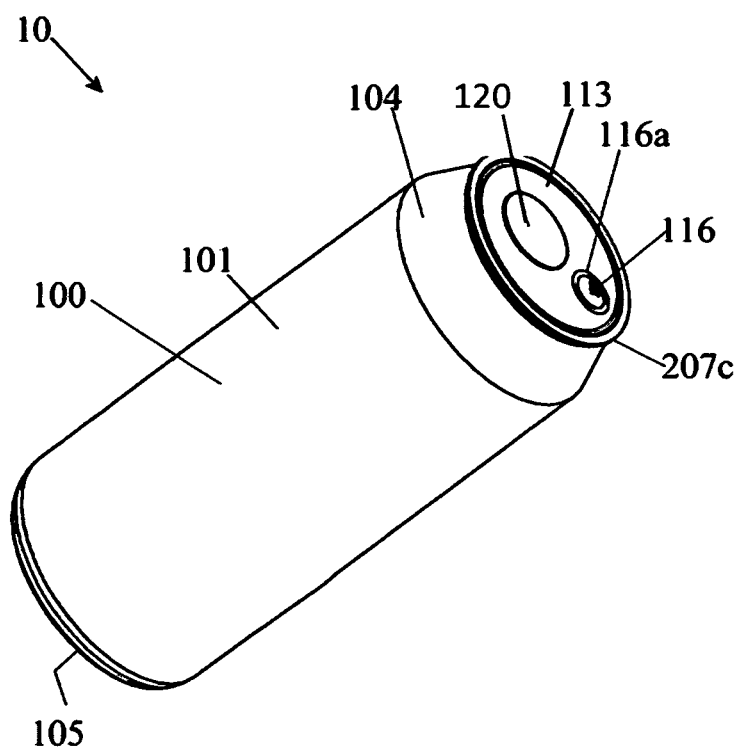
FIG. 8 shows a disc pressure release opening means for the apparatus that consists of a disc sealing an opening on the lid. The high pressure of the carbonation prevents easy opening of the pressure released opening means to prevent opening of the inner container and thus prevent a sudden loss of carbonation pressure that can cause the collapse of the inner container walls.
Figure 9:
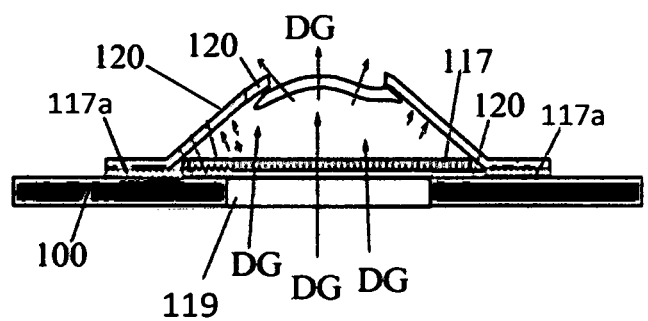
FIG. 9 shows a partial cross-sectional view of the filtration membrane covered by a sealing member that has been ruptured by dry gas pressure. The sealing member can also just be dislodged from a sealing position over the filtration membrane to allow dry gas to escape to atmosphere.
Figure 10:
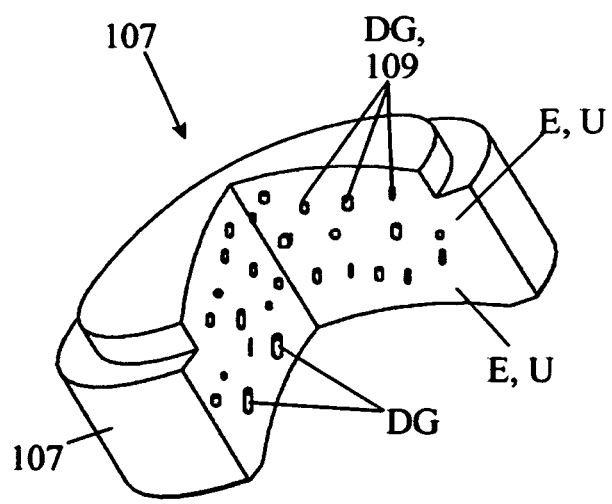
FIG. 10 shows a cross section of the thermally reactive structure with the dry gas trapped in the crystalline structure by compression molding.

Preferably the filtration membrane 117 is a thin membrane of a thickness less than 5 mills, and about 5 mm to 50 mm in diameter, and has a burst pressure of above 80 psi and can also adequately withstands the pressures that are generated when the apparatus 10 is in operation, releasing $CO_2$ to atmosphere. Filtration membrane 117 has a thin peripheral glue lining 117a that holds it in place. As shown in FIGS. 7 and 9, glue lining 117a should be strong enough to prevent carbonation pressure $P_b$ to dislodge the filtration membrane 117. However, the filtration membrane 117 may take on any suitable shape whatsoever. The pore size for the filtration membrane should be no less that 1 micron and no more that 5 microns. In all cases, the filtration membrane must not allow liquids, especially water molecules to free pass through it pores.

The filtration membrane 117 is hydrophobic and does not allow humidification liquid HL liquids to pass through its pores, but will allow dry gas DG to pass through its pores. The vapor passageway 119 affords a means of passing dry gas DG through a filtration membrane 117 from the humidification liquid chamber HLC to atmosphere. If an adequate amount of dry gas DG is used, vapor passageway 119 and the filtration membrane 117 may be eliminated altogether, since the dry gas DG will be absorbed by the humidification liquid HL to allow humidification liquid HL to completely saturate the thermal reactive structure 107.

Not necessarily, a protective sealing membrane 120 in the form of thin membrane of plastic or paper with glue lining on its edge may be attached firmly to cover and protect the filtration membrane 117 from the outside environment. The sealing membrane 120 is not essential but accords protection of the humidification liquid chamber HLC from atmospheric pressure changes and dirt. The protective sealing membrane 120 must be attached so that it can be either be dislodged or can be ruptured by a slight pressure that is greater than carbonation pressure, preferably above 50 psi of pressure. Thus, advantageously, the sealing membrane 120 must be designed to form a seal over the filtration membrane 117 during normal storage of a carbonated beverage B without rupturing. Preferably the sealing membrane 120 is welded by thermal or ultrasonic welding unto the surfaces of the containers 100 and 200 over the vapor passageway 119. The sealing membrane 120 must be attached to withstand pressures greater than carbonation but should be rupturable when the pressure exceeds the carbonation pressure of the beverage B being cooled.

As shown in FIGS. 3-6, indented annular groove 122 may be formed on the outer container 100 wall 201 by rotational forming, hydraulic forming, and other mechanical processes such as hydraulic forming to reduce the amount of material used to form the Sealing member 128. This facilitates recycling since the Sealing member structure 128 may be reduced to a just a sealing film or completely eliminated by making indented annular groove 122 seal against inner container outer cylindrical wall 202.

The next step if unfilled, is to fill a beverage B into the inner container 200 through inner container open rim 206 using conventional beverage filling machines and then seaming a beverage container lid 116 to seal both containers. If already filled, then only the inner container 200 need be filled and seamed with a container lid 116. If the outer container 100 is required to be pressurized, the filtration membrane 117 may be placed over a humidification liquid passageway 110 made on the inner container 200 and a sealing member 120 may be placed over any filtration membrane 117 that is on the beverage container lid 113. Alternatively, it may be placed on the outer container cylindrical wall 111 at an appropriate location at the highest possible location. This allows carbonation pressure from the beverage B to enter into the outer container 100 and pressurize its walls.

Experiments by the inventor show that the co-seaming of the two flanges as described above provides an adequate seal for the purposes of the invention. This provided the economy or needing a glue bond G. The two containers can be joined by sealing the inner container with the outer container 100 by simply welding the containers together with a suitable super glue such as one of Permabond 731 from Permabond Corporation, an epoxy, glue or by sonic welding the outer cylindrical walls together to form glue bond G. If glued, the inner container sealing flange 207 can be placed such that inner container sealing flange 207 is at least 2 mm above the outer container sealing flange 108. This allows seaming of a lid 116 to the inner container 200 only. However, if co-seamed, it is useful to make sure that there is enough compression of the three sealing flanges to form an adequate seal that can withstand carbonation pressure. The vapor passageway 119 made on the inner container 200 ensures rapid equilibration of pressure between the carbonated beverage B and the volume cylindrical space A, so that the inner container cylindrical wall 201 bears little or no pressure related stresses. If the inner container 200 is not yet filled with a food product, the two containers may also be co-seamed with a single outer container lid 116 by abutting the inner container sealing flange 207 with the outer container sealing flange 108 and seaming the two together with the lid as conventionally done in canning plants.

Figures 12, 12A:
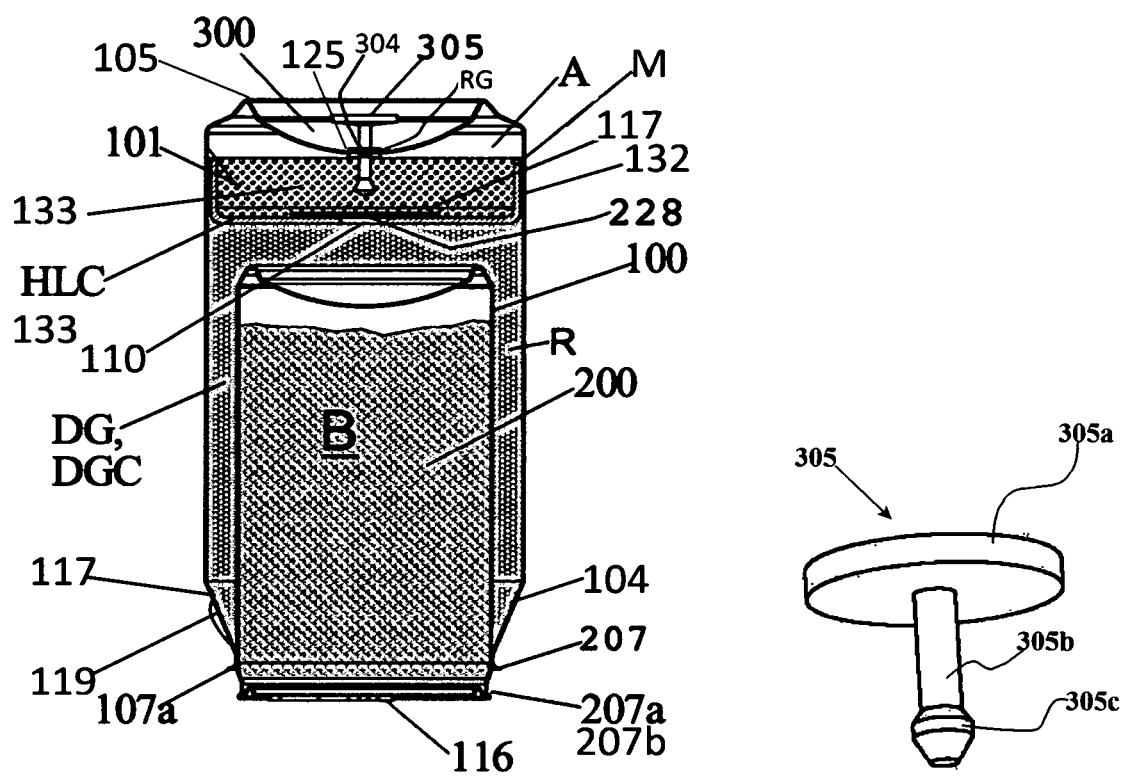
FIG. 12 shows the second embodiment of the invention with a humidification liquid chamber as a separate container inside the apparatus and with the finger press actuator installed.
FIG. 12*a* shows the finger press actuator of the apparatus.

Since the inner container 200 slides fittingly into the open rim 106 of the outer container 100, the two containers can also be sealing joined by bonding and gluing agents to form a glue bond GB. In such as case, the inner container 200 should be inserted into the outer container 100 until the inner container conical neck 204 is just adjacent to the outer container sealing flange 108 as shown in FIG. 12. The combination of the two containers forms Dry gas chamber DGC and eventually, the humidification liquid chamber HLC.

The apparatus 10 is now ready for use. Apparatus 10 is activated by simply depressing the wall of the outer container 100 to compress and deform the sealing member 128 to a non-sealing configuration. In both thermally reactive cases, heating and cooling can be achieved when the humidification liquid from the humidification liquid chamber HLC in space R enters into the space A in the dry gas chamber DGC and dissolves the thermally reactive structure 107 and causes a temperature change and releases Dry gas DG.

In the first embodiment, the humidification liquid HL in the humidification liquid chamber HLC in space R is released by gravity to contact the thermally reactive structure 107 below it as it flows through the deformed sealing member 128 after being activated by finger pressure to deform the seal. Simple agitation by swirling or shaking can ensure that the humidification liquid HL contacts the thermally reactive structure 107 and the process will continue as pressure builds up inside the outer container 100 and ruptures the deformed sealing member 128. The pressure loss also causes the deformed sealing member 128 to break and deform further as the humidification liquid HL becomes carbonated and pushes the deformed sealing member 128 to release dry gas DG. This way, after the apparatus 10 is activated, the pressurized dry gas DG that is generated will pass through a vapor passageway 119 through the inner container 200 and thus through a filtration membrane 117, and then, through a vapor passageway 119 on the beverage container lid 113. The pressure of the existing gases will dislodge the protective sealing member 120 to exit to atmosphere. It is important that the rate of flow of gases through the filtration membranes 117 be selected to match each other. This way, no back pressures are generated during the process that may compressibly-crush the inner container 200.

In particular cases the when the apparatus 10 must not be opened for consumption prior to heat or cooling, a beverage container lid made with a finger depressible sealing disc can be used instead of the conventional tab on the beverage container lid. Such lids are readily available from Ball Container Corporation in the USA and from Crown Cork and Seal Corporation™. The Global Vent™ lid made by Crown Cork and Seal™ is an example of such a beverage container lid. The resealable twist and turn lid made by Rexam USA™ is another example of such a lid. These special lids have an opening that is sealed by a depressible disc. The surface area of the disc can be chosen so that when pressure builds up during cooling and the release of $CO_2$, the pressure acting on this area will generate a force that is enough to prevent the lid from being readily depressed by finger pressure F, until all the gases have exited the outer container through the vapor passageway and through the filtration membrane to atmosphere, allowing the pressure to fall to a pressure that will exert a minimal force that allows the disc to be depressed by finger pressure F. The apparatus is now ready for use. If an adequate amount of dry gas DG is used, humidification liquid passageway 110 and the filtration membrane 117 may be eliminated altogether, since the dry gas DG will be absorbed by the humidification liquid HL to allow humidification liquid HL to completely saturate the thermal reactive structure 107 and cause cooling or heating as desired.

Simple agitation by swirling or shaking the can 10 ensures that the humidification liquid HL contacts the thermally reactive structure 107, and the process will continue as pressure builds up inside the outer container 100 and ruptures the deformed Sealing member 128. The pressure loss also causes the deformed sealing member 128 to break and deform further as the humidification liquid HL becomes carbonated and pushes the deformed sealing member 128 to release gas. This way, after the apparatus 10 is activated, the pressurized dry gas DG that is generated will pass through a humidification liquid passageway 110 through the inner container 200 and thus through a filtration membrane 117, and then, through a humidification liquid passageway 110 on the beverage container 200. The pressure of the exiting gases will be higher than carbonation pressure and thus will dislodge the protective sealing member 120 to exit to atmosphere. It is important that the rate of flow of gases through the filtration membranes 117 be selected to match each other. This way, no back pressures are generated during the process that may crush the inner container 200.

For cooling and for heating, the thermally reactive structure 107 dissolved to provide either an endothermic reaction for cooling with Dry gas DG released to effectuate endothermic humidification of the gas by evaporation of water vapor as it humidifies the Dry gas DG, or to cause heating by exothermic heating and releasing a Dry gas DG that is exothermically absorbed by the humidification liquid HL to produce heat. The apparatus 10 can now be left standing in its normal upright configuration and the foaming turbulence thus generated by the Dry Gas DG will gradually allow the humidification liquid HL to continuously disrupt and rupture the remaining sealing member 128 to release Dry Gas DG, allowing continuous contact between humidification liquid HL and the thermally reactive structure 107, even in an upright position. If a sealing member 120 is installed, the pressure of the Dry Gas DG rises, causing the sealing member 120 to rupture or become dislodged from the container and allowing only $CO_2$ gas to pass through the filtration membranes 117 to atmosphere. This effectuates cooling or heating of the inner container 200 as well as the outer container 100. A second means of activating the cooling or heating process is to simply open the beverage container opening means 116. The conventional design of the container opening means relies on a cantilever tab 116b and a score 116a on the container lid 113 that tears when the container opening means 116 is lifted by a finger. This requires a humidification liquid passageway 110 and a filtration membrane 117 to be placed either through the inner container cylindrical wall 115 or through the outer container cylindrical wall 111. No harm is done if both vapor passages are made as stated earlier in the first activation means. When this is done, the pressure loss then causes inner container 200 walls to momentary relax and the sealing member 128 formed by the wax is disrupted. Further agitation will ensure that the water contacts the thermally reactive structure 107 as it disintegrates and falls into the humidification liquid HL. The thermally reactive structure 107 is either endothermically dissolved or exothermically absorbed and the dry gas DG trapped in the thermally reactive structure 107 expands and if it is a cooling gas such as $CO_2$ it absorbs water and cools the humidification liquid HL further, and the dry gas DG further absorbs humidification liquid HL as a dry gas DG humidifies, effectuating cooling by phase change, evaporation and endothermic cooling. If the dry gas DG is a heating gas such as Dimethyl ether, (DME) it is absorbed in the humidification liquid HL, preferably water, and the dry gas DG and effectuates heating by absorption and exothermically heats the food product. If not completely absorbed, the dry gas DG and $CO_2$ from carbonation can either exit through the humidification liquid passageway 110 on the inner container 200 or through the humidification liquid passageway 110 on the outer container 100 and also through both vapor passageways 110. The apparatus 10 can now be left standing on its normal upright configuration and the foaming turbulence thus generated by the $CO_2$ will gradually allow the humidification liquid HL to continuously disrupt and rupture the remaining wax barrier structure M, allowing continuous contact between humidification liquid HL and the thermally reactive structure 107, even in an upright position.

Second Embodiment of the Present Invention and Method of Manufacture

This embodiment uses a finger press actuator 305 to release humidification liquid into the dry gas chamber DGC to achieve the heating and cooling as desired. As shown in FIGS. 12, 12a to FIG. 22, the humidification liquid chamber HLC is formed by a separate barrier structure M between the dry gas chamber DGC and the humidification liquid chamber HLC. Barrier structure M is an open cuplike container made to snugly fit inside the outer container 100 and sit in the cylindrical space A at the bottom of the outer container 100. In both this embodiment and the prior embodiment, it is important to note that the barrier structure M may be made to form the humidification liquid chamber HLC as separate chamber and it can be one of, welded, bonded and poured as a wax layer to form a sealing structure with the outer container inner wall 101, as in the first embodiment. Preferably, it is an added piece inserted into the outer container 100. The outer container 100 may be a regular beverage container with a domed base 103.

As in the first embodiment, the second embodiment of the invention requires two conventional beverage containers with matched sizes to serve the purposes of an outer container 100 and a inner container 200 that form part of apparatus 10. The outer container 100 and the inner container 200 are chosen such that the outer diameter of the inner container 200 fits snugly through the outer container open rim 106, which has a larger overall diameter than the inner container cylindrical wall 202's outer surface. The inner container 200 is chosen to have a height that is less than the outer container 100. The two containers can be glued together as described earlier, using super glue and other suitable glues bond GB and bonding means such as sonic welding to form a sealed annular chamber R between the two containers. The outer container 100 and the inner container 200 may also be configured with sealing flanges 108 and 207 respectively, for co-seaming them in a sealed configuration as described earlier. If the inner container 200 is not yet filled with a food product P, the two containers may also be co-seamed with a single outer container lid 116 by abutting the inner container sealing flange 207 with the outer container sealing flange 108 and seaming the two together with the lid as conventionally done in canning plants.

Since the inner container 200 slides fittingly into the open rim 106 of the outer container 100, the two containers can also be sealing joined by bonding and gluing agents to form a glue bond GB. In such as case, the inner container 200 should be inserted into the outer container 100 until the inner container conical neck 204 is just adjacent to the outer container sealing flange 108 as shown in FIG. 12. The combination of the two containers forms Dry gas chamber DGC and eventually, the humification liquid chamber HLC.

The gap between the height of the outer container base dome 103 and the height of the inner container base dome 203 forms a cylindrical space A between them. The gap between the diameter of the outer container cylindrical wall 101 and the diameter of the inner container cylindrical wall 201 forms radial space R between them. In some embodiments, the radial space R forms a dry gas chamber DGC that will hold a thermally reactive structure 107 impregnated with a dry gas DG, and the cylindrical space A forms a humidification liquid chamber holding a humidification liquid such as water. In some other embodiments, the radial space R forms a humidification liquid chamber holding a humidification liquid such as water, and the cylindrical space A forms a dry gas chamber DGC that will hold a thermally reactive structure 107 impregnated with a dry gas DG.

The first step in manufacturing the invention according to the second embodiment is to open up a vapor passage way 119 on the outer container 200, preferable on the outer container conical neck 104. If an adequate amount of dry gas DG is used, vapor passageway 119 and the filtration membrane 117 may be eliminated altogether, since any dry gas DG will be absorbed by the humidification liquid HL to allow humidification liquid HL to completely saturate the thermal reactive structure 107.

As shown in FIGS. 12, 12a and 13 and 14, an open-ended separate barrier structure M can also be formed as an open cuplike container that snugly fits within the outer container 100 in the cylindrical space A to sit at the bottom of the outer container 100 to form a humidification liquid chamber HLC. The separate barrier structure M comprises a barrier structure outer cylindrical wall 132 that slidingly and sealingly fits on outer container inner cylindrical wall 101; a barrier structure cylindrical wall inner surface 131; a barrier structure bottom wall 133; and a barrier structure outer cylindrical wall 132. Without limiting the foregoing, the barrier structure bottom wall 133 has a humidification liquid passageway 110 in the form of a hole that is between 0.05"-1" in diameter. The barrier structure is manufactured by one of thermoforming a plastic material, aluminum or by means of plastic injection molding. An outer container dome hole 125 is made through the center of the outer container base dome 103 to align with the humidification liquid passageway 110 through barrier structure bottom wall 133. A toroidal passthrough rubber grommet RG is placed to sealingly and snugly press fit into outer container dome hole 125 leaving only the grommet passthrough 304 to allow for humidification fluid HL to be poured into the humidification liquid chamber HLC. The outer container dome hole 125 is preferably between 0.25" to 0.5" in diameter but may be smaller or larger depending on the grommet used. The grommet passthrough hole 304 must axially align with the vapor passageways 110 made through on the humidification liquid chamber bottom wall 133. A finger press actuator 305 is provided. Finger press actuator 305 comprises a finger press flange 305a of adequate surface area for a finger to act upon it. Finger press actuator 305 also comprises a finger press tip 305c for piercing and breaking sealing member 128. Preferably finger press flange 305a has a diameter between ¼" and 1.5" but may be larger or smaller. Finger press actuator 305 also comprises a cylindrical finger press actuator stem 305b that sealingly slides into grommet passthrough 304.

To assemble the apparatus 10, the barrier structure M is inserted into the outer container 100 to sit snugly at the bottom of the outer container forming the humidification liquid chamber HLC in the cylindrical space A with the barrier structure outer cylindrical wall 132 slidingly and sealingly fitting against the outer container inner cylindrical wall 101. Thermally reactive structure 107 in the form of granules is poured through the humidification liquid passageway 110 into the radial space R to fill the radial space R. Thermally reactive structure 107 may also be formed in the form of cylindrically molded sections may also be inserted into the outer container 100 as prescribed by the first embodiment, i.e., to rest above the humidification liquid chamber HLC and fill the annular space R forming the Dry gas chamber DGC. A dry gas DG, such as either Dimethyl ether (DME) or $CO_2$, depending on whether cooling or heating is required respectively of the apparatus 10, is then flowed into the outer container 100 through humidification liquid passageway 110 to remove any traces of air within the interstitial spaces in the thermally reactivestructure 107.

A Filtration membrane 117 is then placed to cover and seal the barrier structure bottom wall 133 and to block off humidification liquid passageway 110 and prevent liquids from entering into the filled Dry gas chamber DGC and its contents. The filtration membrane 117 material must be made with a glue ring 117a that can be broken and deformed into a non-sealing configuration when under stress by a finger force F, acting on a Finger press actuator 305. A rubber grommet RG is then placed snugly into the outer container dome hole 125. Humidification liquid HL is then poured through the grommet passthrough hole 304 to fill in the humidification liquid chamber HLC with humidification liquid HL. Of course, one may also pour humidification liquid HL into the humidification liquid chamber HLC before the rubber grommet RG is placed in position on the outer container dome hole 125. A finger press actuator 305 is sealingly and slidingly inserted through the grommet passthrough 304 to seal the grommet passthrough 304 hole and to be proximal but not in contact with the filtration membrane 117 on the inside surface of the barrier structure M. Finger press actuator 305 should have a total length of about ½" and when placed in position through grommet passthrough 304 it should barely contact, not break, and preferably should be just a short distance and just shy from the surface of the filtration membrane 117. Preferably, finger press flange 305a should not protrude beyond the outer container base dome edge 105.

As before, the filtration membrane must have a glue bond 117a that must easily deforms, breaks, and reshapes into a non-sealing configuration by finger pressure F. Advantageously, it should break and deform into a non-sealing configuration when finger press actuator 305 is pressed against it by finger pressure F. Advantageously, the filtration membrane 117 can be replaced by one of, very thin and light aluminum foil an adhesive backing, a wax, a grease, a plastic membrane, a wax coated paper, and other easily breakable and deformable materials. Finger press actuator 305 can be made from aluminum or plastic and other suitable materials. Finger press stem 305b that sealingly slides into grommet passthrough hole 304. Advantageously, the filtration membrane 117 used to seal the humidification liquid passageway 110 may be eliminated altogether if the Finger press stem 305b can also be designed to seal off the humidification liquid passageway 110 when it mates with the same.

Thermally reactive structure 107, may also be compression molded as sections of cylinders that can be inserted into outer container 100 before the two containers are joined sealingly as described earlier. Alternatively, thermally reactive structure 107 may be in granular form to be passed through the vapor passageway 119 before it is sealed off by the filtration membrane 117.

In this embodiment the barrier structure M is manufactured as a separate flexible cup-like part to hold humidification liquid HL, and is positioned inside the outer container 100 and slid down to the bottom of the outer container to form a sealed humidification liquid chamber HLC at the bottom. Grease, and sealant may be used to effectuate a proper seal between the humidification liquid chamber outer cylindrical walls 132 and the outer container cylindrical wall 101 inner surface.

Again, as before, if an adequate amount of dry gas DG is used, humidification liquid passageway 110 and the filtration membrane 117 may be eliminated altogether, since the dry gas DG will eventually be absorbed by the humidification liquid HL to allow humidification liquid HL to completely saturate the thermal reactive structure 107 without any loss of dry gas DG from the apparatus 10.

The next step in assembling the embodiment is just filling a beverage B into the inner container 200 using conventional beverage filling machines, and then seaming a beverage container lid 113 to co-seam and seal both the inner container sealing flange 207 and the outer container sealing flange 108. The apparatus 10 is now ready to be used as invented. As stated before, if the inner container 200 is not yet filled with a food product, the two containers may also be co-seamed with a single outer container lid 116 by abutting the inner container sealing flange 207 with the outer container sealing flange 108 and seaming the two together with the lid as conventionally done in canning plants.

Since the inner container 200 slides fittingly into the open rim 106 of the outer container 100, the two containers can also be sealing joined by bonding and gluing agents to form a glue bond GB. In such as case, the inner container 200 should be inserted into the outer container 100 until the inner container conical neck 204 is just adjacent to the outer container sealing flange 108 as shown in FIG. 12. The combination of the two containers forms Dry gas chamber DGC and eventually, the humification liquid chamber HLC.

To activate the thermal process of either cooling or heating of the apparatus 10, a user simply turns the can to orient with the outer container dome base 103 facing upward and presses down the finger press actuator 305 to break the seal formed by the filtration membrane 117 and allow humidification liquid HL to spill into the dry gas chamber DGC and interact with the thermally reactive structure 107 and start to agitate the thermally reactive structure 107 to either endothermically dissolve and cool or exothermically react and heat the inner container 200 which in turn heats up the food product B, and in the process to also release dry gas DG and for further heating or cooling depending on which dry gas DG is used.

Figure 14:
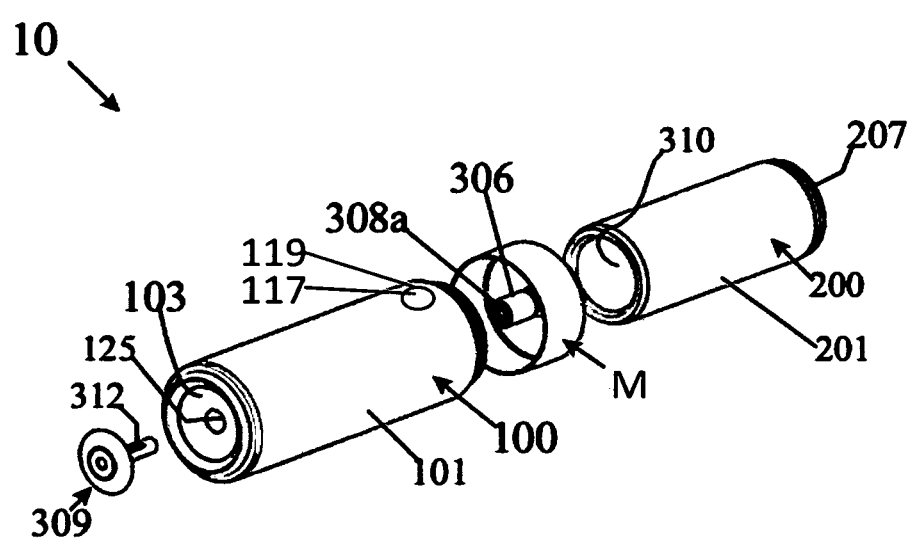
FIG. 14 is an exploded view of the second embodiment of the invention with the finger press actuator to release humidification liquid into the dry gas chamber and activate the thermal change process in the apparatus.
Figure 15:
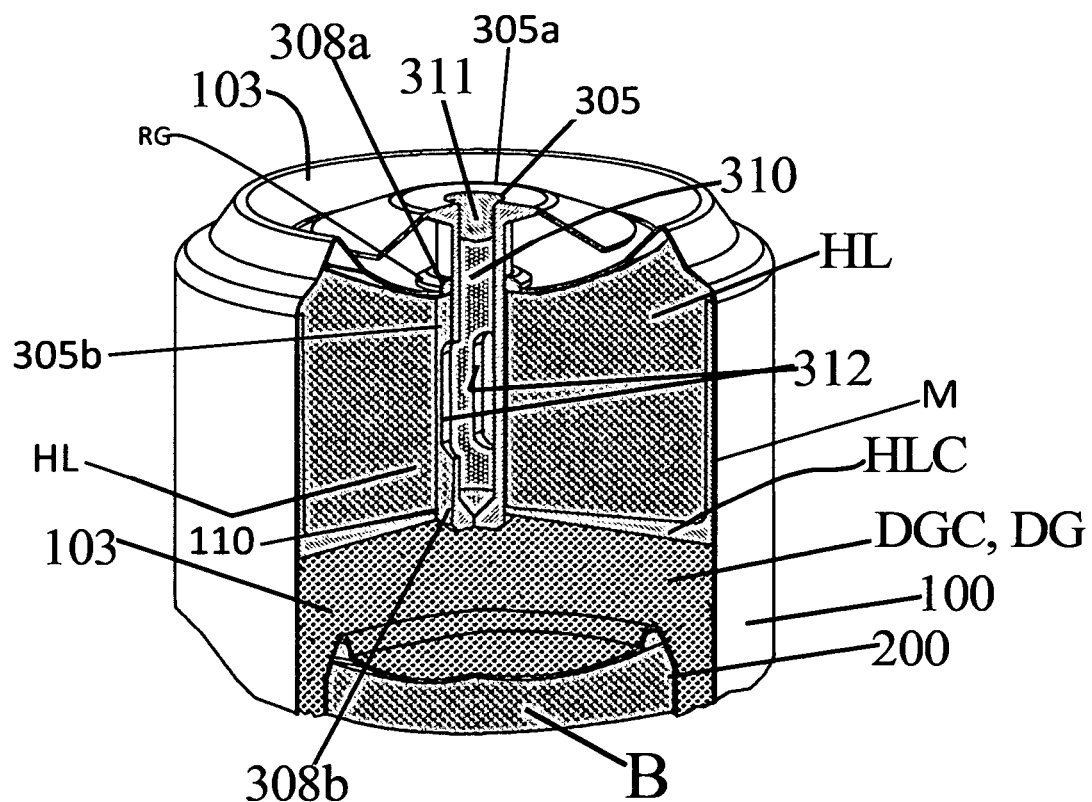
FIG. 15 is a cut away view of the second embodiment of the invention with the finger press actuator in a stud form which when pressed by finger pressure releases humidification liquid into the dry gas chamber through passageways to activate the thermal change process in the apparatus.

As shown in FIGS. 14, and 15, the finger press actuator 305 may be replaced by a passthrough finger press actuator 305, and a modified version of the humidification liquid 305, and a humidification liquid passageway 110 that seals with finger press tip 305c as shown in FIG. 15. The pass through allows both thermally reactive structure 107 and humidification liquid HL to be filled into the dry gas chambers DGC and the humidification liquid chamber HLC respectively. Finger press flange 305a, finger press cylindrical stem 305b, and finger press tip 305c are modified with a passthrough hole 310 and humidification liquid cross passageway 312 for receiving humidification liquid HL from.

As shown in FIG. 15, thermally reactive structure 107 can then be poured in granular form through the passthrough hole 310 to fill the dry gas chamber DGC. After filling the thermally reactive structure 107 into the dry gas chamber DGC, the finger press actuator 305 is then installed to form a seal with gromet passthrough hole 305, and at the same time sealing humidification liquid passageway 110 at sealing portion 308a and sealing the humidification liquid passageway 110 at portion 308b as shown. After filling the humidification liquid HL into the humidification liquid chamber HLC, passthrough hole 310 is plugged with plastic, rubber, or wax material plug 311 to prevent any humidification liquid HL from exiting the humidification liquid chamber HLC to atmosphere.

While there many other means of forming the thermally reactive structure of each embodiment that have not been described, it is obvious to one skilled in the art that a variety of methods could be used to achieve the same goal. Apart from $CO_2$ other environmentally friendly gases may be used with the invention. For example, Dry Air and Dry Nitrogen may be used even though it will only be stored in gaseous form for the cooling process. DME, and other eithers can be used for heating. It is anticipated that the cost of the components needed to mass manufacture apparatus 10 in the forms shown above is less than US $0.20 per unit. The sealing member structure 128 may be a simple wax or grease layer forming a seal.

Alternative material selections can be used to form the inner container 200 and the outer container 100. For example, plastic, rather than aluminum containers may be used to achieve the same purposes. In the case of a plastic outer container 100, the open end 106 may be left open for insertion of either humification liquid HL or thermally reactive structures 107. Then, the open end 106 can be heat shrunk to seal and form the two chambers forming space A and space R respectively.

It is important to note that the orientation of the apparatus 10 is relevant with this embodiment since by pushing the finger press actuator 305 to break the sealing member 128 and allowing humidification liquid HL spills into and contact the thermally reactive structure 107 by means of gravity.

By simply saturating the dry gas chamber DGC with a highly water absorptive gas such as DME (Dimethyl Ether), the filtration membrane 117 may be totally eliminated since upon pushing the humidification liquid HL such as water into the dry gas chamber DGC, absorption of the dry gas DME will automatically create a vacuum that forces the remaining humidification liquid HL in the humidification liquid chamber HLC to be sucked into the dry gas chamber DG activating the apparatus. This phenomenon can occur for both the heating and the cooling manifestations of the present invention. Thus, advantageously no filtration membrane 117 need be used if the dry gas DG is also easily absorbed by the humidification liquid HL in large stoichiometric ratios. However, the problem of a fixed orientation that requires the apparatus to be oriented upside down can be overcome by further embodiments that use a pressure assisted flow of the humidification liquid HL, into the dry gas chamber DGC. All these embodiments use a small tablet 316 made from thermally reactive structure 107 to generate a pressurized gas that propels the humidification liquid HL into the dry gas chamber DGC to effectuate the thermal change processes.

Figure 16:
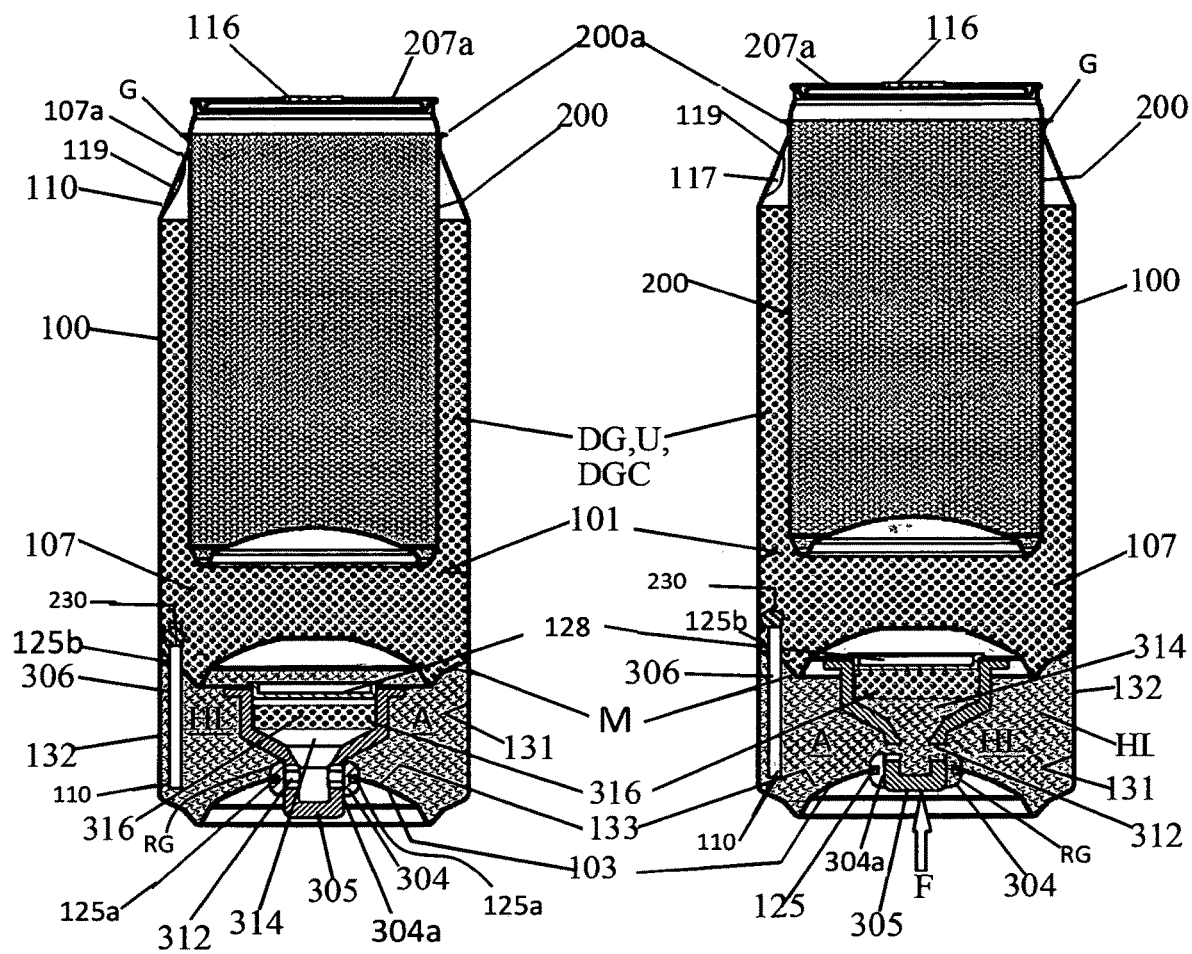
FIG. 16 is a cross section of a version of the second embodiment showing in the image on the left the finger press actuator with a cross hole in the humidification liquid chamber. A tablet containing some portion of the thermally reactive structure encapsulated in sealing wax is shown in a cavity built into the finger press actuator. When pressed the finger press actuator has cross holes that allow humidification liquid to enter and generate pressurized gas by interacting with the tablet made from thermally reactive structure. in proximity to a finger press actuator. In the image on the right, a simple grommet and a Finger press actuator is used with a cross hole. The finger press actuator has a compartment that carries a tablet made from thermally reactive structure. When the finger press actuator is depressed with a finger force F, it exposes the cross hole to the humidification liquid chamber and allows humidification liquid to enter into the sealed tablet chamber and reacts with the thermally reactive structure therein to generate a gas such as CO2. The gas then acts to pressurize the humidification liquid chamber and push humidification liquid into the dry gas chamber through a tube member.

As shown in FIG. 16, the finger press actuator 305 can also be made to fit the rubber grommet RG sealingly and incorporate the cross holes 312. This has the advantage of making the finger press actuator 305 as part that is pre-assembled with the barrier structure M, before assembling the two with the outer container 100. As such both the barrier structure M and 30 the finger press actuator 305 can be made to sealingly mate to rubber grommet RG as shown in FIGS. 16 and 17. Since it os pressure not gravity that propels the humidification liquid HL into the dry gas chamber DGC, a tube 306 extends the humidification liquid passageway 110 of the prior gravity fed embodiments.

As shown in FIGS. 16 to 22, pressure assisted embodiments may be also made with a tablet 116 made from thermally reactive structure 107 sealed over with a sealing member 128 in the form of a plastic or wax. As before, an open-ended barrier structure M, is formed as a separate open cuplike container and placed within the outer container 100 in the cylindrical space A. The barrier structure M has a tube member 306 that passes through a hole 125 made on the barrier structure to allow fluid communication between the humidification liquid chamber HLC and the dry gas chamber DGC. The tube humidification liquid passageway 110 is a means to draw humidification liquid HL from the bottom of the outer container 100 portion that forms the humidification liquid chamber HLC, with the barrier structure M. The hole 309 goes through tubular member 306 to allow fluid communication between the humidification liquid chamber HLC, and the dry gas chamber DGC, through barrier structure flat disc face 133. Grease or wax can be placed in the tube end opening into the dry gas chamber DGC to stop any humidification liquid HL from spilling into the dry gas chamber DGC.

Advantageously, barrier structure M has a barrier structure outer cylindrical wall 132 that slidingly and sealingly fits on outer container inner cylindrical wall 101 to prevent any humidification liquid HL from passing into the dry gas chamber DGC. The barrier structure M is formed as a separate part in the shape of a cup, as in the second embodiment. In this case, the barrier structure M is formed with a barrier structure bottom wall 133, a barrier structure cylindrical wall cylindrical wall-surface 132. The barrier structure M is manufactured by one of thermoforming a plastic material, and by means of plastic injection molding. A sealing member 230 in the form of a duckbill valve, a wax or grease is placed over the end of tube member 306 to block off hole humidification liquid passageway 110 and preventing humidification liquid HL from passing through the hole 309 to the dry gas chamber DGC.

A tablet 316 comprising the thermally reactive structure 107 is dipped in wax to form a sealing member 128 over its and to seal it's upper surface from being in fluid contact with humidification liquid HL. A tablet compartment 314 is formed between the finger press actuator 305 and the rubber grommet RG to snugly hold tablet 316 in a fluidly sealed configuration as shown in FIG. 17.

In FIG. 16, finger press actuator 305 is provided. Finger actuator 305 has a cylindrical stem 304a that slidingly and sealingly fits into grommet passthrough hole 304. Finger press 305 also has a cup-like open end forming a tablet chamber 314 with a sealing member 128 made from one of a wax, a grease, a plastic membrane that forms a seal over the tablet chamber 314. Finger press actuator 305 has a pass-through cross-hole 312 that fluidly connects to a tablet chamber 314. When inserted through the grommet passthrough hole 304, cylindrical stem 304a seals with the grommet passthrough hole 304 the Finger press 305's passthrough cross-hole 312 is also sealed by the grommet passthrough hole 304. A tablet 316 of thermally reactive structure 107 is placed inside the tablet chamber 314 and sealing member 128 is then used to temporarily seal the tablet chamber 314 as shown in FIG. 16. Thus, sealing member 128 can be made from wax, a grease, very thin, plastic, putty, light aluminum foil with an adhesive backing, and other easily breakable and deformable materials. Finger press actuator 305 can also be made from aluminum or plastic and other suitable materials including from molded wax. Finger press actuator 305 must have a cylindrical stem 304a diameter that seals the grommet 304's center hole but also be able to slide sealingly against the grommet 304 when depressed by finger pressure, F.

In this embodiment pressure assisted embodiment, (same concept as gravity pressure assisted of prior embodiments), the barrier structure M is manufactured as a separate but flexible cup-like part to hold humidification liquid HL, and is positioned outside the outer container 100 and slid over the bottom of the outer container and welded or glued to form a sealed humidification liquid chamber HLC below the outer container 100. Welding may also be used to effectuate a proper seal between the barrier structure M outer cylindrical walls 131 and the outer container inner cylindrical wall 101. When the finger press actuator 305 is inserted into the grommet passthrough hole 304, humidification liquid HL can be poured into the humidification liquid chamber HLC through the humidification liquid passageway formed by cross holes 312, to fill about 75%-90% of the humidification liquid chamber HLC.

Again, as before, if an adequate amount of dry gas DG is used, humidification liquid passageway 119 and the filtration membrane 117 made on the outer container conical wall 104 may be eliminated altogether, since the dry gas DG will be absorbed by the humidification liquid HL to allow humidification liquid HL to completely saturate the thermal reactive structure 107.

The apparatus 10 is now ready to be used. To activate the apparatus 10, the finger press actuator 305 is pushed into the humidification liquid chamber HLC to allow the Finger press 305's pass-through cross-hole 312 to be exposed into the humidification liquid HL. Humidification liquid HL enters into the tablet chamber 314 and interacts with the thermally reactive structure tablet 316 to generate a dry gas DG. The dry gas DG generates pressure inside the humidification liquid chamber HLC and becomes wet gas by absorption of humidity and pressurizes the humidification liquid HL. The humidification liquid HL exits from the humidification liquid chamber HLC through the tube hole 309 out of the humidification liquid chamber HLC into the dry gas chamber DGC and allow humidification liquid HL to interact with the thermally reactive structure 107 and start to agitate the thermally reactive structure 107 to either endothermically dissolve and cool or exothermically react and heat the product, and in the process to also release dry gas DG and for further heating or cooling depending on which dry gas DG is used.

As shown in FIG. 17, the sealing member 128 for the tablet chamber 314 can be simply made as a wax covering over the tablet chamber 314 and over the rubber grommet RG. When the cylindrical stem 304a is pushed to slide along grommet passthrough hole 304, the tablet chamber 314 is unsealed in the humidification liquid chamber HLC, and humidification liquid HL enter and interacts as before with the tablet 316 to produce the same result as described before. In this case, the Finger press 305's pass-through cross-hole 312 is not necessary as shown in FIG. 16.

It is important to note that in all these embodiments a common theme is the humidification liquid chamber HLC, the dry gas chamber DGC, the finger press actuator 305, humidification liquid passageway 110 in the form of the tube member 306, the inner container 200, the outer container 100, the thermally reactive structure 107, humidification liquid HL, dry gas DG, and a pressure (whether by gravitationally induced or actively induced) means of emptying the humidification liquid chamber HL by finger pressure F, acting to break a sealing member 128 to generate pressure and force humidification liquid HL into the dry gas chamber DGC.

FIGS. 16-20 show a tablet means of generating dry gas DG pressure by 25 the finger press actuator 305 opening a sealing barrier 311 which in this case is a breakable seal sealing member 128 made from one of plastic, wax and other materials, to expose thermally reactive structure 107 to react with humidification liquid HL to generate gas pressure and force humidification liquid HL into the dry gas chamber DGC to react with more thermally reactive structure 107 and generate a thermal change in temperature.

As shown in FIGS. 16 and 17, barrier structure M is formed as part that is glued to the outer container bottom base dome 103. In such a case, barrier structure M is formed as a separate open cuplike portion of a container and then, either glued or welded to the outer container wall 101 to form a cylindrical space A. Alternatively, the humidification liquid chamber HLC may be formed inside a regular outer container 100 by using an internal barrier structure M as before, to form the cylindrical space A as shown in FIGS. 12 to 15. FIGS. 16 and 17 show how the external barrier structure M can be incorporated into the apparatus 10.

As in the prior version of the second embodiment, the barrier structure M is preferably formed as a separate part in the shape of a shallow cup by means of plastic injection molding, thermoforming, vacuum forming, and deep-drawing as in the second embodiment but it is now made to slidingly fit over the outer container walls.

As before, an inner container 200, and an outer container are provided. As before, a vapor passageway 119 is made on the outer container conical wall 104, with the intent of bleeding off any gases and allowing dry gas DG to exit the container through a filtration membrane 117, without allowing liquids to pass through said filtration membrane 117. As shown in FIGS. 16 and 17, tube hole 125b is provided to pass through the base dome wall 103 of the outer container 100, to hold a tube 306 that can act as an extension of the humidification liquid passageway 110. As shown in FIG. 17, a tube 306 is sealingly passed through the tube hole 125b to extend as far as possible to the lowest point of the humidification liquid chamber HLC.

As before, thermally reactive structure 107 is prepared as before in granular form. And poured through the vapor passageway 119 to fill the radial space R that forms the dry gas chamber DGC, before vapor passageway 119 is sealed off by filtration membrane 117. The next step in assembling and manufacturing the apparatus 10 according to the second embodiment is as before, to pour the thermally reactive structure 107 into the outer container 100 through outer container base dome hole 125 as prescribed by the first embodiment. A dry gas DG, such as either Dimethyl ether (DME) or $CO_2$, depending on whether cooling or heating is required respectively of the apparatus 10, is then flowed into the outer container 100 to remove any traces of air within the interstitial spaces in the thermally reactive structure 107.

Figure 24:
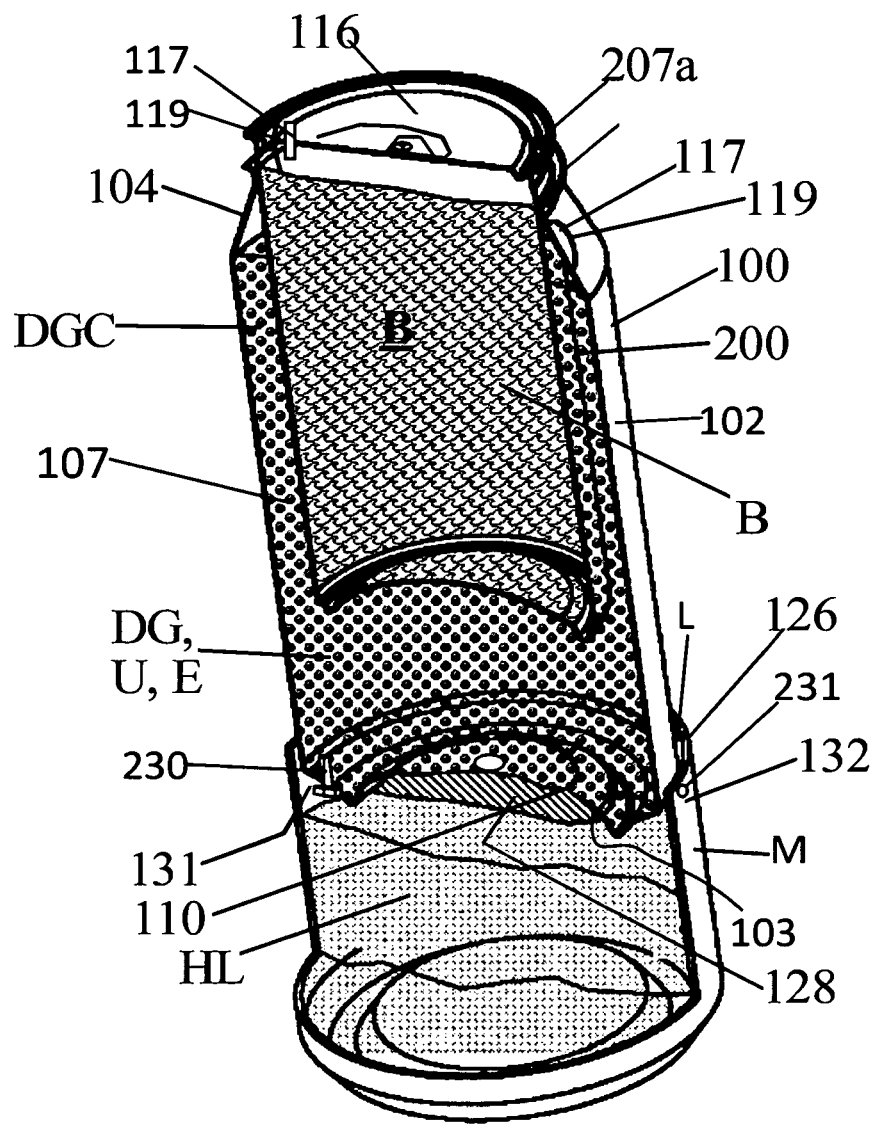
FIG. 24 shows a cross sectional view of the externally mounted humidification liquid chamber acting as a finger actuator that covers over the bottom of the outer container according to a third embodiment of the invention.

Alternatively, thermally reactive structure 107 may be poured into the outer container 100 through the vapor passageway 119 instead of through outer container base dome tube hole 125, to fill the radial spaces A and R, in the outer container 100. A sealing member 128 made from one of grease, wax, and putty, a thin plastic membrane, is used to seal off the humidification liquid passageway 110 through the tube 306, to prevent humidification liquid HL from passing freely into the dry gas chamber DGC. Alternatively, and additionally, a duckbill-valve 230, may also be used to seal off the humidification liquid passageway 110 to prevent humidification liquid HL from passing freely into the dry gas chamber DGC as shown in FIG. 24.

A filtration membrane 117 is placed over the vapor passageway 119 on the conical wall 104 to block off any thermally reactive structure 107 and humidification liquid HL from passing through the vapor passageway 119 to atmosphere, while allowing only gasses to pass through. A grommet hole 125 is made through the center of the barrier structure M. The grommet hole 125 are preferably between 0.25" to 0.5" in diameter. The grommet hole 125 must axially align with the central axis of the humidification liquid chamber HLC.

Figure 18:
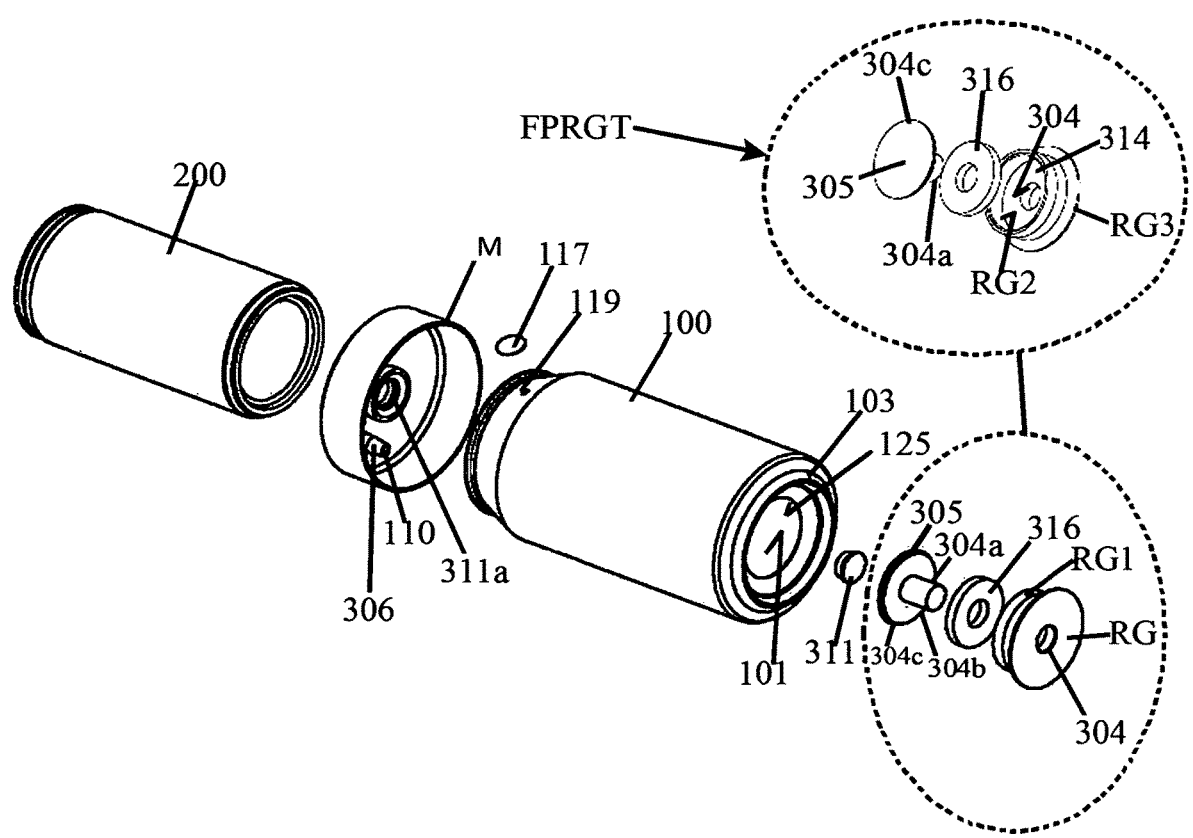
FIG. 18 is an exploded view of the proffered second embodiment with a humidification liquid chamber cup acting as a barrier in a standard beverage container between the dry gas chamber and the humidification liquid chamber. A tablet compartment is formed between a rubber grommet and a finger press actuator. The humidification liquid chamber has a humidification liquid chamber pass through and a plug member for filling the thermally reactive structure into the dry gas chamber.
Figure 19:
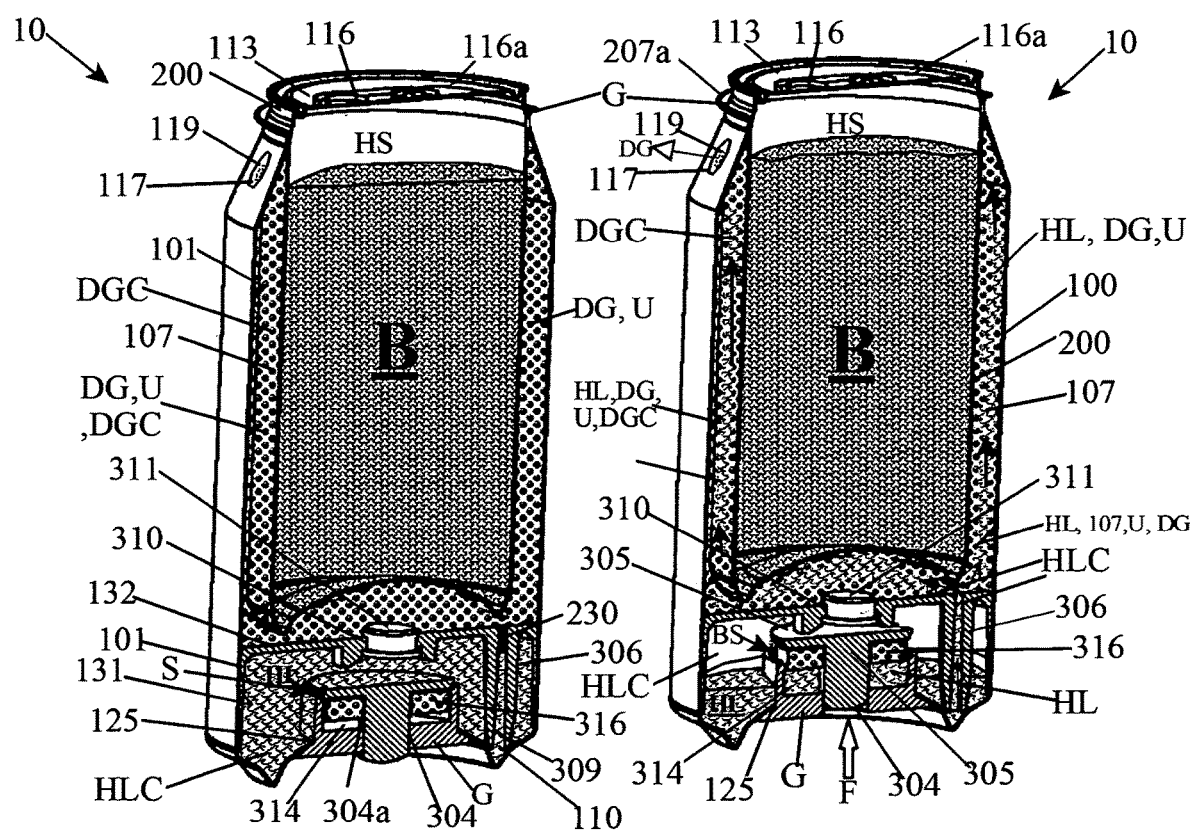
FIG. 19 shows a sectional view of two states of the second embodiment with a tablet chamber sealed before activation of the finger press actuator and then unsealed to initiate cooling or heating as required.

As shown in FIGS. 18 and 19, the finger press actuator and the grommet RG may be structured to be pre-assembled as one assembly FPRGT. The rubber grommet RG is made in the form of a cup with a cylindrical wall G1 that is made to sealingly press fit into a container base dome hole 125 and form a seal. The finger press 305 is made with a sealing flange 304b and a cylindrical stem 304a. The Finger press flange 304b is made to seal against the cylindrical wall G2 of the rubber grommet RG to form a tablet chamber 314 with the grommet RG. When the Finger press actuator 305, the tablet 316 and the rubber grommet RG are sealingly assembled, the assembly FPRGT is completed as shown in FIGS. 18 and 19. The barrier structure M is made with a central hole 311a to pass thermally reactive structure 107 into the dry gas chamber DG. A plug 311 is provided to plug the barrier structure hole 311a after the dry gas chamber DGC is filled.

A tablet 316 with a hole through its center is provided to fit around the finger press cylindrical stem 314b. The outer diameter and the thickness of the tablet 316 is made to fit into the inner grommet cylindrical wall G2 as shown in FIG. 18. The tablet 316 should have a thickness less that the chamber height formed when finger press cylindrical flange 304c seals the gromet cylindrical wall G2. Thus, the tablet 316 is completely sealed between the finger press flange 304c and the gromet G to form a tablet chamber 314.

To assemble the apparatus 10, the barrier structure M is provided as before. The barrier structure M is again made in a cup-like structure as shown, with a barrier structure M center hole 311a. The barrier structure M is inserted into the outer container 100 to sit as close to the base dome 103 as possible and form a water tight seal with between the barrier structure cylindrical outer wall 131 and the outer container cylindrical inner wall 101. Thus, advantageously, a humidification liquid chamber is made by the outer container 100 and the barrier structure wall 131.

Once again, a vapor passageway 119 is made on the outer container 100 as described in earlier embodiments on the conical wall of the outer container 104. Once again, the inner container 200 is inserted through the outer container open rim 106 with the inner container outer cylindrical wall 202 snugly and sealingly fitting through the container open rim 106 until the inner container sealing flange 207 is at least some distance from the outer container sealing flange 108. The two containers can also be joined sealingly by using either a suitable glue and by welding them together on their respective mating diameters.

As stated before, if the inner container 200 is not yet filled with a food product, the two containers may also be co-seamed with a single outer container lid 116 by abutting the inner container sealing flange 207 with the outer container sealing flange 108 and seaming the two together with the lid as conventionally done in canning plants.

Since the inner container 200 slides fittingly into the open rim 106 of the outer container 100, the two containers can also be sealing joined by bonding and gluing agents to form a glue bond GB. In such as case, the inner container 200 should be inserted into the outer container 100 until the inner container conical neck 204 is just adjacent to the outer container sealing flange 108 as shown in FIG. 12. The combination of the two containers forms Dry gas chamber DGC and eventually, the humification liquid chamber HLC. After joining the two containers, the thermally reactive structure 107 is poured through the barrier structure center hole 311a until the dry gas chamber DGC is filled. A dry gas DG is then flowed through the dry gas chamber to exit from the filtration membrane 117. A plug member 311 is then placed to seal off the barrier structure center hole 311a and form a sealed humidification liquid chamber HLC. Humidification liquid HL is poured into the humidification liquid chamber and the assembly FPRGT is then press-fitted into the outer container dome hole 125 to seal off the outer container dome hole 125. This completed the assembly. When the finger press actuator is push with a finger force, F, the tablet chamber 314 is opened and humidification liquid HLC, enters into the tablet chamber 314 and reacts with the tablet 316 to disintegrate and release pressurized dry gas DG. The dry gas Dg then immediately humidifies, cools the humidification liquid HL, and at the same time pushes cold humidification liquid through the humidification liquid passage way 110 to enter into the dry gas chamber DGC and react with the thermally reactive structure 107 to generate a thermal gradient and effectively heat or cool the product in the product container 200.

Figure 20:
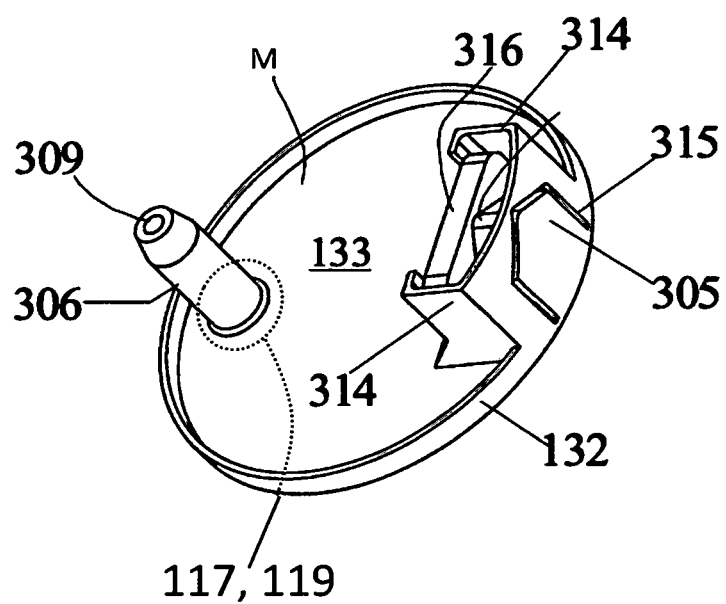
FIG. 20 shows another embodiment of the tablet chamber proximal to the outer container wall for activating the thermal process of the apparatus by pressing the container sidewall to break a seal on the tablet chamber.
Figure 21:
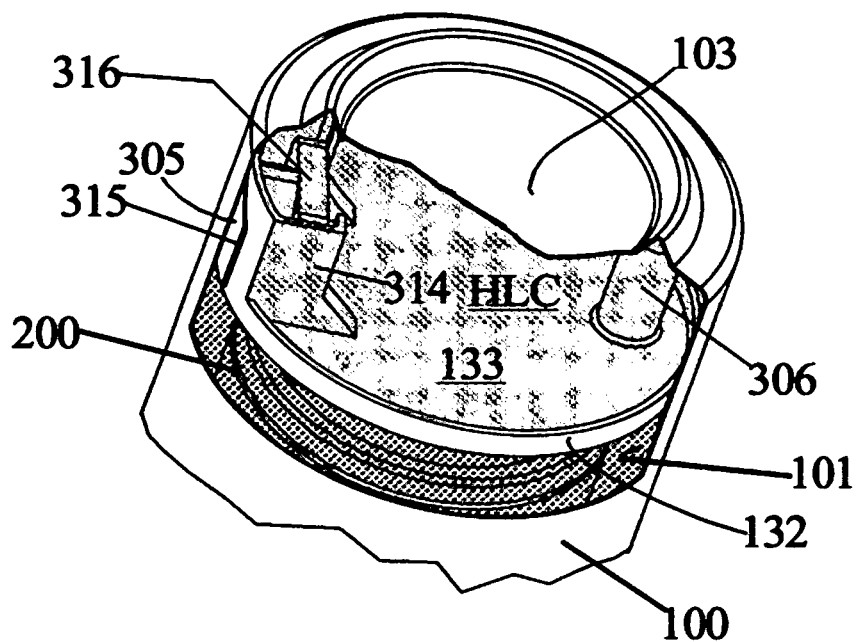
FIG. 21 shows a sectional view of the bottom of the apparatus in the second embodiment using a finger actuated and tablet embodiment of the invention. The tablet is shown mounted to the side mounted tablet chamber of FIG. 19. The humidification liquid chamber is shown as a separate attachable structure that sealingly and slidingly fits over the base of the outer container. A molded thermally reactive structure is also shown sitting inside the base dome of the outer container. The inner container is shown holding a beverage in a completely sealed configuration.
Figure 22:
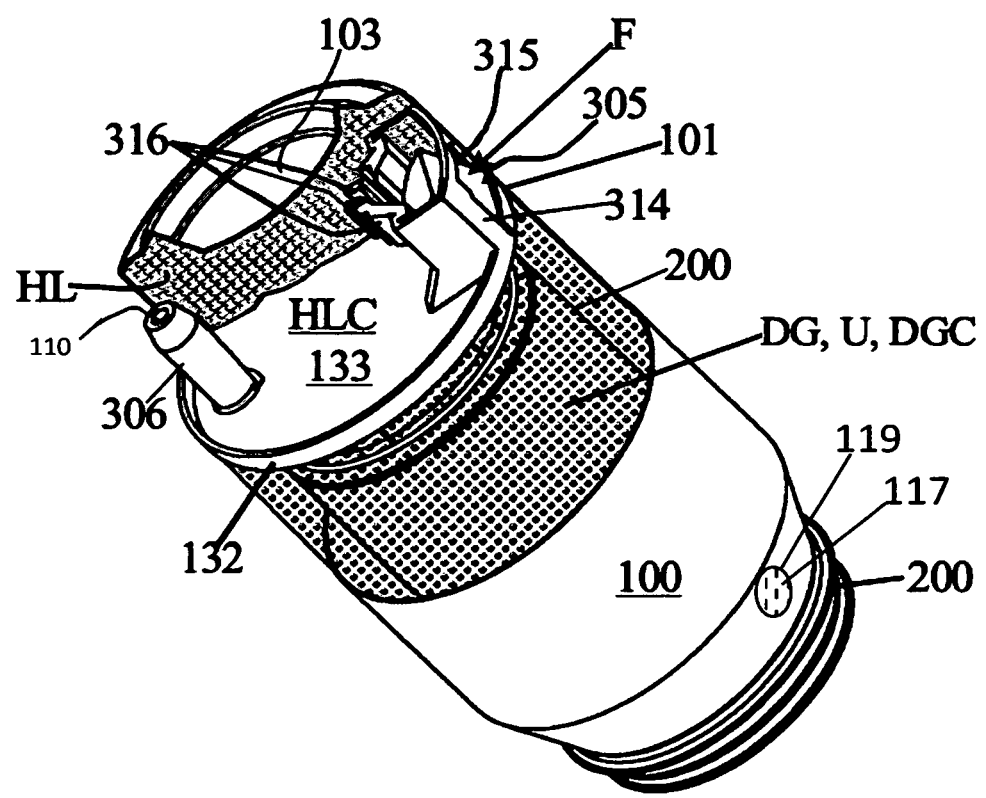
FIG. 22 again shows a sectional view of side mounted tablet chamber of FIG. 19 according to the second embodiment using a finger actuated and tablet embodiment of the invention. The humidification liquid chamber is shown as a separate attachable structure that sealingly and slidingly fits over the base of the outer container. A molded thermally reactive structure is also shown sitting inside the base dome of the outer container.

FIGS. 20-22 show another way the barrier structure M can made to provide for a means of activating the second embodiment from the sidewall of the outer container 100. In this version of the barrier structure M has the tablet compartment 314 on the side wall 132. A flexible pivoted member finger press actuator 305 is made on the side wall 132 of the barrier structure M. Barrier structure M has a tube for a humidification liquid passageway 309 that can communicate fluidly with the dry gas chamber. A filtration membrane 117 is placed to cover over the exit passageway 119 on the barrier structure M. Again, the tablet 316 is covered by a sealing member 128. Sealing member 128 can simply be pasted or poured as a wax, a plastic, over the tablet 316 to seal off the tablet chamber 314. When a finger presses the side wall of the outer container 100 in the proximity of the finger press actuator 305, the tablet 316 is broken and the sealing member is also broken to expose the tablet 316 to humidification liquid HL. As before, this activates the apparatus and allows humidification liquid to pass through the humidification liquid passageway 309 and enter into the dry gas chamber DGC and cause a thermal reaction to cool or heat the product container 200.

Third Embodiment of the Present Invention and Method of Manufacture

A third embodiment of the invention is shown in FIGS. 23-27. In this embodiment, the activation pressure of the apparatus is obtained by pressing the barrier structure by finger and hand pressure to force the humidification liquid HL into the dry gas chamber DGC.

As before, the third embodiment of the invention requires two conventional beverage containers with matched sizes to serve the purposes of an outer container 100 and an inner container 200 that form part of apparatus 10. The outer container 100 and the inner container 200 are chosen, once again, such that the outer diameter of the inner container 200 fits snugly through the outer container open rim 106, which has a larger diameter than the inner container cylindrical wall 202 outer surface. The inner container 200 is chosen to have a height that is preferably but not necessarily less than the height of the outer container 100. The space between the outer container 100 and the inner container 200 forms the dry gas chamber DGC. The humidification liquid chamber is made separately. Preferably, the inner container 200 is already a filled and sealed container, having a food product therein.

In this case, the cylindrical space A and the annular space R both form a dry gas chamber DGC that will hold a thermally reactive structure 107 impregnated with a dry gas DG.

As stated before, if the inner container 200 is not yet filled with a food product, the two containers may also be co-seamed with a single outer container lid 116 by abutting the inner container sealing flange 207 with the outer container sealing flange 108 and seaming the two together with the lid as conventionally done in canning plants. Since the inner container 200 slides fittingly into the open rim 106 of the outer container 100, the two containers can also be sealing joined by bonding and gluing agents to form a glue bond GB. In such as case, the inner container 200 should be inserted into the outer container 100 until the inner container conical neck 204 is just adjacent to the outer container sealing flange 108 as shown in FIG. 12. The combination of the two containers forms Dry gas chamber DGC and eventually, the humification liquid chamber HLC.

Figure 23:
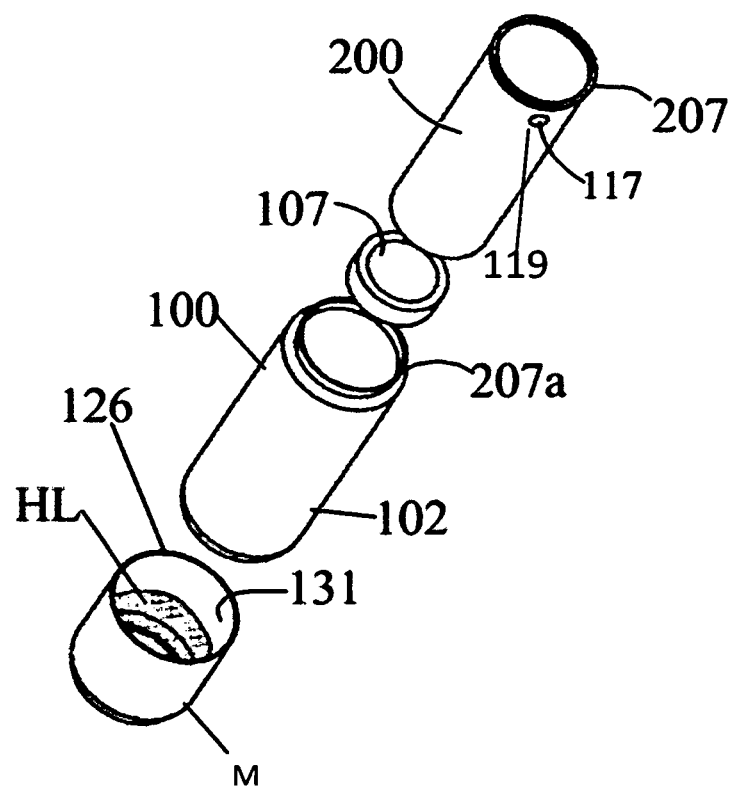
FIG. 23 shows an exploded view of an externally attached humidification liquid chamber that covers over the bottom of the outer container according to a third embodiment of the invention with the finger actuator being the humidification liquid chamber.
Figure 25:
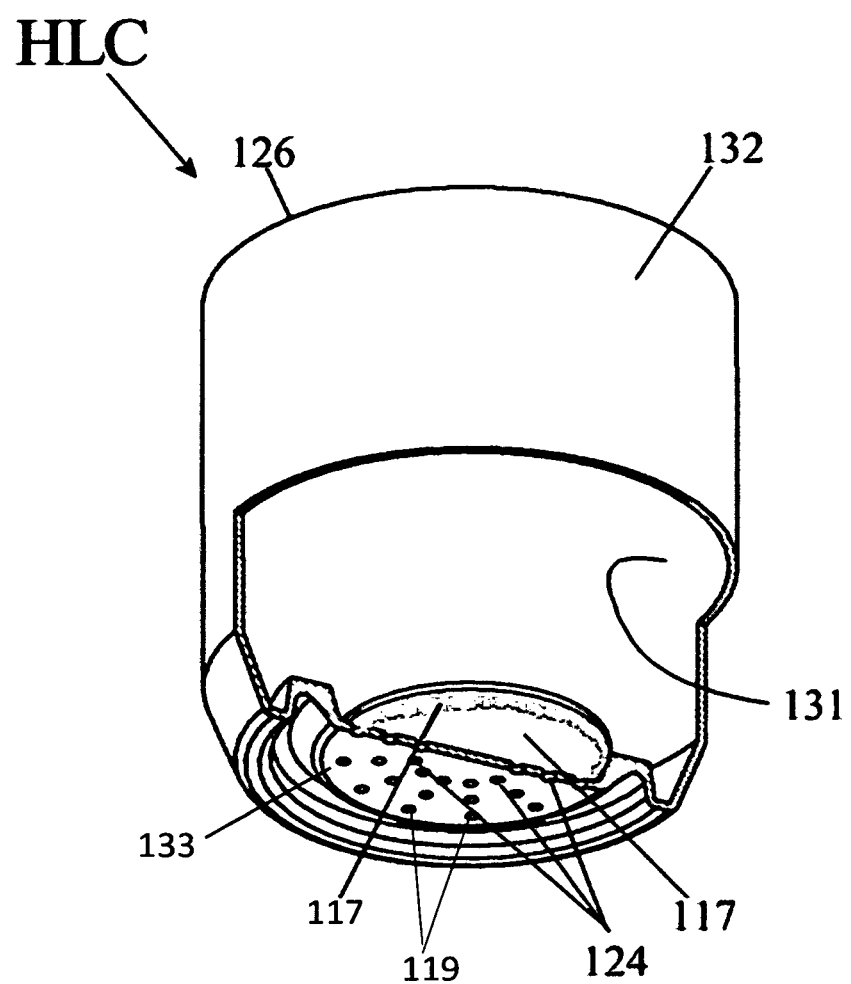
FIG. 25 shows the humidification liquid chamber according to the third embodiment, designed to sealingly slide on the outer container to open a sealing member and allow humidification liquid to enter into the dry gas chamber.
Figure 26:
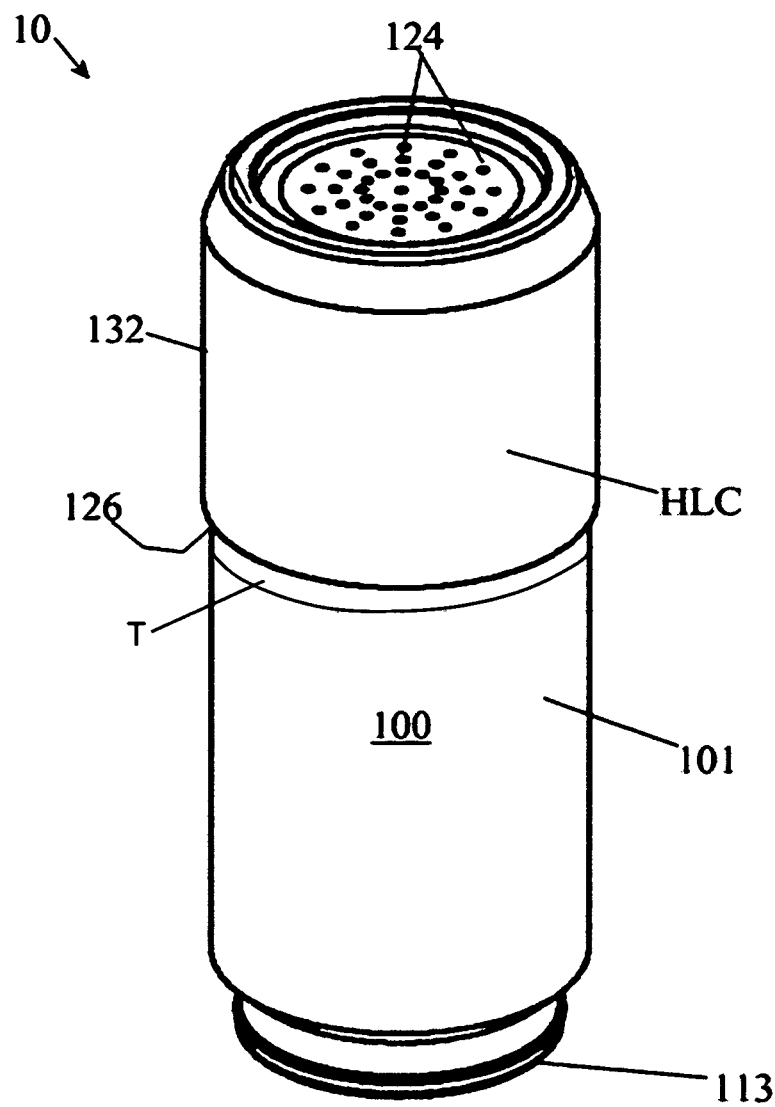
FIG. 26 shows the third embodiment of the invention ready to be used.
Figure 27:
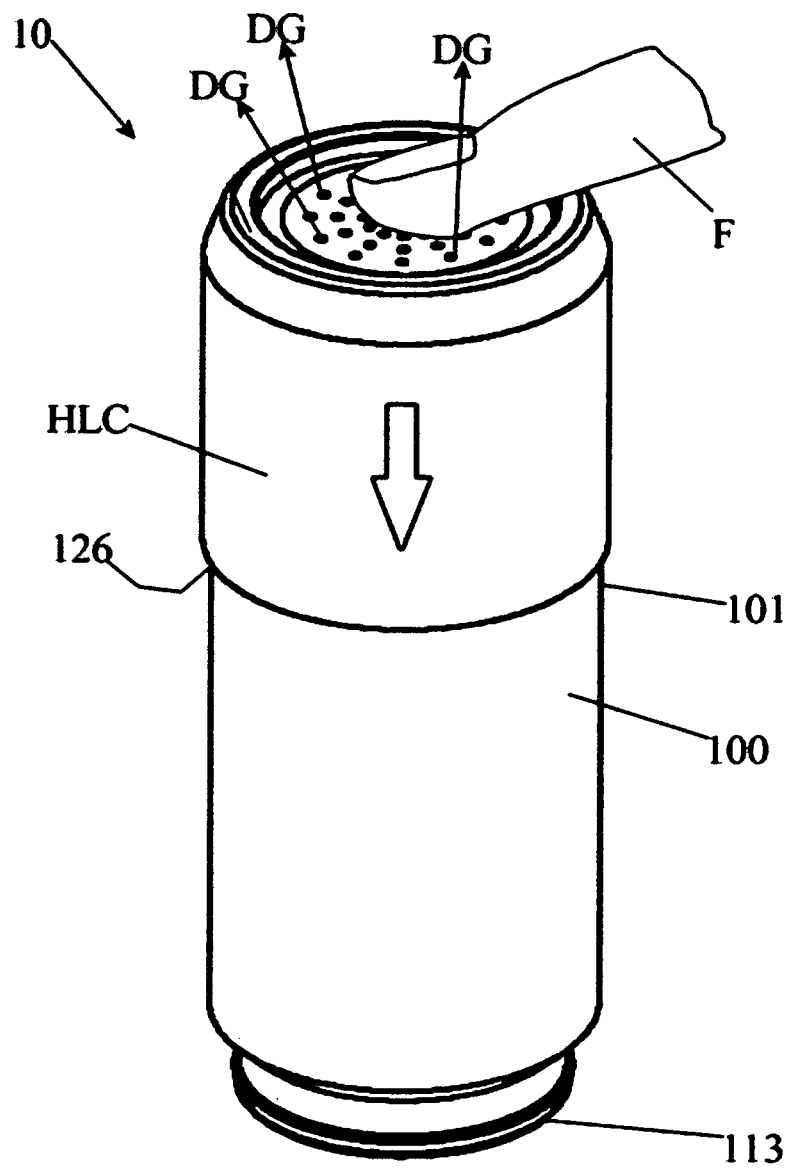
FIG. 27 shows a finger pushing the humidification liquid chamber to empty its humidification liquid contents into the dry gas chamber below.
Figure 28:
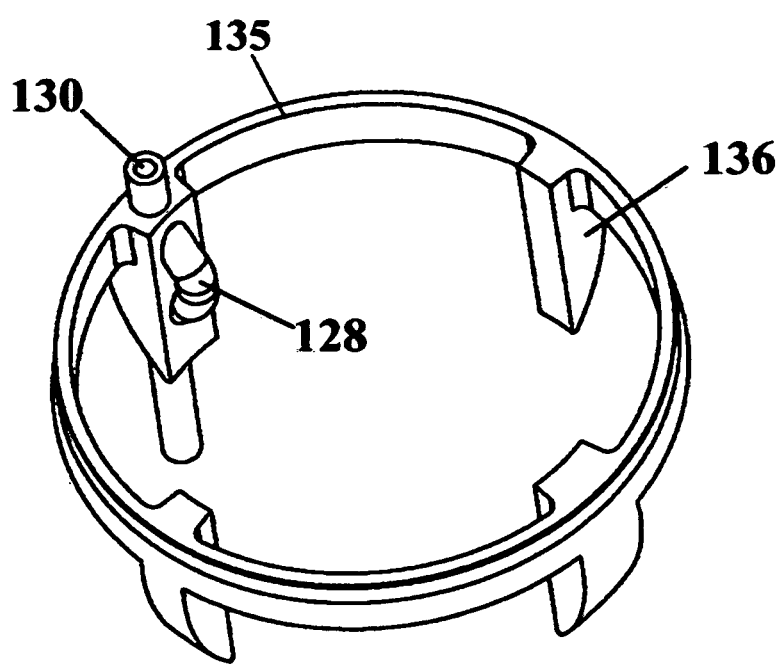
FIG. 28 shows a sealing member support means according to the fourth embodiment using a simple silicone tube as a resilient portion of sealing member for the present invention.
Figure 29:
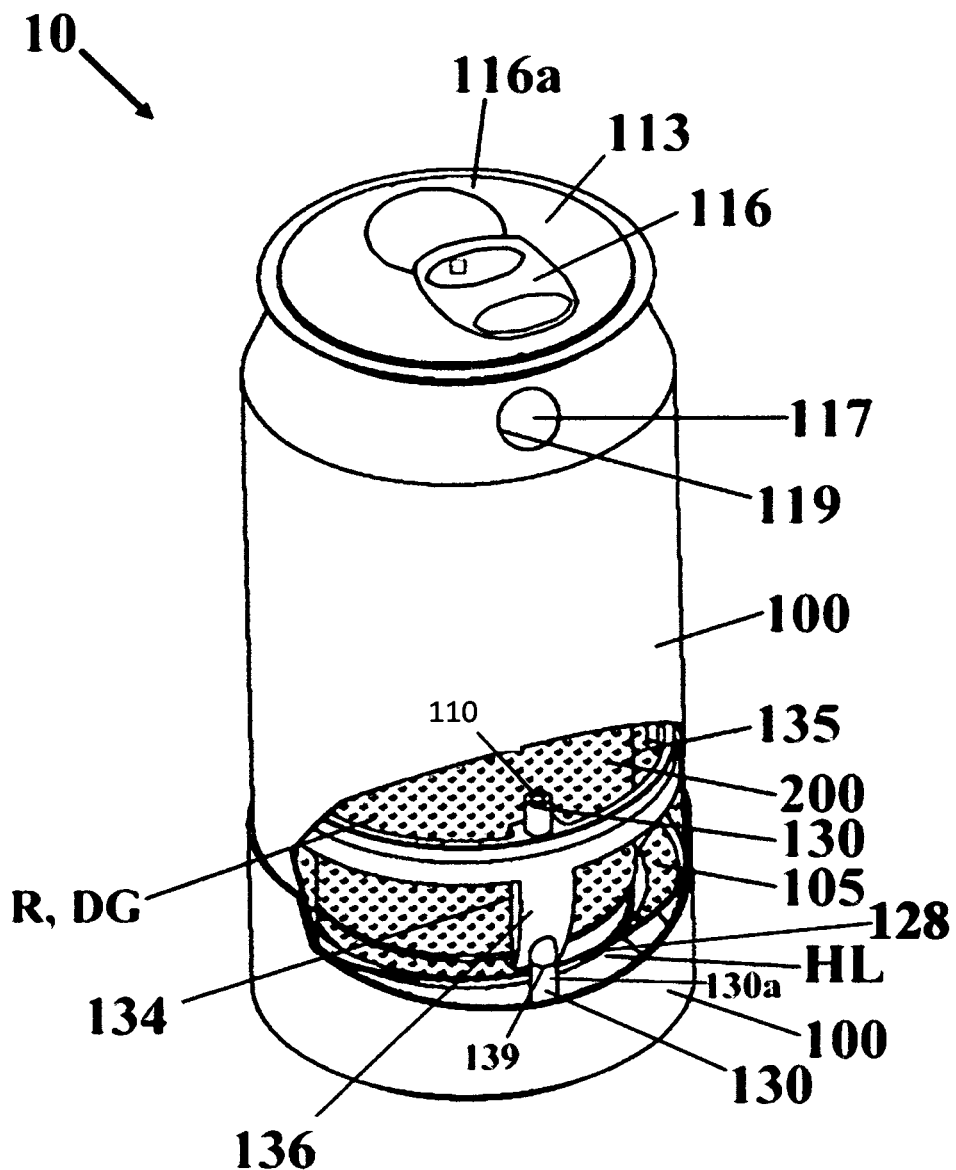
FIG. 29 shows the inner container according to the fourth embodiment of the invention, surrounded and supported by the sealing member support means with a silicone flexible tube serving the function of a sealing member, being compressed between a pressurized inner container and the sealing member support means to seal the humidification liquid passageways until the beverage container pressure is released.

As shown in FIGS. 20-24, a barrier structure M is formed as a separate part in the shape of a cup, as in the second embodiment. In this case, the barrier structure M is formed with a barrier structure bottom wall 133, a barrier structure cylindrical wall inner surface 131 and a barrier structure outer cylindrical wall 132. The barrier structure M is designed to cap over and cover the outer container base dome 103 such that the humidification liquid chamber inner cylindrical wall 131 sealingly slides over the outer container cylindrical wall 102 outer surface. The barrier structure M is therefore configured like a cup with a barrier structure bottom wall 133. The barrier structure bottom wall 133 may hold the filtration membrane 117 with several vapor passageways 119 in the form of array 124 of small actuator holes that pass through the barrier structure bottom wall 133 as shown in FIG. 23. Alternatively, vapor passageways 119 may also be placed on the conical wall 104 of the outer container as shown in FIG. 24. The vapor passageways should be 5 mm or greater in diameter and if placed as shown in FIG. 25 should be as many as possible to allow free passage of dry gas DG and prevent back pressure build up.

As shown in FIG. 24, an upright version of the embodiment is shown in which the only necessary vapor passageway 119 is placed on the conical surface 104 of the outer beverage container 100. To prevent blowout, the filtration membrane 117 is placed on the inside surface of the container 100 to block any liquid from passing through the vapor passageways 119. A humidification liquid passageway 110 with a diameter of about 5 mm to 25 mm" is made through the outer container base dome 103.

In the case when the thermally reactive structure is molded as described earlier, it is simply dropped to sit at the bottom of the outer container 100 as shown in the exploded view of FIG. 23. Preferably, a granular form of the thermally reactive structure 107 is used.

As shown in FIG. 24, thermally reactive structure 107 can be simply poured vapor passageway 119 before the filtration membrane 117 is placed over it. Alternatively, thermally reactive structure 107 is simply poured through a larger humidification liquid passageway 110 at the base dome of the outer container 100 to fill the space A and the space R that separates the two containers as shown in FIG. 24. A dry gas DG, such as either Dimethyl ether (DME) or $CO_2$, depending on whether cooling or heating is required respectively of the apparatus 10, is then flowed into the outer container 100 through the open humidification liquid passageway 110 to remove any.traces of air within the interstitial spaces in the thermally reactivestructure 107.

Sealing member 128 is one of a wax layer, a grease layer, and a plastic layer or membrane. Sealing member 128 can simply be pasted on and alternatively poured over the humidification liquid passageway 110 to seal in the thermally reactive structure 107 and the dry gases that have filled the interstitial spaces of the thermally reactive structure 107. to prevent humidification liquid HL from freely passing through into the outer container 100 from the humidification liquid chamber HLC. The sealing member structure 128 covers and temporarily seals the humidification liquid passageway 110 and deforms and unseals to allow flow of humidification liquid HL into the dry gas chamber DGC from the humidification liquid chamber HLC when a force is applied to the humidification liquid chamber HLC. As stated before, sealing member 128 may also be a duckbill valve 230 as shown in FIG. 24 as an added member to ensure ease of assembly as will be shown later.

As shown in FIGS. 14, 17, 24, 26, 27 and 28, vapor passageways 119 can be anywhere on the walls of the outer container 100 but is preferably made at the highest possible position, i.e. on the outer container cone wall 104, that defines part of the dry gas chamber including as shown in FIGS. 14 and 24, on the inner container outer wall 201. As shown in FIG. 22, it is not necessary that the vapor passageways 119 be on the humidification liquid chamber bottom wall 133 since the same purpose can be achieved if the vapor passageways 119 is placed anywhere on the outer container 100 to allow the easy displacement of gases within the dry gas chamber DGC as shown in FIGS. 2, 3, 5, 6, 7, 12, 14, 17, 18 and 19.

Grease and other lubricating agents L, can be applied to the barrier structure cylindrical walls inner surface 131, as shown in FIGS. 23 and 24, to allow for easy sliding of the humidification liquid chamber over the outer container cylindrical walls 102. The barrier structure cylindrical inner surface 131 should slide freely and to cover over the outer container cylindrical wall 102 outer surface as shown in FIG. 24. Preferably, the barrier structure M is a vacuum-formed plastic piece formed in the manner similar to how a solo-cup is formed. The barrier structure M can also be made by pressing it in a mold from wax-lined cardboard that does not absorb liquids.

As shown in FIG. 24, the humidification liquid HL is filled into the barrier structure M before the barrier structure M is mated sealingly with the outer container cylindrical outer wall 102. To prevent pressure build-up and bleed of any gases in the barrier structure as it is mated with the outer container wall 201, a duckbill valve 230 or a filtration membrane 119 is temporarily placed on the barrier structure bottom wall 133 as shown in FIG. 24. The same can be achieved by a pin hole 231 on the wall of the barrier structure wall 103 that will close off upon fully mating the outer container cylindrical wall 102 with the barrier structure cylindrical walls inner surface 131. Thus, when filled 76% or more with water for example, the apparatus 10 can be turned to sit on its lid 116 and then pushed and slid over the outer container outer wall 102 until the humidification liquid level is close to the barrier structure bottom wall 133 with at least 5 mm overlap of the walls achieved. Alternatively, a duckbill valve 230 may be used to bleed off the gases in the humidification liquid chamber head space during assembly.

As before, the thermally reactive structure 107 is prepared and positioned as per any of the prior embodiments described above and, in any combinations, thereof without limiting the scope of the invention. A dry gas DG, such as either Dimethyl ether (DME) or $CO_2$, depending on whether cooling or heating is required respectively of the apparatus 10, is then flowed into the outer container 100 to remove any traces of air within the interstitial spaces in the thermally reactive structure 107.

As stated before, if the inner container 200 is not yet filled with a food product, the two containers may also be co-seamed with a single outer container lid 116 by abutting the inner container sealing flange 207 with the outer container sealing flange 108 and seaming the two together with the lid as conventionally done in canning plants. Since the inner container 200 slides fittingly into the open rim 106 of the outer container 100, the two containers can also be sealing joined by bonding and gluing agents to form a glue bond GB. In such as case, the inner container 200 should be inserted into the outer container 100 until the inner container conical neck 204 is just adjacent to the outer container sealing flange 108 as shown in FIG. 12. The combination of the two containers forms Dry gas chamber DGC and eventually, the humification liquid chamber HLC.

Beverage container lid 113 has a beverage opening means 116 and a scored portion 116a that can be easily broken to open by means of the beverage container opening means for consuming the beverage B, using a finger pull motion as is conventionally done. The apparatus 10 is now ready to be used as invented.

To activate the invention, a hand or finger force F, is applied to outer container 100 to move against the barrier structure M, and sealingly sliding the barrier structure over the outer container cylindrical wall 102 to pressurize and break the sealing member 128. The humidification liquid HL is pumped into the dry gas chamber DGC. The build-up of liquid pressure in the humidification liquid HL causes the sealing member 128 to deform, and hydrostatically open and empty the humidification liquid HL through the humidification liquid passageway 110 into the dry gas chamber DGC.

In the case when there is sufficient dry gas DG within the dry gas chamber, the humidification liquid HL absorbs dry gas DG as it enters into the dry gas chamber DGC and generates a vacuum to further pull the humidification liquid HL into the dry gas chamber DGC. As such if sufficient dry gas DG is used, no vapor passageways 119 on the conical wall 104 and no filtration membrane 117 are required by the invention. Thus, necessarily, if one eliminates the dry gas DG, one could use the vapor passageways 119 and the filtration membrane 117 to allow the passage of gases through the apparatus 10 as the humidification liquid HL enters and displaces gases in the dry gas chamber and in the interstitial spaces of the thermally reactive structure 107. This should not limit the invention since the dew point of dry gas DG that is used can vary with time as the dry gas DG gets saturated slowly over time. To compensate for this possibility, vapor passageways 119 and filtration membrane 117 have been anticipated as needed by the invention to prevent such humidification over time. For example, simply flooding and saturating the dry gas chamber DGC with an extremely dry gas such as DME and $CO_2$, will eliminate the need for a vapor passageway 119 and the filtration membrane 117 on the conical wall 104, since the DME will be absorbed by the humidification liquid HL and create a vacuum that pulls the humidification liquid HL into the dry gas chamber DGC.

In the case of heating, DME is a particularly effective gas in generating a vacuum when it is absorbed by water exothermically. As such DME and other suitable exothermically absorbable gases such as Solstice Enhance™ may be used for the heating process, while noble gases and $CO_2$ may be used for the cooling process. The thermally reactive structure 107 dissolves and endothermically cools or alternatively heats the beverage B depending on its composition. With the foregoing, the apparatus 10 can be oriented in any way when the humidification liquid chamber HLC is pushed to empty the humidification liquid HL into the dry gas chamber DGC.

Fourth Embodiment of the Invention, and Method of Manufacture

As shown in FIGS. 25-31, the fourth embodiment of the invention comprises the same elements as the prior embodiments except that the sealing member 128 has a tube portion 130a that is a flexible and resilient like a soft rubber. A sealing member support 134 is provided in the form of an annular inner container holding ring 135 with protruding support legs 136 which keep the silicone tube 130a portion at approximately the center of the inner container 200 when not carbonated. Annular inner container holding ring 135 is designed to snugly fit on the outer container cylindrical wall inner surface 101 and to snugly hold the inner container inner container outer cylindrical wall 201. The sealing member 128 has humidification liquid passageway 110 in the form of a silicone tube 130 that passes through annular inner container holding ring 135 and thus protrude into the annular ring inner container holding ring 135. The Sealing member support 134 is designed to tightly hold the inner container 100 and thus to compress the silicone tube 130a when it is between the inner container 100 and the annular inner container holding ring 135. The design of the annular inner container holding ring 135 may incorporate the silicone tube 130 as part of its structure.

The first step in manufacturing the invention is to open up a vapor passage way 119 on the outer container 200, preferable on the outer container conical neck 104. If an adequate amount of dry gas DG is used, humidification liquid passageway 110 and the filtration membrane 117 may be eliminated altogether, since the dry gas DG will be absorbed by the humidification liquid HL to allow humidification liquid HL to completely saturate the thermal reactive structure 107.

The second step is to open up a base dome hole 139 through the outer container base dome 103 to snugly and sealing pass the silicone tube 130a through the outer container 200.

The third step in manufacturing the apparatus 10 according to the fourth embodiment is to insert the sealing member support 134 through the open outer container open rim 106 into the outer container 200, and for the support legs 136 to sit inside the outer container base dome 103, and to be held snugly against the outer container inner cylindrical wall 101 with the extended sealing member 128 tube passing snugly through the base dome hole 139 to protrude some distance below the outer container base dome 103.

Figure 5:
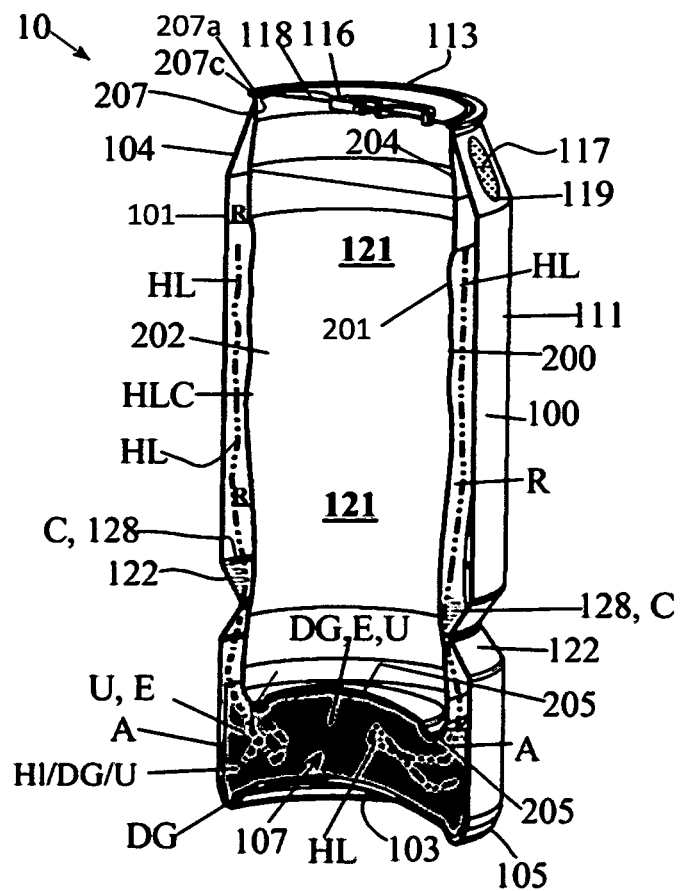
FIG. 5 shows a cross section of apparatus after opening the lid opening means with the loss of pressure of the inner container causing the inner container to slightly deform by compression from the pressure in the dry gas chamber causing the passage of humidification liquid into dry gas chamber.
Figure 6:
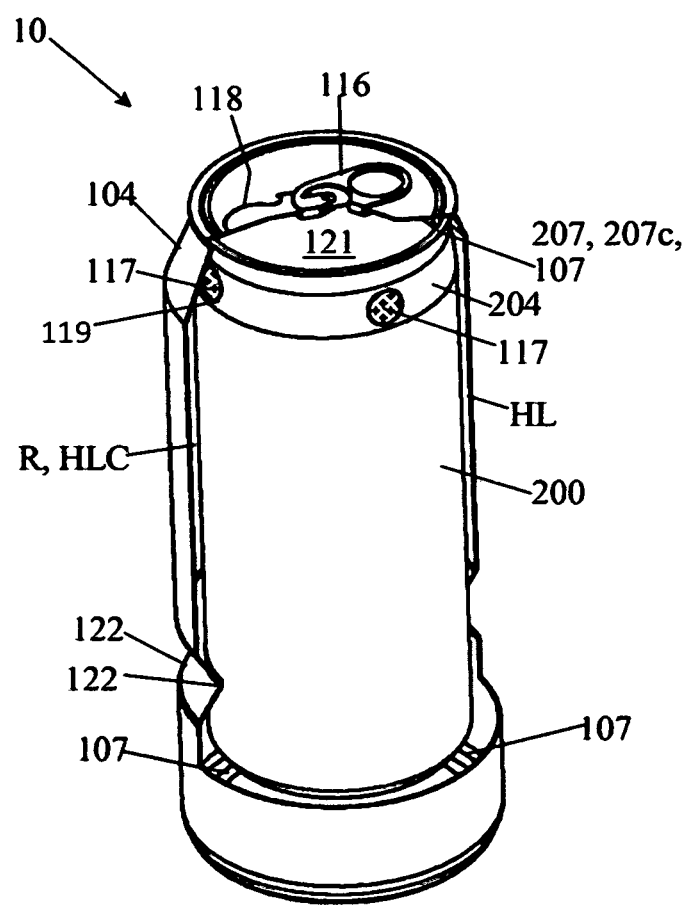
FIG. 6 shows the first embodiment of the invention with one or more the filtration membranes attached to cover a dry gas passageway through the cylindrical wall of the inner container.

The third step is to co-crimp and alternately to weld the inner cylindrical wall 102 to the outer container conical neck 104 as shown in FIG. 5. Once again, inner container 200 is inserted through the outer container open rim 106 until the inner container sealing flange 108 rests and snugly sits on the outer container sealing flange 207. Alternately, if the inner container 100 is already filled and carbonated with beverage, the inner container outer cylindrical wall 202 can be glued using a food grade superglue to the outer container conical neck 104. The two containers form the Annular space R, to hold the thermally reactive structure 107 with the dry gas DG. Preferably, the inner container 100 is already filled and sealed and ready to be consumed but this is not necessary since it may be crimped at a later stage. The filled and sealed inner container when inserted into the outer container 200 fits snugly into the annular inner container holding ring 135 of the Sealing member support 134 and compresses the sealing member 128 against the annular ring inner container holding ring 135 and seals the tube off. However, the silicone tube 130 used for the sealing member 128 and the humidification liquid passageway 130 must be rigid enough to force a non-pressurized inner container outer cylindrical wall 202 to give in, and allow the tube to re-expand and open. It is important to note that the sealing member 128 may be built into the same structure as the Sealing member support 134 as one piece. The rigid pressurized inner container outer cylindrical wall 202 and the annular Sealing member support structure 134 sitting inside the base of the outer container 103 are held snugly by the outer container inner cylindrical wall 101. As a consequence of the increased rigidity of the inner container walls under carbonation pressure, the silicone tube 130a is pinched off by the pressure exerted by the inner container outer cylindrical wall 202 on the annular inner container holding ring 135, to block off any humidification liquid HL from entering the dry gas chamber DGC through the humidification liquid passageway 130 on the silicone tube 130 before use of the apparatus 10.

A filtration membrane 117 is placed on the inside surface of the dry gas chamber DGC to block any liquid from passing through the vapor passageways 110. An outer container dome hole 125 with a diameter of about ¼" to ½" is made through the outer container base dome 103. If an adequate amount of dry gas DG is used, humidification liquid passageway 110 and the filtration membrane 117 may be eliminated altogether, since the dry gas DG will be absorbed by the humidification liquid HL to allow humidification liquid HL to completely saturate the thermal reactive structure 107.

The next step is to fill the Annular space R, acting as the dry gas chamber DGC with the thermally reactive structure 107 in the form of granules and prills. A filtration membrane 117 then seals off the vapor passage way 119 on the outer container 200.

For this version of the invention, Solstice gas, generally referred to as Solstice Enhance™, and manufactured by Honeywell Corporation, is added to distilled water to act as humidification liquid HL for the invention. As in the prior embodiments, the humidification liquid chamber HLC is a cup-like structure that is not movable or slidable relative to the outer container 200.

The next step is to fill the open humidification liquid chamber HLC to about 80% of its fill volume with a mixture of Solstice Enhance™, and water to act as humidification liquid HL. It is preferable that the mixture be in the range of 5%-50% Solstice Enhance™. The open rim 126 and the unfilled portion of the humidification liquid chamber HLC with the humidification liquid HL mixture in it, is then glued sealed or welded sealed to the bottom of the outer container 100 to form a sealed humidification liquid chamber HLC. This can be achieved by a suitable super glue or by thermo-welding the open rim of the humidification liquid chamber HLC to the outer container outer cylindrical wall 102 to seal the humidification liquid chamber HLC, with the humidification liquid inside.

Sealing member 128 takes the form of the silicone tube sealingly passing through the base dome hole 139 of the outer container 200 to act as humidification liquid fluid passageway between the humidification liquid chamber HLC and the dry gas chamber DGC. It is important that the silicone tube extend to the bottom of the humidification liquid chamber HLC interior surface to tap all the humidification liquid HL from the bottom of the humidification liquid chamber HLC. The trapped Solstice Enhance™, and water acting as humidification liquid HL, will be under very slight pressure at room temperature.

When the beverage carbonation pressure is released, the slight pressure of the Solstice Enhance™ in pushes the water into the dry gas chamber DGC to cause the cooling effect as described in prior embodiments. As in the prior embodiments, a filtration membrane 117 is required to exhaust any dry gas DG from the dry gas chamber DGC as the humidification liquid HL enters into the dry gas chamber DGC to fully saturate the dry gas chamber DGC and cause the reactants A to heat or cool and the dry gas to absorb water and also cool simultaneously.

Figure 30:
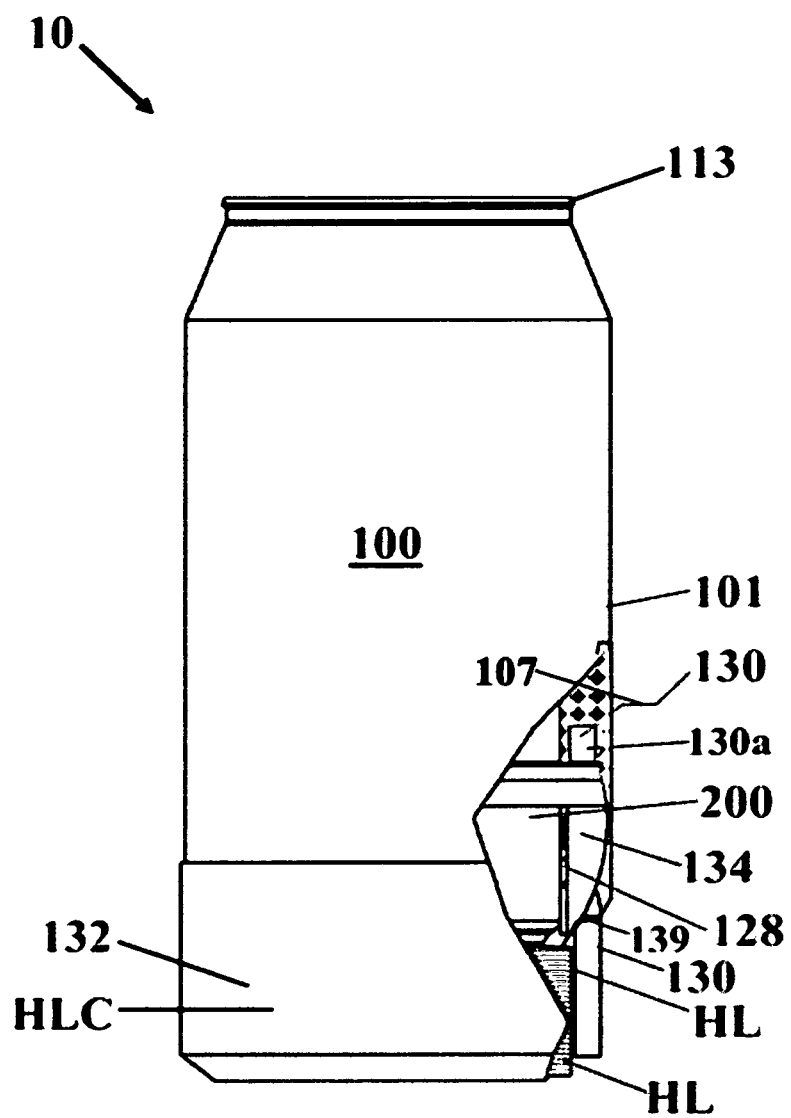
FIG. 30 is a partial cut away view showing the sealing member support means according to the fourth embodiment of the invention, and showing the sealing member as a flexible silicone hose with a humidification liquid passageways being compressed into a sealing configuration between the inner container outer wall and the sealing member support means to seal off the humidification liquid from entering the dry gas chamber DGC and interact with the thermally reactive structure until the pressure of the inner container is released.
Figure 31:
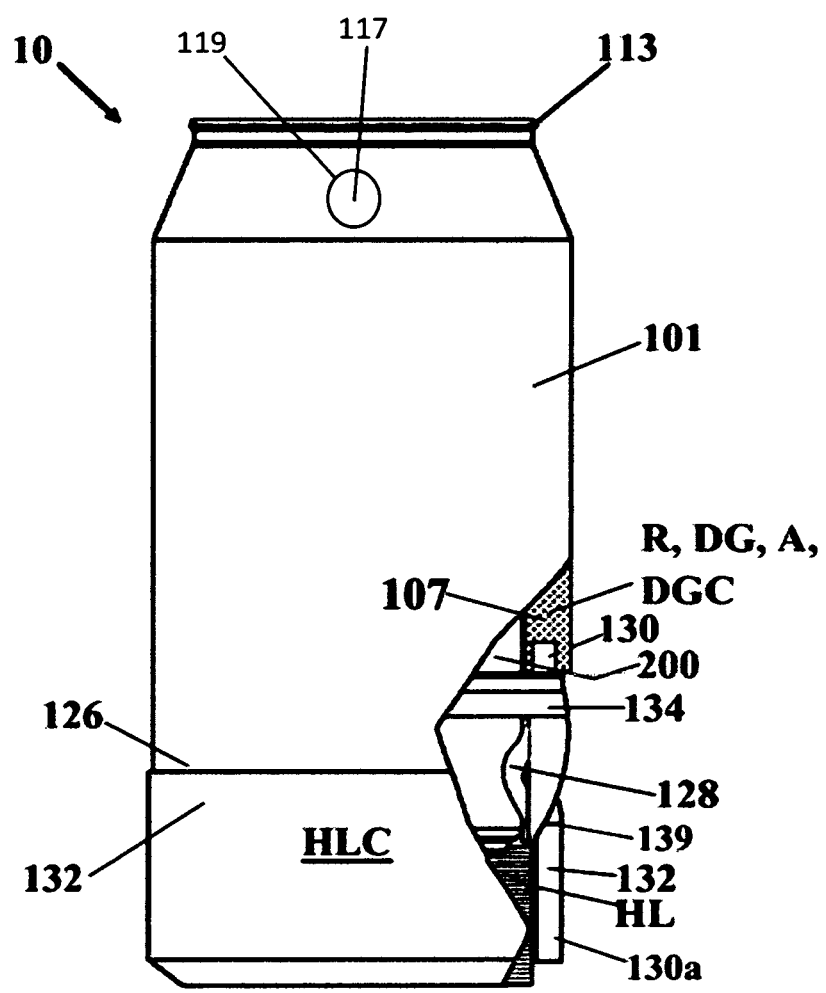
FIG. 31 is a partial cut away view of the apparatus when the inner container is opened for consumption according to the fourth embodiment of the invention. The loss of carbonation pressure opens the sealing member from a sealing configuration to expand back from a closed configuration to its normal an open configuration and allows humidification liquid to enter into the dry gas chamber and interact with the thermally reactive structure.

Upon opening the inner container 200 for consumption, the silicone tube 130 acting as the sealing member 128 expands from the compressed and shut-closed configuration as shown in FIG. 30, to the decompressed and open configuration as shown in FIG. 31. Humidificationliquid HL is then free to enter into the dry gas chamber DGC.

Figure 13:
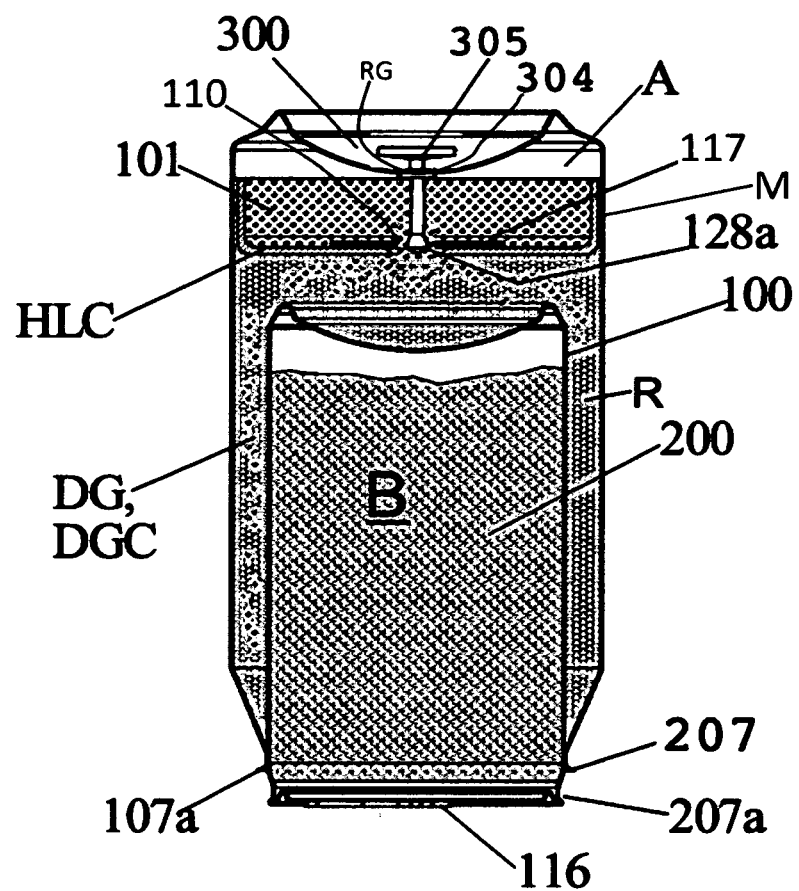
FIG. 13 shows the second embodiment of the invention with the finger press actuator pressed down to break the Sealing member structure to release humidification liquid into the dry gas chamber and activate the thermal change process in the apparatus.

While there many other means of forming the thermally reactive structure of each embodiment that have not been described, it is obvious to one skilled in the art that a variety of methods could be used to achieve the same goal. Once again, apart from $CO_2$ other environmentally friendly gases may be used with the invention. For example, Dry Air and Dry Nitrogen may be used, even though it will only be stored in gaseous form. It is anticipated that the cost of the components needed to mass manufacture the apparatus 10 in the forms shown above is less than US $0.20 per unit. As shown in FIG. 13, the wax seal forming a portion of the Sealing member structure 128 may be replaced by a simple plastic layer 228 forming a barrier. One-way duckbill valves 230 may be used with small tubes to connect the dry gas chamber DGC to the humidification liquid chamber HLC and allow a one-way flow of the humidification liquid in instances where carbonation pressure is used to pump the humidification liquid HL into the dry gas chamber DGC when carbonation pressure is released by opening the beverage container opening means 116. Alternative material selections can be used, once again, to form the inner container 200 and the outer container 100. For example, plastic rather than aluminum containers may be used to achieve the same purposes. In the case of a plastic outer container 100, the open end may be left open for insertion of either humidification liquid HL or thermally reactive structure 107. Then, the open end 106 can be heat shrunk to seal and form the two chambers with the inner container 200 and the outer container 100.

Fifth Embodiment of the Invention, and Method of Manufacture

FIGS. 32-36 show the fifth embodiment of the present invention. As shown in FIGS. 32-36, the apparatus 10 again comprises an outer container 100, this time serving to contain a food product, holding a food product such as a carbonated beverage B; an outer container lid 116 with an inner container sealing flange 207 for fluidly sealing the outer container sealing flange 207 in a conventional rotary seaming manner; an inner "slim" beverage container 200 serving as a dry gas chamber HLC; an inner container lid 216 for fluidly sealing the outer container sealing the inner container 200 in a conventional rotary seaming manner to form a dry gas chamber DGC; a thin-walled, (0.02"-0.05" in thickness) humidification liquid chamber HLC in the form of a canister smaller in volume than the inner container 100 with a humidification liquid chamber cylindrical wall 400, and a humidification liquid chamber bottom wall 404 and a humidification liquid chamber top wall 403. The humidification liquid chamber HLC contains about 90% of its volume in a humidification liquid HL.

The dry gas chamber DGC, contains about 90% of its volume a thermally reactive structure 107 infused with dry gas DG such as CO2, DME or Solstice.

Figure 34:
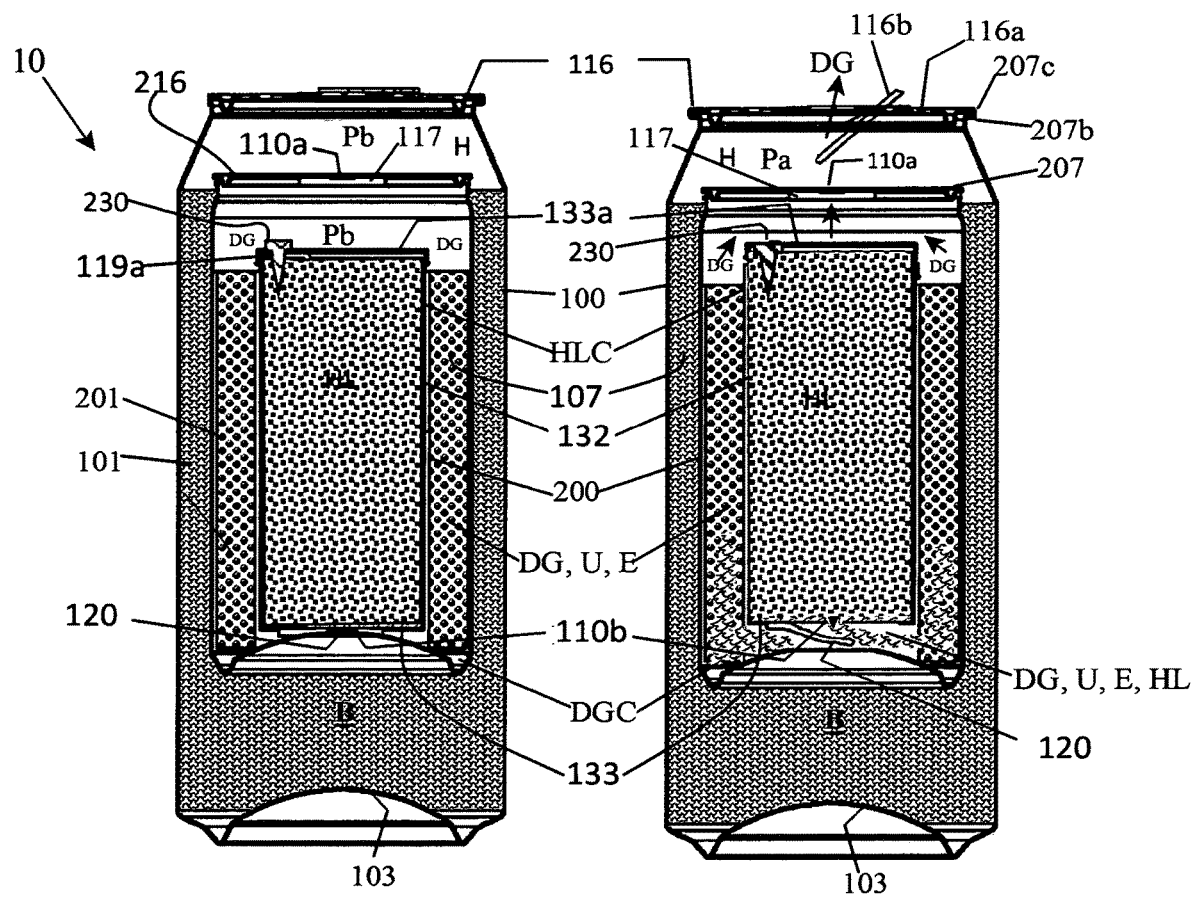
FIG. 34 shows a cross section of the apparatus in two states, before opening the apparatus for consumption, and after opening the apparatus for consumption. On the left, the humidification liquid chamber and the dry gas chamber have gases that are of equal pressure to the carbonation pressure of the food product in the outer container. To the left, the outer container is opened for consumption and the pressure of the outer container drops allows the pressure of the dry gas chamber to drop also. Consequently, the pressure of the humidification liquid chamber forces the filtration membrane to open and allows humidification liquid to enter into the dry gas chamber and start a thermal reaction with the thermal reactive structures in the dry gas chamber, thereby generating a thermal change in the product. As shown, a duckbill valve may replace the filtration membrane to allow carbonation gases only to pass quickly into the humidification liquid chamber from the dry gas chamber.

The dry gas chamber DGC which in essence is the inner container 100 surrounds the humidification liquid chamber HLC and is surrounded by the food product B. A vapor passageway 110a in the form of a small hole about 2 mm-5 mm in diameter passes through the inner container lid 216 to fluidly (gases only) connect the dry gas chamber DGC to the food product B carbonation gases; and is covered by a filtration membrane 117. A second humidification liquid passageway 110b passes through the humidification liquid chamber bottom wall 404 to fluidly (gases only) connect the dry gas chamber DGC to the humidification liquid chamber HLC. Vapor passageway 110a can be covered by either a filtration membrane 117, as shown in FIG. 34.

Figure 32:
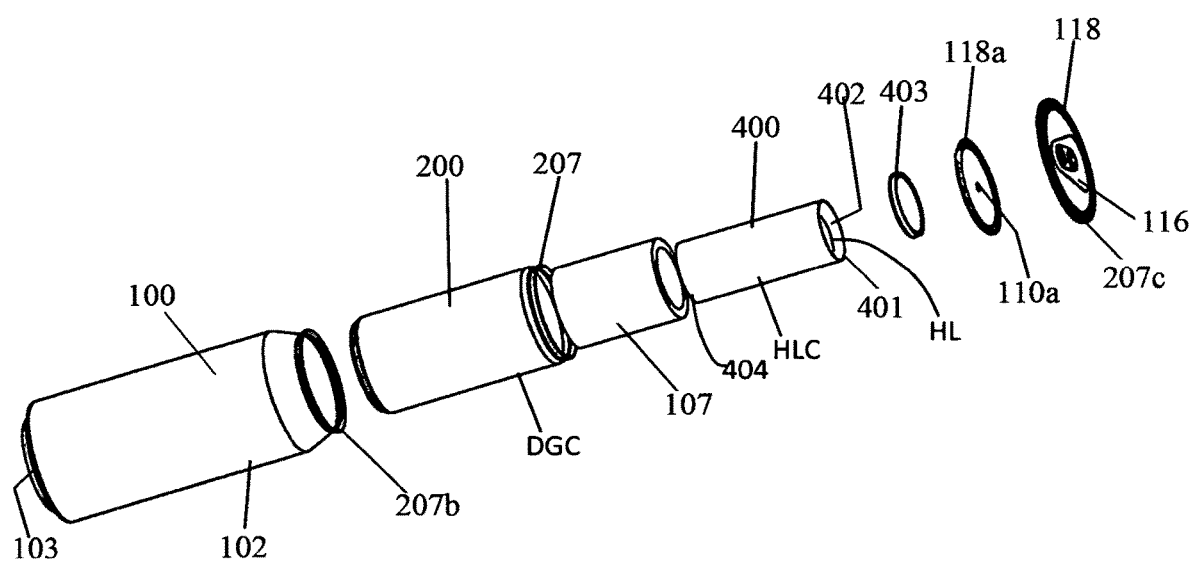
FIG. 32 shows an exploded view of the fifth embodiment of the invention. The humidification liquid chamber is contained within the dry gas chamber. A smaller inner beverage container acts as the dry gas chamber.

As before, filtration membrane 117 has a thin peripheral glue lining that holds it in place. Glue lining 117a shown in FIG. 9, should not allow carbonation pressure $P_b$ to dislodge the filtration membrane 117. The filtration membrane 117 may take on any suitable shape whatsoever. The pore size for the filtration membrane should be no less that 1 micron and no more that 5 microns. Advantageously, filtration membrane 117 can be used to cover both sides of the vapor passageway 110a through the dry gas chamber lid 118a to prevent at least one of them to remain in place when carbonation pressure acts on them. (only one such membrane is shown in FIG. 32).

A humidification liquid passageway 110b in the form of a small hole about 2 mm-5 mm in diameter is made through the humidification liquid chamber bottom wall 404. Humidification liquid passageway 110b is covered with a filtration membrane 117, to fluidly separate the humidification liquid chamber HLC from the dry gas chamber DGC.

Figure 35:
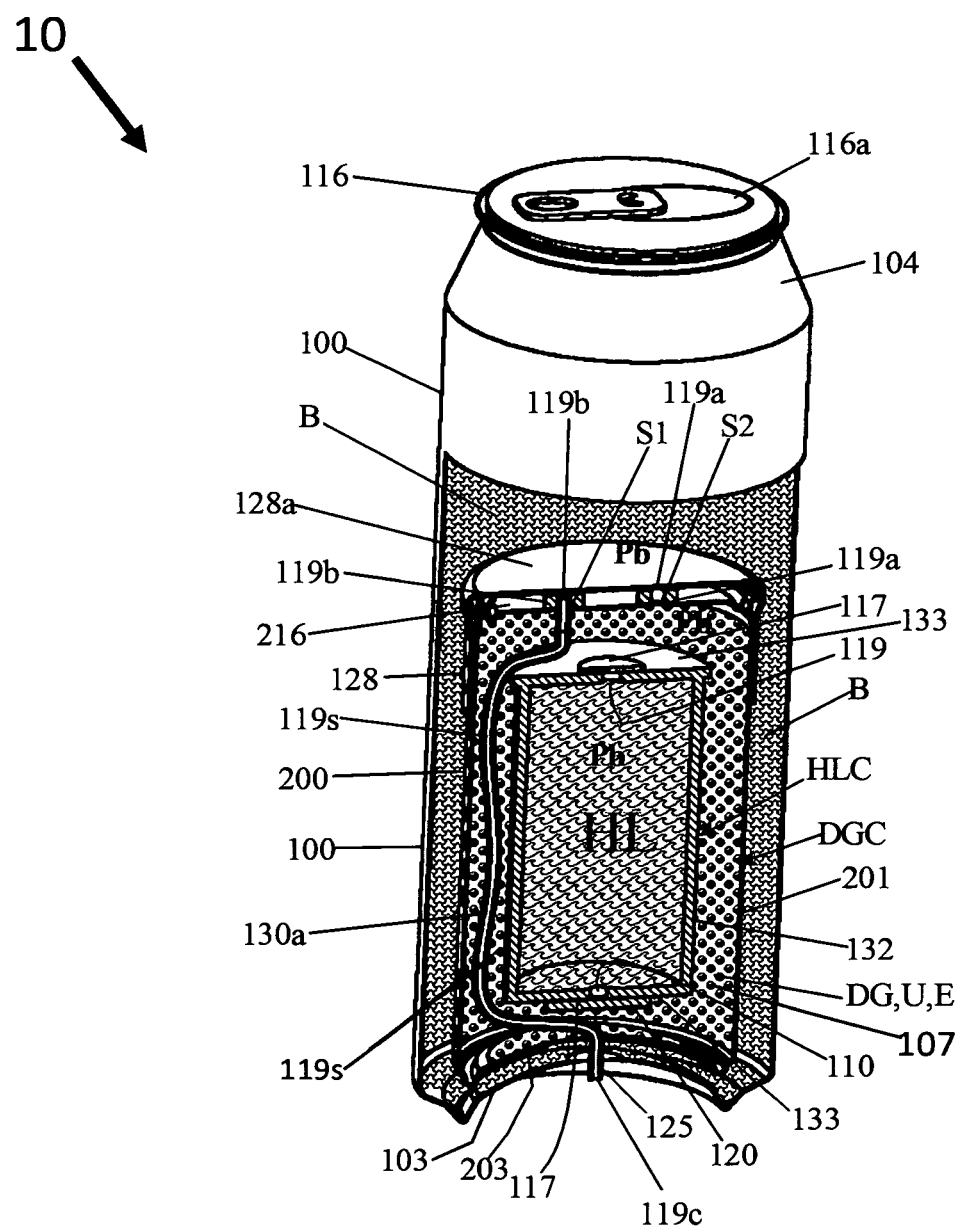
FIG. 35 shows yet another method of making the fifth embodiment by reconfiguring the vapor passageway as a tube that is sealed by carbonation pressure acting on a sealing membrane in the form of a simple thermoformed cup that caps over the dry gas chamber. The sealing member is forced by carbonation pressure to seal the dry gas chamber until the carbonation pressure is relieved to atmospheric pressure when the sealing member is expanded to an unsealing configuration to allow dry gases to freely pass to atmosphere at the bottom of the outer container through a tube.
Figure 36:
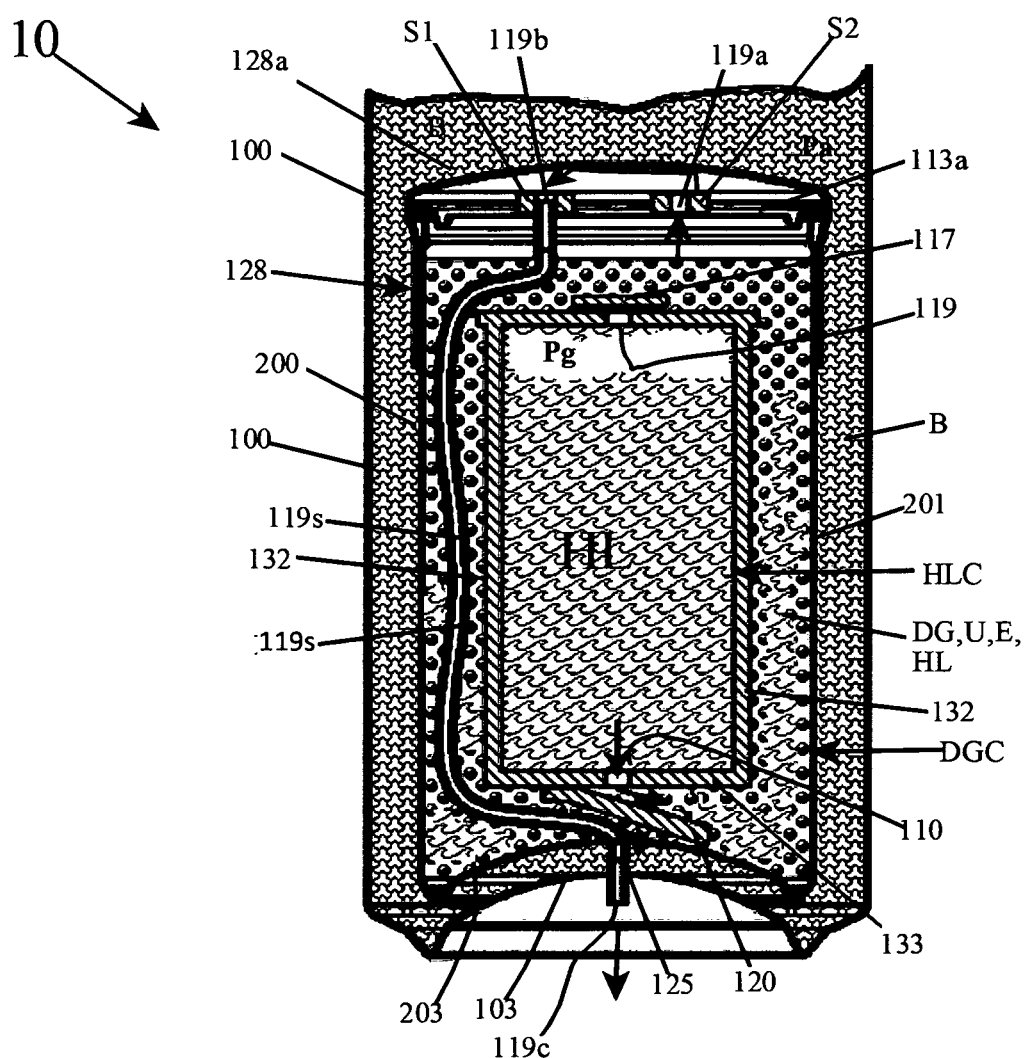
FIG. 36 shows the activated state of the fifth embodiment when carbonation pressure is released and the sealing membrane no longer seals the dry gas chamber. The pressure build up in the humidification liquid chamber forces humidification liquid to break a filtration membrane and enter into the dry gas chamber to achieve heating or cooling as desired.

If a filtration membrane 117 is used to cover the humidification liquid chamber passageway 110a, the glue lining 117a that holds the filtration over vapor passageway 110a should be strong enough to hold the weight of the humidification liquid HL in the humidification liquid chamber HLC, but not be able to withstand carbonation pressure. Carbonation pressure $P_b$ should be sufficient to dislodge the glue lining 117a that holds the filtration over vapor passageway 110a As shown in FIG. 35, is anticipated that a protective sealing member 128a (shown asa transparent membrane in FIG. 33), in the form of thin membrane of plastic or paper with glue lining on its edge is preferably used to cover over vapor passageway 110a should be strong enough to hold the weight of the humidification liquid HL in the humidification liquid chamber HLC, but not be able to withstand carbonation pressure. Filtration membrane 117 can be dislodged or broken by carbonation pressure $P_b$ to allow humidification liquid HL to pass through humidification liquid passageway 110b when the apparatus 10 is opened for consumption.

When carbonation pressure acts on the filtration membrane 117, from the outside, i.e. the food product pressure Pb acting on the filtration membrane 117, the pressure will reinforce the glue lining 117a bond of the filtration membrane 117 used to cover either the vapor passageway 110a and the humidification liquid passageway 110b.

The humidification liquid chamber HLC is made with a diameter smaller than the inner container 200 that forms the dry gas chamber DGC. It should be sized to be inserted into the inner container 200 through its open rim 207, and to rest inside therein, giving enough clearance for the inner container lid 118a to be sealed onto the inner container 200. Thermally reactive element 107 is formed as a segment of an open cylindrical tube, to have an outer diameter that just slidingly passes through the open neck diameter of the open rim 207 of the inner container 200, with an inner diameter that just slidingly allows the humidification liquid chamber HLC to pass through its inner diameter. Alternatively, thermally reactive structure 107 may be made granular to pour into the inner container when the humidification liquid chamber HLC is in place.

The inner container 200 should be made with a volume of 25% to 50% of the outer container 100. The height of the inner container 200 should always be less that the inner available free height of the outer container 100.

The thermally reactive structure 107 can be press molded from a cylinder mold as explained earlier, and can have surface features such as crackling, scores and other features to allow for the maximum area exposure to humidification liquid HL. Preferably both the outer container 100 and the inner container 200 are made from aluminum in the manner of conventional beverage containers as explained earlier. Preferably, the inner container 100 has a conventional 200 diameter lid and a 202-body diameter (known as the sleek can version); and the outer container has a lid conventional lid diameter of 202 and a conventional 204 body diameter, (known as the standard version).

After filling the food product, such as beverage B, into the outer container 100 to surround the inner container 200, and seaming the outer container 100 with the outer container lid 118, the product will raise the internal carbonation pressure $P_b$, of the outer container 100. The carbonation gas from within the outer container 100 will force its way and pass through the filtration membrane 117 covering the vapor passageway 110a and enter into the dry gas chamber DGC within the inner container 200. The carbonation gas in the dry gas chamber DGC within the inner container 200 will also force its way and pass through the filtration membrane 117 covering the vapor passageway 110a into the vapor passageway 110a and enter into the and carbonate the humidification liquid HLC and the pressure therein will equilibrate to the same pressure $P_b$ as the pressure in the dry gas chamber DGC and the carbonation pressure Pb of the food product in the outer container 100. The filtration membranes 117 does not allow any liquid food product to pass through into the dry gas chamber DGC and therefore no liquid food product enters into the humidification liquid chamber. Only gas passes through the filtration membranes 117.

With this equilibration in pressure, the apparatus 10 is ready for use.

Figure 33:
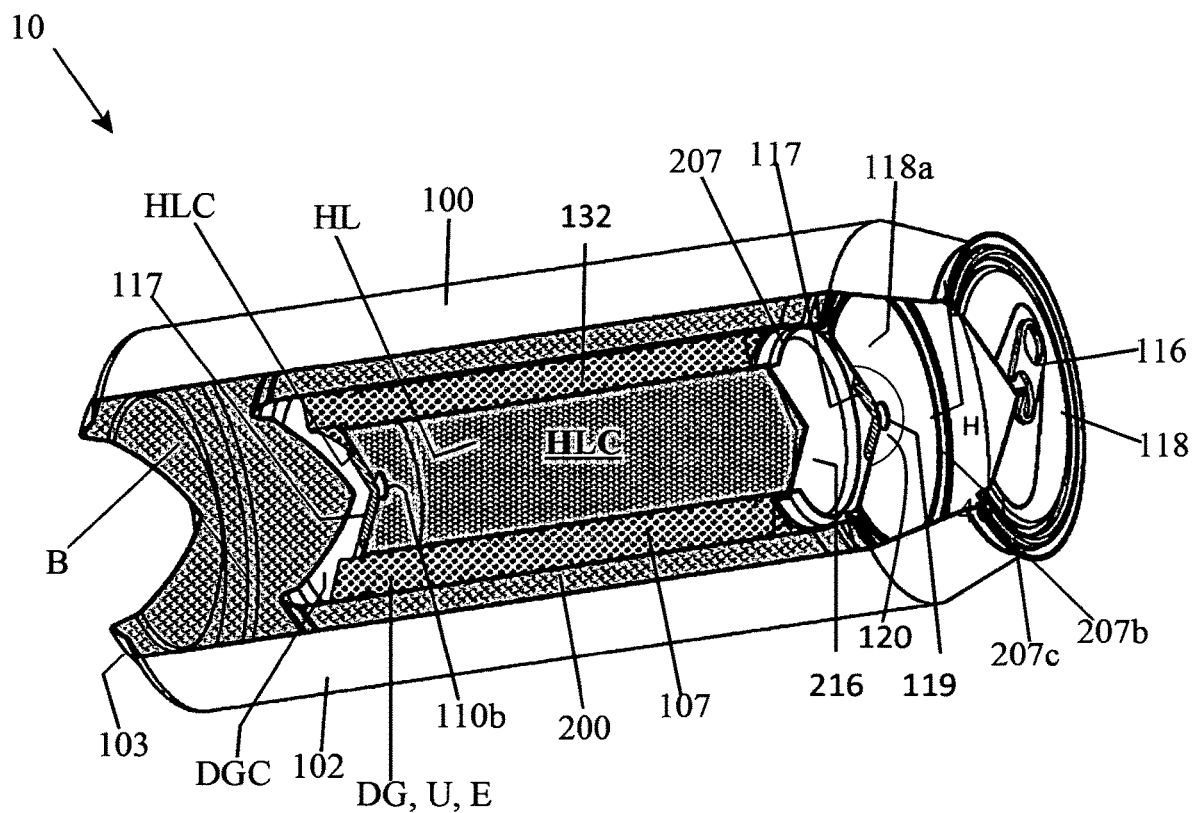
FIG. 33 shows a cut away perspective view of the apparatus according to the fifth embodiment. An internal dry gas chamber in the form of a smaller standard slim container containing thermally reactive structures is shown as an inner container inside the sealed outer container enclosing a humidification liquid chamber containing humidification liquid. A vapor passageway on the dry gas chamber is covered by a filtration membrane to allow only the pressurized gases of the food product (carbonation) to enter into the dry gas chamber and pressure it. The same pressure is transmitted through either a second filtration membrane or a duckbill valve covering a vapor passageway on the humidification liquid chamber. When the apparatus is opened for consumption, the pressure of the dry gas chamber reduces and the higher pressure of the humidification liquid chamber breaks open the filtration membrane to pump humidification liquid into the dry gas chamber and cause a thermal reaction to heat or cool the food product.

When the apparatus 10 container lid opening means 116 is actuated by a user, the carbonation pressure $P_b$ drops to atmospheric pressure Pa as illustrated in FIG. 33. The pressure $P_{DG}$, within the dry gas chamber DG starts to drop as the carbonation gases in the dry gas chamber DGC pass through the vapor passageways 119 to atmosphere. As the pressure $P_{DG}$ drops in the dry gas chamber DGC, the pressure $P_{HL}$ in the humidification liquid chamber HLC also drops to match the pressure $P_{DG}$ of the dry gas chamber DGC. This pressure change process dislodges the sealing membrane 120 covering the humidification liquid passageway 110 allowing humidification liquid HL to be expelled into the dry gas chamber DGC and effectuating a thermal change reaction between the thermally reactive structure 107 and the humidification liquid HL. The dry gas DG in the dry gas chamber is released and it absorbs humidification liquid HL vapor as it is expelled from the apparatus through the container lid 116 and depending on the structure of the thermally reactive structure 107, this causes either a cooling or heating effect of the food product through the dry gas chamber walls 201.

Advantageously, the humidification liquid chamber HLC can be made from very thin plastic material and even from wax lined cardboard and the walls can range in thickness from 0.01" to 0.05" in thickness. Advantageously, the inner container can just float on the food product, B without hindering any operation or use of the apparatus 10.

By the same design advantageously, by adding a thin layered sealing member 118a to sealingly cover over the dry gas chamber DGC, more cooling can be achieved by the apparatus 10, since now, the pressure inside the dry gas chamber can be increased considerably to accommodate even more dry gas DG than can be captured by the interstitial spaces of the thermally reactive structure 107. Sealing member 118a is made as one of, a thin wax layer, a vacuum formed cup-like layer, and simply a plastic shrink sleeve over the dry gas chamber. As shown in FIGS. 33 and 34, two vapor passageways 110a and humidification liquid passageways 110b of the same proportions as before, are required to be made through the inner container lid 216 into the dry gas chamber DGC. Vapor passageway 110a communicated only with the dry gas chamber DGC. Vapor passageway 110b has an extended vapor passageway 110a that communicated with atmosphere through an outer container dome hole 125. The extended vapor passageway 110*a* must be passed sealingly through the outer container dome hole 125 and also through the humidification liquid passageways 110*b* extended vapor passageway 119*s* can be eliminated as a separately formed part and can be formed as part of the molded humidification liquid chamber HLC.

In this case, there is no fluid communication between the dry gas chamber DGC and the food product B. The only communication between the two chambers is a transmission of carbonation pressure Pb acting on the outer surface of the sealing member 128*a* to force the sealing member 128 to seal against the vapor passageway 119*a* and vapor passageway 119*b*. form a seal over the vapor passageway 119*a* and vapor passageway 199*b*. Seals S1, and S2 in the form of a simple one of a wax, a rubber, a putty and a grease coating can be used to form the seals S1 and S2. The seal S2 is used to seal the vapor passageway 119*a* into dry gas chamber DGC by means of carbonation pressure Pb deforming and acting on the sealing member 128. The seal S1 is also formed by means of carbonation pressure Pb deforming and acting on the sealing member 128 to seal of the vapor passageway 119*b* to atmosphere.

When the outer product container 100 is sealed and carbonated, both vapor passage way 119*a* and vapor passageway 119*b* are sealed by carbonation pressure Pb acting on the sealing member 128 and forcing the sealing member 128 against the seals S1 and S2.

The apparatus 10 can now be further charged with higher pressures of dry gas DG by means of the vapor passageway 119*c* at the end of tube 119*s* that is exposed to atmosphere. When a pressurized dry gas DG is forced into the vapor passageway 119*c* to go through extended vapor passageway 119*s*, it forces the seal S1 and seal S2 to open by dry gas DG pushing against sealing member 128 and opening the dry gas DG to enter into the vapor passageway 119*a* from vapor passageway 119*b*. Thus, advantageously, higher pressures $P_{DG}$ than carbonation pressure PB can be used for the dry gas DG in the dry gas chamber DGC. The pressurized dry gas DG in the dry gas chamber DGC passes through the filtration membrane 117 covering vapor passageway 119 through the humidification liquid chamber top wall 133*a*. This pressurizes the humidification liquid chamber HLC to the same pressure as the dry gas chamber pressure, $P_{DG}$.

The apparatus 10 is now ready for use. When the outer container lid opening means 116 open the lid score 116*a*, the carbonation pressure $P_b$ drops to atmospheric pressure, Pa. This causes the sealing member 120 to be dislodged from a sealing position and allows humidification liquid HL to exit through the humidification liquid passageway 110. The humidification liquid HL then enters the dry gas chamber DGC and interacts with the thermally reactive structure 107 and causes a change in temperature of the apparatus 10. The dry gas DG absorbs humidification liquid HL and also causes cooling or heating depending on the thermally reactive structure 107. Extra cooling and heating can be achieved by the increased pressures and storage mass of the dry gas DG using this method. The dry gas and any humidification liquid vapor pass through the extended vapor passageway 119*s* to atmosphere. The apparatus 10 according to this embodiment, has the advantage of having no fluid communication between the contents of the inner container 200 and the contents (food product) of the outer container 100.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A product temperature change container apparatus, comprising:

an inner container for containing a product and having an inner container internal pressure above ambient pressure surrounding said apparatus;

a humidification liquid chamber in thermal communication with said inner container;

a humidification liquid contained within said humidification liquid chamber;

a dry gas chamber in thermal communication with said inner container and comprising a thermally reactive structure in the form of a construction made from a material which is subject to endothermic reaction and containing interstitial spaces, said humidification liquid chamber being connected to said dry gas chamber to permit fluid communication between said humidification liquid chamber and said dry gas chamber, said fluid communication being blocked by a sealing member barrier structure abutting and making sealing contact with said inner container until said sealing member barrier structure is opened by inward collapse of said inner container upon loss of inner container internal pressure resulting from opening of said inner container to the surrounding atmosphere and thereby opening space between said sealing member barrier structure and said inner container to thereby open fluid communication between said humidification liquid chamber and said dry gas chamber; and a dry gas contained within said dry gas chamber and within said interstitial spaces in said thermally reactive structure;

such that opening said sealing member barrier structure activates cooling of the product in said inner container, by permitting at least one of said humidification liquid to flow into said dry gas chamber and said dry gas to flow into said humidification liquid chamber, and thereby to intermix, wherein a temperature change of said product within said inner container is generated by the absorption of humidification liquid by the thermally reactive structure which then releases said dry gas as an absorbable medium for further thermodynamic cooling.

2. The apparatus of claim 1, comprising: an outer container in the form of an outer can having an outer can first end tapering inwardly to an outer can opening to define a conical neck portion, said outer can opening being surrounded by an outer can rim having a product can rim flange, an outer can cylindrical-wall and an outer can second end with an outer can end wall;

wherein said inner container is a product can, said product can having a product can first end with a product can opening surrounded by a product can rim, a product can cylindrical wall and a product can second end with a product can second end wall, said product can being fit snugly and sealingly fit through said outer can rim, creating an annular space between said product can cylindrical wall and said outer can cylindrical wall, said outer can being longer than said product can such that there is a cylindrical space between said product can second end wall and said outer can second end wall; and a can lid sealingly joined to said product can rim flange by seaming;

wherein said sealing member barrier structure separates at least a portion of said annular space and said cylindrical space.

3. The apparatus of claim 2, wherein said sealing member barrier structure opens fluid communication by collapsing, and wherein said humidification liquid chamber comprises at least part of said annular space, and wherein said dry gas chamber comprises said cylindrical space.

4. The apparatus of claim 2, wherein said sealing member barrier structure comprises an indented, annular groove in said outer container extending inwardly and abutting said inner container while said inner container has said inner container internal pressure above ambient pressure surrounding said apparatus.

5. The apparatus of claim 1, wherein said dry gas has a dew point within the range of 10 degrees Fahrenheit to −150 degrees Fahrenheit.

6. The apparatus of claim 1, wherein said thermally reactive structure comprises a thermally reactive block structure.

7. The apparatus of claim 6, wherein said thermally reactive block structure comprises granules of a chemical reactant in crystalline form with crystalline structures defining between them said interstitial spaces.

8. The apparatus of claim 7, wherein said thermally reactive structure is formed of at least one endothermic compound where the apparatus is to cool the product.

9. The apparatus of claim 8, wherein said endothermic compound is one of urea, potassium chloride, and nitrate salts.

10. The apparatus of claim 8, wherein said exothermic compound is one of silica gel crystals, sodium silicate and ferrous metals.

11. The apparatus of claim 8, wherein said dry gas is at least one of: carbon dioxide, Solstice L41y (R-452B), Solstice 452A (R-452A), Solstice L40X (R-455A), Solstice zd, Solstice ze (R-1234ze), Solstice yf (R-1234yf), for cooling.

12. The apparatus of claim 1, wherein said sealing member barrier structure is one of a wax, a plastic material, a putty, a membrane, and grease.

13. The apparatus of claim 1, wherein said barrier structure is formed of at least one of: wax, plastic, putty, grease and a membrane.

14. An opening-activated product temperature change container apparatus, comprising:
a product container having a flexible product container wall for containing a quantity of carbonated product, said carbonated product creating carbonated product pressure within said product container above the atmospheric pressure surrounding said apparatus, and bearing against said product container wall and thereby keeping said product container wall taut and rigid, and having a product container lid for opening said product container to release said carbonated product pressure and said product;
a dry gas chamber in thermal communication with said product container wall;
a dry gas contained within said dry gas chamber;
a thermally reactive structure contained within said dry gas chamber, said thermally reactive structure containing interstitial spaces for receiving and storing said dry gas;
a vapor passageway in said dry gas chamber covered by a hydrophobic venting membrane permeable to dry gas and impermeable to liquids, for permitting dry gas to exit from said dry gas chamber when said dry gas is at a pressure above atmospheric;
a humidification liquid chamber structurally connected to said product container;
a humidification liquid contained within said humidification liquid chamber and under pressure above the atmospheric pressure surrounding said apparatus;
a resilient sealing member barrier structure between said dry gas chamber and said humidification liquid chamber for controlling fluid communication between said dry gas chamber and said humidification liquid chamber and having a sealing member barrier structure opening, said product container wall pressing against said sealing member barrier structure and thereby closing said sealing member barrier structure opening while said product container wall is kept rigid by said carbonated product pressure;
such that upon opening said product container lid and thereby releasing said carbonated product pressure, said product container wall loses its taut rigidity and flexes inwardly, permitting said sealing member barrier structure opening to resiliently open and thereby permit said humidification liquid to flow as a result of its pressure through said sealing member barrier structure opening and into said dry gas chamber, to react with said thermally reactive structure and said dry gas, generating a temperature change by the reaction of said humidification liquid with said thermally reactive, structure, and by the humidification of said dry gas further thermodynamically cooling said product, causing said dry gas to absorb heat from and thereby cool said product.

15. The container apparatus of claim 14, wherein said lid comprises a product container opening mechanism.

16. The container apparatus of claim 14, additionally comprising:
an abutment structure positioned adjacent to said product container wall;
wherein said sealing member barrier structure comprises a resilient tube opening into said humidification liquid chamber and extending to and opening into said dry gas chamber, and passing between said product container wall and said abutment structure, such that said product container wall laterally bears against and laterally compresses said resilient tube, thereby closing said resilient tube while said container wall is kept rigid by carbonated product pressure, and when said carbonated product pressure is released through opening said product container lid, said container wall loses its rigidity and becomes flexible, permitting said resilient tube to expand and open for passage of said humidification liquid into said dry gas chamber.

17. The container apparatus of claim 16, wherein said resilient tube comprises a duckbill valve preventing dry gas to flow into said humidification liquid chamber.

18. The container apparatus of claim 14, additionally comprising:
an abutment structure positioned adjacent to said product container wall;
wherein said sealing member barrier structure comprises a duckbill valve opening into said humidification liquid chamber and extending to and opening into said dry gas chamber and oriented to prevent dry gas to flow from said dry gas chamber into said humidification liquid chamber,
such that said product container wall laterally bears against and laterally compresses said duckbill valve, thereby closing said valve while said container wall is kept rigid by carbonated product pressure, and when said carbonated product pressure is released through opening said product container lid, said container wall loses its rigidity and becomes flexible, permitting said duckbill valve to laterally expand and open for passage of said humidification liquid into said dry gas chamber.

19. The container apparatus of claim 14, wherein said abutment structure bows a segment of said resilient tube toward said product container.

20. A opening-activated product temperature change container apparatus, comprising:
an outer can having an annular outer can wall tapering inwardly to an outer can first end with an outer can opening surrounded by an outer can rim, and having an outer can second end with an outer can second end wall, one of said outer can side wall and said outer can second end wall having a tube passing hole;
a product can for containing a carbonated product, said product can having a product can first end with a product can opening surrounded by a product can rim, a flexible annular product can side wall and a product can second end with a product can second end wall, said product can side wall snugly and sealingly passing through said outer can rim, defining an annular radial space between said product can side wall and said outer can side wall in thermal communication with said product can, said outer can side wall being longer than said product can side wall, and thereby defining a first cylindrical space between said product can second end wall and said outer can second end wall, said first cylindrical space and at least a portion of said annular radial space together defining a dry gas chamber;
a can lid sealingly fitted to said product can rim;
a quantity of carbonated product within said product can, said carbonated product creating a carbonated product pressure higher than atmospheric pressure surrounding said apparatus within said product can which bears against and makes taut and rigid said product can side wall and said product can second end wall;
a thermally reactive structure contained within said dry gas chamber;
a gas contained within said dry gas chamber for gas;
a cup-shaped humidification liquid chamber barrier structure having a barrier structure side wall fitted sealingly over and around said outer can side wall adjacent to said outer can second end, and having a barrier structure bottom wall, said barrier structure bottom wall being spaced from said outer can second end wall creating a second cylindrical space defining a humidification liquid chamber;
an abutment structure, and a resilient tube passing through said tube passing hole and having a tube first end opening into said humidification liquid chamber and a tube second end opening into said dry gas chamber, one of said product can side wall and said product can second end wall pressing against and compressing said resilient tube against said abutment structure and thereby closing said resilient tube while said product can cylindrical wall and said product can second end wall are kept rigid by said carbonated product pressure; and
a quantity of humidification liquid contained within said humidification liquid chamber under pressure above atmospheric pressure surrounding said apparatus;
such that upon opening said product container lid to release said carbonated product pressure, said at least one of product can side wall and said product can second end wall loses its rigidity, permitting said resilient tube to resiliently laterally expand and flex at least one of said product can side wall and said product can second end wall inwardly and thereby open and permit humidification liquid under pressure to flow into said dry gas chamber and react with said thermally reactive structure and said dry gas, wherein a temperature change is generated by the reaction of humidification liquid with said thermally reactive structure, and additionally by the humidification of said dry gas, drawing heat out of and thereby thermodynamically cooling said product.

21. The container apparatus of claim 20, additionally comprising a vapor passageway opening out of said dry gas chamber covered by a hydrophobic venting membrane permeable to dry gas and impermeable to liquids, for permitting dry gas to exit from said dry gas chamber when said dry gas is at a pressure above atmospheric pressure surrounding said apparatus.

22. The container apparatus of claim 20, wherein said resilient tube comprises a duckbill valve preventing dry gas to flow into said humidification liquid chamber.

23. The container apparatus of claim 20, wherein said abutment structure is located within said annular space and said resilient tube extends into said annular space and comprises a product container holding ring which is one of fitted snugly into and fastened to said outer can side wall, within which said product can is retained.

24. The container apparatus of claim 23, wherein a portion of said container holding ring bows a segment of said resilient tube toward said product container.

25. The container apparatus of claim 20, wherein said abutment structure bows a segment of said resilient tube toward said product container.

26. The apparatus of claim 20, wherein said thermally reactive structure is formed of a mixture of a gas and at least one of crystalline urea, nitrate salts and sodium bicarbonate.

27. The apparatus of claim 20, wherein said venting membrane comprises a portion of said outer can forming part of said dry gas chamber having a plurality of laser perforations forming a pattern of holes for permitting gases but not liquids to pass through and exit said dry gas chamber into the atmosphere surrounding said apparatus.

28. An opening-activated product temperature change container apparatus, comprising:
an outer can;
a carbonated product can within said outer can forming a sealed chamber between them, said outer can and said product can having a common opening out of said apparatus covered and sealed by a can lid;
a carbonated product within said carbonated product can;
and an annular barrier structure comprising a seal dividing said sealed chamber into a dry gas chamber and a humidification liquid chamber; said dry gas chamber being in thermal communication with said carbonated product can;
a thermally reactive structure within said dry gas chamber containing interstitial spaces for receiving and storing dry ingredients including a dry gas;
said dry gas chamber having a vapor passageway opening through said outer can wall covered by a hydrophobic venting membrane for permitting only gases to exit through said gas release opening from said dry gas chamber;
a humidification liquid under pressure above atmospheric pressure contained within said humidification liquid chamber; said barrier structure further comprising a resilient collapsible tubular member extending into the humidification liquid chamber and into said dry gas chamber to fluidly connect said chambers such that when the product can is pressurized, said resilient collapsible tubular member is compressed to form a fluid seal preventing fluid communication between said humidification liquid chamber and said dry gas chamber; and such that when said can lid is opened, and releases pressure within said product can, said barrier structure relaxes and opens, thereby opening fluid communication between said dry gas chamber and said humidification liquid chamber, permitting humidification liquid to flow under pressure into the dry gas chamber and react with said thermally reactive structure and said dry gas, wherein a temperature change thermodynamically cooling said carbonated product is generated by the reaction of humidification liquid with said thermally reactive structure, and by the humidification of said dry gas.

29. The apparatus of claim 28, wherein said lid comprises a lid opening mechanism.

30. The apparatus of claim 29, wherein said thermally reactive structure is formed of a mixture of a gas and at least one of crystalline urea, nitrate salts and sodium bicarbonate.

31. The apparatus of claim 29, wherein said venting membrane comprises a portion of said outer can forming part of said dry gas chamber having a plurality of laser perforations forming a pattern of holes for permitting gases but not liquids to pass through and exit said dry gas chamber into the atmosphere surrounding said apparatus.

32. A product temperature change container apparatus, comprising:

an inner container for containing a product;

a humidification liquid chamber;

a humidification liquid at a pressure contained within said humidification liquid chamber;

a dry gas chamber;

wherein at least one of said humidification liquid chamber and said dry gas chamber is in thermal communication with said inner container;

and wherein said dry gas chamber comprises a thermally reactive structure having interstitial spaces containing a dry gas at a dry gas pressure; said humidification liquid chamber being fluidly separated from said dry gas chamber by a sealing member barrier structure when said sealing member barrier structure is in pressure equilibrium between said dry gas pressure and said humidification liquid pressure; and opening said sealing member barrier structure opens fluid communication between said humidification liquid chamber into said dry gas chamber, such that said humidification liquid flows from said humidification liquid chamber into said dry gas chamber and into at least some of said interstitial spaces and said dry gas vacuously absorbs said humidification liquid into said interstitial spaces, thereby intermixing with said thermally reactive structure and vacuously at least partially dissolves said thermally reactive structure, wherein a temperature change of said product within said inner container is generated by vacuously dissolving of said thermally reactive structure and by vacuously absorbing said dry gas as it humidifies, causing further thermodynamic cooling.

33. A product temperature change container apparatus, comprising:

an inner container for containing a product;

a humidification liquid chamber;

a humidification liquid at a pressure contained within said humidification liquid chamber;

a dry gas chamber;

wherein at least one of said humidification liquid chamber and said dry gas chamber is in thermal communication with said inner container;

and wherein said dry gas chamber comprises a thermally reactive structure having interstitial spaces containing a dry gas at a dry gas pressure; said humidification liquid chamber being fluidly separated from said dry gas chamber by a sealing member barrier structure when said sealing member barrier structure is in pressure equilibrium between said dry gas pressure and said humidification liquid pressure and said barrier structure is opened when said humidification liquid pressure is greater than said dry gas pressure, and wherein opening said sealing member barrier structure opens fluid communication between said humidification liquid chamber into said dry gas chamber, such that said humidification liquid flows from said humidification liquid chamber into said dry gas chamber and into at least some of said interstitial spaces and said dry gas vacuously absorbs said humidification liquid into said interstitial spaces, thereby intermixing with said thermally reactive structure and vacuously at least partially dissolves said thermally reactive structure, wherein a temperature change of said product within said inner container is generated by vacuously dissolving of said thermally reactive structure and by vacuously absorbing said dry gas as it humidifies, causing further thermodynamic cooling.

* * * * *